United States Patent
Arazi

(10) Patent No.: US 10,268,660 B1
(45) Date of Patent: Apr. 23, 2019

(54) REAL-TIME EVENT TRANSCRIPTION SYSTEM AND METHOD

(71) Applicant: Matan Arazi, Santa Monica, CA (US)

(72) Inventor: Matan Arazi, Santa Monica, CA (US)

( * ) Notice: Subject to any disclaimer, the term of this patent is extended or adjusted under 35 U.S.C. 154(b) by 0 days.

(21) Appl. No.: 15/865,928

(22) Filed: Jan. 9, 2018

Related U.S. Application Data

(63) Continuation of application No. 14/214,894, filed on Mar. 15, 2014.

(60) Provisional application No. 61/802,463, filed on Mar. 16, 2013, provisional application No. 61/798,710, filed on Mar. 15, 2013.

(51) Int. Cl.
*G06F 17/18* (2006.01)
*A63F 13/50* (2014.01)

(52) U.S. Cl.
CPC .............. *G06F 17/18* (2013.01); *A63F 13/50* (2014.09)

(58) Field of Classification Search
CPC ....................................................... G06F 17/18
See application file for complete search history.

(56) References Cited

U.S. PATENT DOCUMENTS

| | | | | |
|---|---|---|---|---|
| 6,754,470 | B2 * | 6/2004 | Hendrickson | H04L 41/12 455/405 |
| 8,149,530 | B1 * | 4/2012 | Lockton | A63F 13/12 360/65 |
| 8,162,756 | B2 * | 4/2012 | Amaitis | G07F 17/32 463/42 |
| 8,312,173 | B2 * | 11/2012 | Berg | H04J 3/0667 709/203 |
| 8,560,495 | B1 * | 10/2013 | Sanin | G06F 17/30516 707/610 |
| 8,606,308 | B2 * | 12/2013 | Simon | G06Q 30/02 455/466 |
| 8,622,837 | B2 * | 1/2014 | Harris | A63F 13/12 463/42 |
| 2008/0182542 | A1 * | 7/2008 | Choi | H04B 1/7107 455/296 |
| 2009/0054123 | A1 * | 2/2009 | Mityagin | A63F 13/12 463/9 |
| 2009/0300143 | A1 * | 12/2009 | Musa | H04N 7/17318 709/218 |
| 2010/0029370 | A1 * | 2/2010 | Robinson | G07F 17/32 463/25 |
| 2010/0178985 | A1 * | 7/2010 | Chickering | A63F 13/60 463/42 |

(Continued)

*Primary Examiner* — Jason Skaarup
(74) *Attorney, Agent, or Firm* — Amster, Rothstein & Ebenstein

(57) ABSTRACT

A real-time event transcription system and related methods provides for determining the existence, sequencing and timing of an event and/or event elements, for detecting and compensating for latency issues and cheating while providing synchronized user engagement, wherein users who are observing an event interact with a stream of stimuli generated over the course of the event, each user's interactions precisely recorded and accurately timestamped, accounting and/or compensating for various delays that may cause different users to encounter the stimuli at different times. Embodiments further provide for methods to determine and synchronize stimuli and reaction timing across a plurality of geographical locations, transmission methods and media.

20 Claims, 21 Drawing Sheets

(56) References Cited

U.S. PATENT DOCUMENTS

| | | | | |
|---|---|---|---|---|
| 2012/0166372 A1* | 6/2012 | Ilyas | G06F 17/30914 | |
| | | | 706/14 | |
| 2012/0166373 A1* | 6/2012 | Sweeney | G06F 17/30914 | |
| | | | 706/14 | |
| 2012/0191757 A1* | 7/2012 | Gross | G06Q 10/0633 | |
| | | | 707/781 | |
| 2013/0084882 A1* | 4/2013 | Khorashadi | H04L 67/22 | |
| | | | 455/456.1 | |
| 2013/0139259 A1* | 5/2013 | Tegreene | A61B 5/16 | |
| | | | 726/22 | |
| 2013/0159310 A1* | 6/2013 | Birdwell | G06F 17/30442 | |
| | | | 707/737 | |
| 2013/0176438 A1* | 7/2013 | Mate | H04N 7/181 | |
| | | | 348/157 | |
| 2013/0245930 A1* | 9/2013 | Husain | G01C 21/3679 | |
| | | | 701/400 | |

* cited by examiner

REAL-TIME EVENT TRANSCRIPTION SYSTEM AND METHOD

REFERENCE TO OTHER APPLICATIONS

This application is a Continuation of U.S. application Ser. No. 14/214,894, filed on Mar. 15, 2014, which claims the benefit of and priority to U.S. Provisional Application No. 61/798,710, filed Mar. 15, 2013 and U.S. Provisional Application No. 61/802,463, filed Mar. 16, 2013, the entire contents of each of which are incorporated by reference herein.

U.S. GOVERNMENT RESEARCH

N/A

FIELD

Various embodiments relate generally to managing user interactions online in association to events, including reducing cheating, synchronizing user engagements and improving real-time event transcription in online gaming, online entertainment, journalism and news gathering, market transaction and/or other online transactions and engagements, without limitation.

BACKGROUND

Games of skill and chance have an intrinsic excitement and entertainment value. Any game is greatly enhanced by a participant's ability to know how their performance compares in relation to other participants and/or to historical performance for the game throughout the contest. As with any game of skill, competition among friends, or with strangers of similar experience, or the ability at one's option, sometimes for an extra consideration, to compete in a separate team or individual contest, offers the opportunity of increased enjoyment and prizes.

Games of skill that rely on participation by watching an event on a television have potential latency issues since television signal reception is not synchronized nationwide. For example, a participant in Texas using a satellite dish network may experience a 3-second delay compared to an individual in California using a cable network. Also, there are delays between individuals attending a game live and those watching the game live on television. Furthermore, for taped programs, both those shown to viewers in time zones or those syndicated on a market-by-market basis, there are potential delay issues as experienced with the live broadcasts in addition to other possible differences in timing of the broadcasts.

To maintain user enjoyment and fairness for all participants in online gaming, relative advantages or disadvantages related to these delays must be neutralized. Historically various technologies have been employed to manage aspects of coordinating communications, actions and/or responses of multiple users online with respect to an event.

A device for time and location based gaming has been disclosed by Amaltis et al., wherein an activating and deactivating of a gaming device may be based on a duration of time related to activation and/or a location of a user of the gaming device (U.S. Pat. No. 8,162,756 B2, publication date Apr. 24, 2012; hereby incorporated by reference herein in its entirety).

A system and method to synchronize the processing of messages in areas of an execution graph affected by primitives where there is a potential for substantial delay is taught by Sanin et al. in U.S. Pat. No. 8,560,495 B1, published Oct. 15, 2013 (hereby incorporated by reference herein in its entirety), wherein a continuous processing system identifies primitives with potential for delay, each potentially-delayed primitive that is not in a loop, the continuous processing system creates a "timezone" downstream of such primitive, the output(s) of the potentially-delayed primitive becoming an input to the timezone, the processing system then identifying all other inputs to the timezone and placing a synchronizer across such inputs.

Berg et al. disclose an apparatus and method for synchronizing a function among a large number of devices having different platforms, causing a large number of handheld devices to perform certain functions at or nearly at the same time, the apparatus configured to send an event to each device, receive a timepacket and send a return timepacket, thereby causing the device to receive the event and invoke the function after a delay. The method may include calculating loop return times on content with timepackets to determine latency and synchronizing multiple devices based on event times. (U.S. Pat. No. 8,312,173 B2, published Nov. 13, 2012; hereby incorporated by reference herein in its entirety).

Simon et al. disclose a method and system to facilitate interaction between and content delivery to users of a wireless communications network, including creating affinity groups of portable communication device users, and distributing targeted content to said users, wherein the user affinity groups may be formed by comparing user profiles with each other or with a predefined affinity group profile definition (U.S. Pat. No. 8,606,308, published Dec. 10, 2013, hereby incorporated by reference herein in its entirety).

Gerace (U.S. Pat. No. 5,848,396, published Dec. 8, 1998 and hereby incorporated by reference herein in its entirety) discloses an apparatus and network methods for targeting an audience based on psychographic or behavioral profiles of end users, wherein the psychographic profile is formed by recording computer activity and viewing habits of the end user.

U.S. Pat. No. 8,622,837, published Jan. 7, 2014 (hereby incorporated by reference herein in its entirety), and issued to Harris et al., discloses various metrics that may be deployed in an active, passive, or hybrid validation architecture, wherein a computing device configured to monitor network game activity may identify an inconsistency between user game data and a particular game metric governing a particular aspect of the network gaming environment, including wherein an active or passive validation process may detect cheating or unusual behavior or activity via passive monitoring or active, random queries, or a combination of the two.

Robinson et al. disclose methods and apparatus for deriving a response time to a challenge in a network by receiving an executable package that includes a challenge, a response to the challenge, a first call to retrieve the challenge, storing the first call time, making a second call related to a response to the challenge, and deriving a response time based on a difference between the first call time and the second call time (US Patent Application, Publ. No. 20100029370 A1, Feb. 4, 2010; hereby incorporated by reference herein in its entirety).

U.S. Pat. No. 8,616,967 B2, issued to Amaltis et al. on Dec. 31, 2013 (incorporated herein in its entirety by reference hereby), discloses a gaming system that allows users to access applications via communication devices coupled to a wireless network, wherein gaming applications can include gambling, financial, entertainment service, and other types of transactions and the system may include a user location determination feature to prevent users from conducting transactions from unauthorized areas.

In U.S. Pat. No. 8,149,530, issued Apr. 3, 2012 (incorporated by reference herein in its entirety), Lockton et al. disclose a methodology for equalizing systemic latencies in television reception in connection with games of skill played in connection with live television programming, wherein users can indicate access path; verified by sending questions to cell phones concerning commercials, station breaks and the precise time they are viewed, or utilizing other information only seen by these users, and wherein averaging responses from cohorts can be used to establish accurate "delta" and to avoid cheating, and including further broadcasting test-response signals to which users must respond; automating a monitoring system watching signals per various channel feeds for arrival times; and batching users together per their source path and time delay.

Musa, et al., in U.S. patent application Ser. No. 12/455,080, filed May 27, 2009 (herein incorporated by reference in its entirety), teaches a system and method for providing real-time interaction with a multimedia program being presented to a viewer having an interactive end-user communications device, wherein an applet is distributed to interactive end-user devices, the applet includes a timer, time stamps and a GUI, and the program synchronizing activation of the applet with a multimedia program being presented to the viewer, and wherein the applet generates, at a first predetermined time, a first interactive graphical user interface (GUI) on the end-user communications device, the GUI displays values associated with the multimedia program for real-time selection by the viewer.

U.S. Pat. No. 6,754,470 B2, issued to Hendrickson et al. on Jun. 22, 2004 (incorporated herein by reference in its entirety), discloses systems and methods for measuring wireless device and wireless network usage and performance metrics, wherein data gathering software installed on a wireless device collects device parametric data, network parametric data, and event data.

U.S. patent application Ser. No. 12/012,363, filed by Robinson et al. on Jan. 31, 2008 (incorporated herein by reference in its entirety), discloses methods for deriving a response time to a challenge in a network, by retrieving a challenge from a program in a first call, making a second call to provide a response to the challenge, and then deriving a response times by differencing call times.

US Patent Application filed by Khorashadi et al. (Publication no. 20130084882 A1, filed Sep. 30, 2011 and published Apr. 4, 2013, and hereby incorporated herein by reference in its entirety) discloses a method for developing "context-awareness" for how a mobile device is being used by exploiting crowdsourcing and device interaction to assist context determination. One or more remote servers receives location and/or other information from a mobile device and selects, from a list of possible activities, a smaller list of activities that a mobile device user is likely engaged in. As a context assistance server and/or context crowd source server adjusts to input from mobile devices, they can share this "learning" with the mobile devices by updating context recognition models used by the mobile devices themselves. The server can also use the information to adjust a model that it can provide to the mobile devices for download.

U.S. patent application Ser. No. 13/345,143, filed Jan. 6, 2012 by Mate et al. (incorporated by reference herein in its entirety), teaches methods, apparatus and computer program for analyzing crowd source sensed data to determine information related to media content of media capturing devices. An example embodiment may utilize crowd sourced sensing to determine one or more focus points of interest in which a number of users point media capturing devices at areas of interest associated with the event(s) to capture the media content. In addition, an example embodiment may classify the focus points and may utilize the classification of the focus points to determine semantic information about the recording behavior of the users at the event(s).

Beyond the teachings of the foregoing references, there remains a need in the industry for improved systems and methods that can provide for analyzing information from multiple users in ways connected to multiple events and/or event elements, some of which events may be related to a user's response, and to be able to correct the information about the event elements as a result of analysis of the responses from a plurality of users. Furthermore, there is a need to maintain a reputation system amongst said plurality of users, both in order to resist or detect cheating attempts and also as a mechanism to keep score or to provide a scale to differentiate users based on level of skill, response time, accuracy, etc.

In addition, there is a need for continued improvement in managing user interactions online and in coordination with online games and/or other event-based and/or transaction-related implementations. There is a need for improved methods to reduce cheating and to synchronize user engagements. There is a need for improving the ability to utilize large numbers of input signals from crowdsourcing data to determine the existence of events and event elements, the factual nature of each element, the sequence of event elements, and the actual timing of event elements.

SUMMARY

Various embodiments of the invention provide generally for a real-time event transcription system and related methods. Some embodiments provide further for utilizing cheating detection and compensation methods while providing synchronized user engagement. Additional embodiments provide further ability to send, target or tailor advertisements, marketing, or other promotional material to a plurality of users based on an analysis of the users (individually or in any grouping) affinity to particular teams, actors, celebrities, or other entities and a further analysis that predicts the reaction of those users to events as they transpire.

Some embodiments provide for a system comprising at least one computer processor and associated machine instructions, the system configured to allow a plurality of entities (humans and/or electronic and/or mechanical), who (or which) may be referred to as "users" herein, who (or which) are observing or interacting with some event or task (live or otherwise) to interact with a stream of stimuli generated over the course of the event, said interactions happening with, by and between multiple entities including other users, organizations, event affiliates, and to allow the entities or users to interact with the streamed stimuli in a fair and accurate manner whereby each users' interactions are precisely recorded and accurately timestamped, accounting for various delays that may cause different users to encounter the stimuli at different times.

One or more embodiments of the invention provide for various methods to prevent users from cheating (for example, by users using the delays to their advantage) and for various methods for detecting and synchronizing the stimuli. Embodiments provide for additional methods to determine and synchronize stimuli and reaction timing across a plurality of geographical locations, transmission methods and media.

Embodiments of the present invention provide further for a system and methods that can accurately and quickly predict the past, provide valuable insights into future events, and determine the likelihood of cheating by an individual user in an online game or other application. By crowdsourcing user inputs and integrating additional signals from a plurality of additional sources, data can be gathered for each occurrence throughout the course of an event, and the data further processed to enable reconstruction of past occurrences and gathering of insights regarding these occurrences. These insights, in turn, can be used for various applications in multiple embodiments, some of which are described herein.

Various embodiments of the invention provide for generating a transcript of any event that is concurrently observed by a plurality of entities in a manner whereby each such entity can react to a plurality of stimuli and thereby interact with the system contemplated herein such that an accurate transcript will be produced by the system. Various embodiments can provide further benefit by being able to detect any of attempted fraud or cheating by any such entity. Additionally, embodiments can provide benefit by being able to accomplish the foregoing steps without the requirement for a physical presence at the location of the event and/or without the requirement to have an accurate time reference.

One or more embodiments of the invention provide for methods of detecting cheating in online game activities, and/or detecting cheating and/or inaccurate reporting in activities related to news gathering, reporting, current events, disaster relief, stock market trading, forex/equity trading, real estate transactions, financial transactions, and other such activities, without limitation, the activities associated with one or more events, which methods can comprise one or more combinations of analyzing latency in individual and cohort responses, machine-trained analysis of user cohort behavior, and analysis of crowdsourcing information derived from the same or other cohorts.

Some embodiments of the invention provide generally for analyzing crowdsourcing information to analyze events that are the subject of the user responses, for utilizing recursive queries to prompt secondary crowdsource responses, and additionally or alternatively using probabilistic analysis of multiple data sources to form synchronization across delivery paths, locales and modes.

At least one preferred embodiment provides for synchronizing input from a large number of devices to ascertain content, time, and time differences from varying external stimuli. In one embodiment a viewer can see an event at time, t(e) (or t.sub.event), a viewer can respond to an event at a time t(r) (or t.sub.response), and the system and/or method can process the viewers' responses at time t(p) (or t.sub.process). In a preferred embodiment, a plurality of data sources can be used in relation to real-time event transcription, cheating detection and compensation, and/or synchronizing user engagement (such as, for example, without limitation: wireless signal, GPS, device accelerometer, absolute time, microphone input, logical location, delivery system base delay, event time, calculated event time, user event-based choice, and user choice time), any or all of which may be made part of the data processing and information transformation steps. In one or more embodiments, a delay estimation can be made by: (i) user-stated mode, (ii) geo-location, (iii) device metadata including type of device, connection method, carrier/connectivity provider, etc and/or (iv) comparing response time and accuracy to other media/modes. The system and methods can determine, calculate and/or generate latency analysis based on t(r), on t(e), or on a difference between t(r) and t(e), which can be performed in reference to a standard and precise clock time. Various embodiments can further provide for advanced latency accounting for typical stimuli eliciting responses and/or weighting the probability of a particular stimuli to elicit a response. An embodiment can provide, too, for identifying control groups that exhibit less or more appropriate latency.

One or more preferred embodiments provide for identifying fraud, cheating, or other inaccurate input among many users reacting to stimuli via a plurality of media and methods. An embodiment, for example, can provide and utilize in the processing method(s), without limitation, at least one or more of the following submethods and/or information sources: randomized questions; "honeypot" testing for other transmission modes, control cohorts (such as, for example, without limitation, known non-cheaters and/or known cheaters); aggregate and calculate average response times, providing normal min-max ranges for response boundary to identify cheating; calculating average correct response percentage norms; using geo-location to define cohort for comparative norm; checking response time and accuracy correlation with other transmission modes; and/or utilizing accuracy measure(s) based on probabilities and successes, e.g., $A(i)=\text{average}[p(t)*Si(k, t)]$. One or more embodiments can utilize one or more sources of data, such as, without limitation, data from the group of data sources comprising global positioning system (GPS) data, device accelerometer data, microphone input data, logical location data, content channel data, delivery system base delay data, event time data, calculated event display time data, user event-based choice data, and user choice time data. An embodiment can further identify control groups with better latency and/or accuracy.

At least one preferred embodiment provides for detecting and synchronizing input timing with neighboring devices by a variety of methods, including, without limitation, WiFi, WiMax, Bluetooth, NFC, and/or similar methods. An embodiment can have each device emit specific sound (within and/or outside the audio band) detected by other devices' available sensors. Another or the same embodiment can use input timing or audio content recognition to determine which method and media is being used to broadcast the event to the viewers, and to further aid in the detection of cheating attempts. An embodiment can use input timing to identify control groups with better latency.

One or more preferred embodiments can include using machine learning, heuristics, pattern-matching, game-theory, and more in the processing method(s).

An embodiment can further provide for determining absolute time (and nature) of stimuli without physical presence at location(s) of stimuli. This can further comprise, without limitation, one or more of: displaying different stimuli to different groups, then correlating responses to predict what happened where and when; recursively using of one set of responses to generate additional query/stimuli; processing being automated within the system; and using heuristics, comb filters, auto-correlation, statistical algorithms, machine learning algorithms, and/or multi-agent systems, inter alia, without limitation, in order to improve the precision of the derived data. The processing in at least one embodiment can one or more of: feed other stimuli of similar events as additional signals (past or present); dynamically change decision tree (represents options for events that have taken and/or are taking place, and for potential future events), wherein crowd-sourcing responses can be used to prune decision-tree branches; compare individual replies to group to detect cheating/fraud; produce one or more transcripts of one or more events; and/or identify one or more control groups with better accuracy and/or latency.

DETAILED DESCRIPTION

Figure 1:
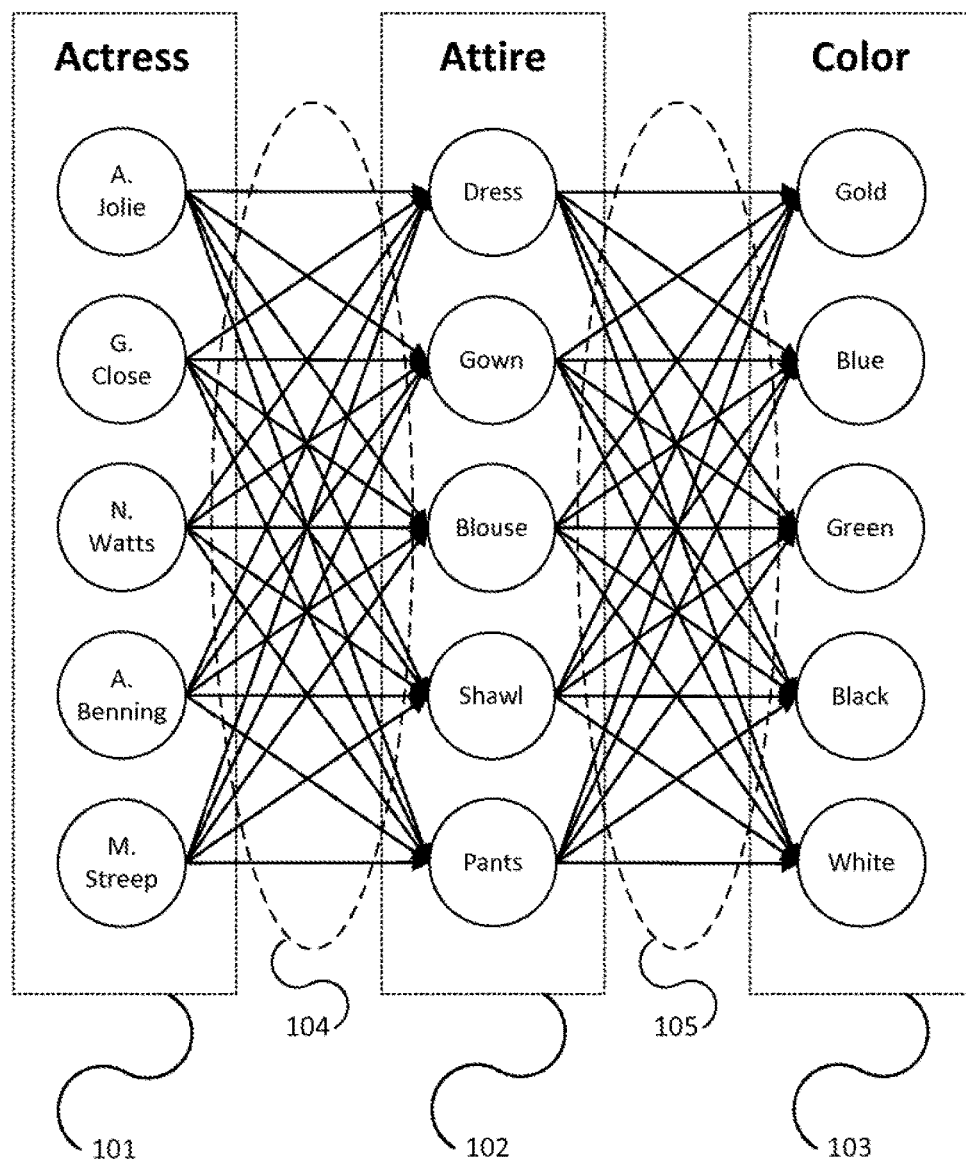
FIG. 1 illustrates an initial set of connections between a plurality of exemplary entity types according to one or more embodiments of the invention.

U.S. Patent Application 61/798,710, flied 15 Mar. 2013 and U.S. Patent Application No. 61/802,463 filed 16 Mar. 2013, are hereby incorporated herein in their entirety and made part of this description.

The invention can be understood further by illustration of multiple embodiments, including one or more preferred embodiments, as related in the more detailed description below; however, it is understood that the full scope of the invention is not limited to these embodiments alone.

Numerous embodiments provide for a client/server user query system that allows multiple users, experiencing varying network latency, to synchronize on a best-effort basis to absolute time events on the server, where these may in turn have been started relative to an absolute event that is external to the system (an example would be a series of questions relating to the outcome of a play in NFL football, in turn synchronized to a TV broadcast). Furthermore, the server can push content to the users in real-time, thus allowing a multitude of clients to be presented with content in real-time on their devices (handhelds, tablets, laptops, etc be they connected wirelessly or via wired connections) at approximately the same time despite varying network conditions.

It can be appreciated that the present invention can scale to an almost infinite numbers of users, including for example, without limitation, human users, intelligent machine users and/or a combination of human and intelligent machine users, by employing standardized distributed processing methods such as those made available by various cloud computing services, such as, for example, without limitation, Amazon® cloud computing services and/or Google® cloud computing services.

Preferred embodiments of the invention can provide generally for real-time event transcription, cheating detection and compensation, and/or synchronizing user engagement. One or more such embodiments can be implemented in the context of detecting cheating in an online game associated with one or more events. One or more preferred embodiments can include, in the same context of an online game, some combination of analyzing latency in individual and cohort responses, machine-trained analysis of user cohort behavior, and analysis of crowdsourcing information derived from the same or other cohorts.

At least one preferred embodiment can provide for one or more of: analyzing crowdsourcing information for the further purpose of analyzing events that are the subject of user responses; utilizing recursive queries to prompt secondary crowd-sourced responses; and additionally or alternatively using intricate analysis of multiple data sources to form synchronization across delivery paths, locales and modes.

One or more embodiments provide for a method of determining one or more of the existence, sequence and timing of one or more event elements of an event, comprising the steps of sending, by a computer devices, a first information to a plurality of users in the context of an event or an event element thereof, wherein event elements are associated with one or more time steps and further associated with a state-transition; receiving, by a computing device, from a plurality of users one or more first or subsequent user inputs in reference to the event or an event element thereof in response to the first information, wherein the one or more first or subsequent user inputs in response to the first information is associated with a time step; sending, by a computing device, a second information to a plurality of users in the context of the event and in the context of a time step differing from the time step associated with the first information; receiving, by a computing device, from a plurality of users one or more user inputs in response to the second information; calculating, by a computing device, probabilities associated with one or more of the existence, sequence and timing of one or more event elements comprising the event from a plurality of user inputs; and determining, by a computing device, one or more of the existence, sequence and timing of one or more event elements comprising the event, based on the probabilities. One or more preferred embodiments can provide for the first or subsequent and the second or subsequent inputs being derived or implicit inputs, rather than only responsive inputs that are explicitly generated based on specific stimuli.

In various embodiments the first information sent to a set of users can be a query that is related to an element of an event. A stimulus affecting the user can elicit a response from the user. A query can provide a stimulus. An element of an event that is being observed, watched and/or otherwise engaged by a user (such as, for example, interacting as a participant, as an audience member, watching on a mobile device, observing from a distance, monitoring via indirect means, or engaging in any other manner, without limitation, so as to gain information about and form a perception of an event and/or an element of an event) can also provide a stimulus to the user. The absolute time and/or a receipt time relative to a reference timepoint that a user might see a stimulus can be affected by many factors, some of which are shown in Table 1.

TABLE 1 below summarizes some of the factors that influence when a user sees the stimuli and how their prediction or reaction to it is affected by delays:

| Factor | Absolute time | Inter-user Standard deviation | Intra-user Standard deviation | Delay |
|---|---|---|---|---|
| When does the user observe the event element | Unknown | High | Low | High |
| User Response Latency | Can be estimated | Medium | Medium | Medium |
| Processing Latency | Can be estimated | Low | Low | Low |

One of the challenges in reconstructing sequences of event elements from inputs received from a plurality of users that each have differing latency characteristics associated with both their observation and/or engagement with an event and associated with their communications with the event reconstruction and/or synchronization system is how to detect and compensate for the latency issues themselves and also how to detect and compensate for potential behaviors of some users who can be aware that latency issues can provide them an advantage and may attempt to exploit their advantage for unfair individual gain or for other purposes that the detection and compensation system and method may seek to counter. In order to manage and overcome such challenges, one or more embodiments provide for utilizing many types of information and disparate sources of data related to, for example: time, location, communication mode, local conditions, content transmissions, user characteristics and behaviors, and any number of other types of information and sources of data, without limitation. One or more preferred embodiments can reference data sources from a group that comprises, for example, without limitation, the following data sources:

Cellular/WiFi signal for coarse location detection;

Geo location (GPS) to determine where the user is, and possibly what the minimum transmission delay should be. This input can be used to correlate with other proximate users, optionally using WiFi, NFC, Bluetooth, audio content fingerprinting, or other methods, without limitation, be they mechanical, acoustic, electronic or otherwise.

Mobile device accelerometer to record calculate average hand motion for user, compare to other users and also can compare game to game for same user. If different, this data input can be used for flagging or indicating flagging a potentially-cheating user;

Absolute atomic time (via GPS or the mach_absolute_time function (or equivalent) on mobile device;

Microphone input for audio content recognition to be used for detection of other devices or for audio content recognition. Capture audio input at time user confirms choice, compare to audio fingerprint of event reference to make sure the two are within an allowable threshold, and of other input emitted by other devices. Also compare to user-stated information as to broadcast media and method. If user input is at "wrong" time compared to broadcast, consider to be indication of cheating;

"Logical" locations (venue name, social network location, or other location, without limitation. This input can be used to encourage users to "check-in" via foursquare, Facebook, twitter, etc., without limitation);

Content channel (for example, ESPN, Fox Sports, etc, without limitation);

Event time using the mobile device hardware clock that is not controllable by user, optionally by timing arrival of timing packets;

Event display time, which can be calculated according to an event time and a user delay, such as, for example, compared to audio fingerprint at each stimuli reaction and phone hardware clock;

Content delivery system (TV [cable, satellite, analog], radio (satellite, digital, analog), internet, mobile device [3/4G, Wi-Fi]) allows to calculate base delay depending on range of pre-determined factors including a user's device, communication channels, and delivery method of event broadcast;

User choice (regarding an event or an event element thereof);

User choice time (locally cached on device). For example, if user choice time is less than a time limit stimuli response, then the system can accept the input even if delay caused the response to be received after the generally allowed timeout setting;

For various purposes, including detecting and compensating for latency and/or delay in users perceiving stimuli and detecting and compensating for a processing system experiencing latency and/or delay in receiving user inputs, one or more embodiments can implement delay estimation methods such as, for example, without limitation:

Prompt user as to the manner in which they will watch the event (radio/TV channel, can then deduce if cable, terrestrial or satellite).

Take a user's geographic location and comparing it to other users. For example, calculate the standard deviation of response time and/or accuracy for users with similar location and/or provider. In, an online betting game context, for instance, allow responses only within certain response time (for example: 2 standard deviations).

Evaluate user's response time and accuracy compared to other media (for example: radio). If there is low correlation with a user's stated reply (for example: HDTV), but a high correlation with other media and methods (example: analog radio), then that user is more likely to be cheating. The system could then optionally employ additional algorithms to detect and compensate for suspected cheating.

At least one or more embodiments of the invention can provide for the following methods or sub-methods for sending query information to a set of users and receiving responses from that or another set of users or a combination thereof:

Randomization: ask the questions in different order, and place the responses in different areas of the screen.

Honeypot testing for other transmission modes: Ask questions that the user would not be able to legitimately know the answer to (for example, if user claims he's on a satellite feed, pop up a question about a commercial that showed up on a cable feed—if user responds correctly to many such honeypots, it means they are not observing with the transmission media and method(s) they claim and with the delay associated with that transmission media and method(s)).

Control cohorts (such as, without limitation, in cheating context), e.g.:
  Control group of known users that don't cheat
  Control group of known users that actively cheat Calculate average response time based on an aggregation of mean times for all of the users' responsive actions to various stimuli (for example, see the event on screen, think of a response, send a response, and receive the response in the system. This will generate a certain time range, with a minimal "floor" time. If the system receives an answer before this time, it is probable that user is attempting to cheat or defraud.

Calculate average correct response percentage. For example, if user is further than two standard deviations of that percentage (p-factor of 0.05), then user is probably cheating.

Take user's geo location and compare it to other users. Calculate standard deviation of response time and/or accuracy for users with similar location and/or provider. Reactions to stimuli are only accepted only within certain response time (for example: 2 standard deviations).

Take user's response time and accuracy compared to other media (for example: radio). If there is low correlation with user's stated reply (for example: HDTV), but high correlation with other media and methods (for example: analog radio), then the user is likely to be cheating; and/or Utilizing accuracy measure(s) based on probabilities and successes, e.g., $A(i)=average[p(t)*Si(k, t)]$.

At least one embodiment of the invention can provide for a system that can send and/or display different questions (stimuli) to different groups of users in the context of an event or event elements (timing and distribution of questions determined by the system) and then correlate the responses from the users (both time of indication and answer), in order to predict with a high likelihood what happened and when in the context of the event and event elements. The system can use, recursively, one or more sets of responses to generate the choices displayed for additional stimuli (and the system can combine information from other data sources with the one or more sets of responses in a combined analysis for this purpose). Additionally, the system can adjust the types and/or instances of system-distributed stimuli for sending to differently constituted set or group of users as selected by the system at any specific time based on the system processing data inputs. For example, without limitation, a question may be any one of the following, each sent to a system-selected group of users:

"Will John Doe wear a jacket when he next appears on stage?" to which the displayed list of possible answers may be "Yes" or "No."

"What color dress did Jane Doe wear when she appeared on stage." to which the displayed list of possible answers may be "Green" or "Other."

Upon selection by a large group of users that Jane Doe wore an "Other" colored dress at any particular time of the event, it is therefore likely that she appeared on stage at such a point.

Another case, for example, without limitation, in the context American NFL Football, can display the following questions to a plurality of users (timing and distribution of questions determined by the system):

"Will the next play be a rush or a pass" to which the displayed list of possible answers may be "Rush" or "Pass."

"How many yards were gained?" to which the displayed list of possible answers may be "more than 10" or "less than 10"

"How many yards were gained?" to which the displayed list of possible answers may be "more than 5" or "less than 5"

"How many yards were gained?" to which the displayed list of possible answers may be "less than 5" or "fumble"

Correlating this data over a large body of users can preferably provide very high and even more preferably provide almost absolute precision to be attained, especially when the system employs any combination of any variety of algorithms (including, without limitation, heuristics, comb filters, auto-correlation, statistical algorithms, machine learning algorithms, multi-agent systems, and so on) used to improve the precision of the derived data. The processing method according to one or more embodiments can also feed the various stimuli of similar events (past of present) as additional signals into the algorithm. As well, the system can employ a variety of algorithms to determine which users shall be shown which questions at whatever time.

Crowd-Sourcing

One or more embodiments can provide a system for using crowd-sourcing, wherein the system can determine which event occurred according to user replies (based on a plurality of replies from a plurality of distinct users), and can then dynamically update the decision model. Based on the time the user replies, the system can estimate the user's location, transmission method and media (TV, radio, live event, etc, without limitation) and other parameters.

The system can compare the users' replies to those replies of other users with, in one or more preferred embodiments, similar characteristics, for example: affinity (including team and player preference), mobile device metadata (including connection method, broadcast viewing method and so on), purchasing history and geographical location among others (such comparisons determined by the system in accordance with an embodiment), and the system can also use a checking process if the system determines that the user is likely to be cheating (for example, if user says he or she is watching an event on TV, yet the behavior and response time of this user is similar to a typical profile of a user listening on a radio).

An embodiment can provide for the system to produce a transcript of the event, accurate to a very small time interval, that outlines the sequence and timing of events that happened by using either onsite or remote viewers that reacted to various stimuli during said event, and then algorithmically deriving the sequence and timing to produce the transcript with minimal delay. Crowdsourcing techniques may be applied in such computations. For example, output from the system can be used to verify accuracy of other stated transcripts (such as those provided by third parties). Furthermore, output from the system can be further used to verify and mitigate cheating attempts by users. Additionally, output from the system can be used to provide an accurate and timely data-feed of the event sequence which can be transmitted to other third parties).

At least one or more preferred embodiments provide for a method and a system by which the absolute time that a stimuli (or event element) occurred can be accurately deduced from a plurality of data without any physical nexus at the location of the occurrence of said stimuli. For example, remote sensing and image processing can add to a data stream and provide timing information. As a further example, without limitation, one embodiment can use machine vision to determine when a snap happened in a football game. This determination can allow for increased accuracy when computing latencies because the processing has an external data source that cannot be controlled nor affected by users. See Machine Vision (http://www.sciencedirect.com/science/article/pii/S0262885609002704) and audio monitoring (to detect waveforms that indicate the event happened and, optionally allow timing synchronization) and Acoustic fingerprinting (See Duong, N. Q. K.; Howson, C.; Legallais, Y., "Fast second screen TV synchronization combining audio fingerprint technique and generalized cross correlation," Consumer Electronics—Berlin (ICCE-Berlin), 2012 IEEE International Conference on, vol., no., pp. 241, 244, 3-5 Sep. 2012; doi: 10.1109/ICCE-Berlin.2012.6336458), which foregoing references are herein incorporated by reference in their entirety.

At least one or more preferred embodiments provide for receiving crowd-sourced inputs from remote viewers, wherein a plurality of remote viewers, each viewing the event over any transmission method and media with any propagation or transmission delay endemic to such transmission method and media, can enter their inputs as to the exact and/or absolute time that they witnessed the stimuli occurring (the "epoch"). Any number of such indications, from any number of users, can then be calculated in a plurality of ways, including, for example, by designating certain users as trusted users who view the events and indicate when stimuli occur, with said such trusted users viewing the event over a transmission method and media with a known and predicable propagation or transmission delay. With such a plurality of trusted users giving a plurality of indications, the present invention can be used to calculate when the stimuli occurred by subtracting the known transmission or propagation delay from the absolute time indicated by said power users and by adjust for the human reaction speed of the users both individually and as a group.

At least one or more preferred embodiments provide for receiving crowd-sourced inputs from local viewers. Similar to crowd-sourcing from remote viewers, a plurality of trusted users who are known to be in the immediate proximity to the stimuli can indicate when the stimuli occurred, without any transmission or propagation delay. In this case, only the adjustment for the human reaction speed of the users both individually and as a group need be taken into account. Additionally, the system can utilize the geo-location functionality built into contemporary smartphones (using GPS and other methods) to determine these users are physically proximate to the actual event and thus have minimal latency. The system can then send timing packets (for example as provided by the ping utility and the ICMP protocol, http://tools.ietf.org/html/rfc4884 and its predecessors and citations, herein incorporated in their entirety) to determine the data transmission latency between a user's device and one or more servers executing computer code of an embodiment of the present invention.

Synchronizing Input

At least one preferred embodiment provides for synchronizing input from a large number of devices to ascertain content, time, and time differences from varying external stimuli. In one embodiment a viewer can see an event at time, t(e) (or t.sub.event), a viewer can respond to an event at a time t(r) (or t.sub.response), and the system and/or method can process the viewers' responses at time t(p) (or t.sub.process). In a preferred embodiment, a plurality of data sources (such as, for example, without limitation, wireless signal, GPS, device accelerometer, absolute time, microphone input, logical location, delivery system base delay, event time, calculated event time, user event-based choice, and user choice time) may be made part of the processing. In one or more embodiments, a delay estimation can be made by: (i) user-stated mode, (ii) geo-location, (iii) ping times and/or (vi) comparing response time and accuracy to other media/modes. The system and methods can determine, optionally in reference to a standard and precise clock time, calculate and/or generate latency analysis based on t(r), on t(e), or on a difference between t(r) and t(e). Various embodiments can further provide for additional methods of accounting for various latency between users seeing the questions sent to them by an embodiment of the present invention, and [the embodiment] receiving the user responses to the aforementioned questions. The system and method of numerous embodiments provide for measuring (i) how long before a user sees a question appear and (ii) how long it takes a user to respond to the system based on system-prompted and/or system-registered stimuli. This, together with other latency data the system and/or method can acquire or derive, allows for more accurate latency compensation and cheating mitigation. A preferred embodiment can further adapt the weights governing the probability of a certain plurality of users responding to various stimuli, using various inputs and parameters as inputs for recalculating the weights at any point.

A preferred embodiment can provide, too, for identifying control groups with better latency, such as those users who are physically present at the event location and thus are not subject to propagation delays of the broadcast transmission system. Further, users using mobile devices that allow for lower latency transmission can also be identified. Lower latency is desired because higher levels of statistical accuracy can be attained within a shorter time frame, thereby enabling a preferred embodiment to filter incorrect/fraudulent responses faster and more accurately. In most preferred embodiments, less latency is better. Less latency also allows for faster training of the model and lower risk of cheating, and it confers the added benefit of using the lowest latency and the minimum time marker for which an event happened. This is especially important if this rapid training happened as a stimuli response by users (one or more) who can be determined (by location) to be physically proximate to the event.

Detecting and Synchronizing Input Timing

At least one preferred embodiment provides for detecting and synchronizing input timing with neighboring devices by a variety of methods, including, without limitation, WiFi, Bluetooth, NFC, and/or similar methods. An embodiment can have each device emit specific sound (within and/or outside the audio band) detected by other devices' available sensors. Another or the same embodiment can use both input timing, as described above, and audio content recognition (such as that provided by Duong et al., as previously cited herein)) to determine which method and media is being used to broadcast the event to the viewers, and to further aid in the detection of cheating attempts. An embodiment can use input timing to identify control groups with better latency.

Advanced Processing Methods

Another preferred embodiment can provide for an ability to use a variety of additional processing methods in the transformation of, for example, without limitation, inputs, stored information, analyzed and calculated information and/or derived or generated information, including machine learning, heuristics, pattern-matching, game-theory, and other analytical and/or processing methods.

Determining Absolute Time

An embodiment can further provide for determining absolute time (and nature) of stimuli without physical presence at location(s) of stimuli. This can further comprise, without limitation, one or more of: displaying different stimuli to different groups, then correlate responses to predict what happened where and when; recursively using of one set of responses to generate additional query/stimuli; processing being automated within the system; and using heuristics, comb filters, auto-correlation, statistical algorithms, machine learning algorithms, and/or multi-agent systems, inter alia, without limitation, in order to improve the precision of the derived data. The processing in at least one embodiment can one or more of: feed other stimuli of similar events as additional signals (past or present); dynamically change decision graph (represents options for events that have taken and/or are taking place (and potential future events)), wherein crowd-sourcing responses can be used to prune or exclude decision-tree branches; compare individual replies to group to detect cheating or fraud; produce one or more transcripts of one or more events; and/or identify one or more control groups with better accuracy and/or latency.

One or more preferred embodiments can now be understood by illustrating with the following example(s).

Example 1. Dynamically Generating (Promotional and Other) Content Based on User Feedback Assume that a major sporting event currently takes place. Millions of people are watching it on their television sets and online. By querying a sufficiently large number of people (and by filtering the fraudulent ones using the method described herein) the system and methods of a preferred embodiment are able to determine the following for very short time intervals:

a. How far was a basketball player from the basket when he shot
b. How many yards were just gained in a football game
c. Which team seemed favorite at any given moment
d. What was the color of the dress worn by a leading celebrity when she walked on the red carpet
e. Exact play by play outcomes of each play within the event Example 2. Reconstructing News Events and Providing Insights Using large amounts of user responses to stimuli in short intervals throughout the course of an event, (including press conference, disaster, or anything being reported upon) the system and methods of a preferred embodiment are able to faithfully recreate the event. In addition, the system and processing steps are able to do the following:

a. Identify points of specific interest (based on user feedback) and highlight them
b. Generate automatic summaries containing details such as highlights, MVPs and common perceptions
c. Provide recommendations to journalists and other news services regarding the best way to portray an event in order to "cater" to the perceptions of their readers.
d. Provide accurate timeline of the event with high accuracy and precision and low latency Example 3. Ascertaining the Sentiment of an Individual User A preferred embodiment provides for using various sources of information and applying sub-methods described above for ascertaining the sentiment of an individual user. The system enables to accurately predict the users' affinity to various teams, actresses, etc. and without limitation, based on the users' selections, group assignment, or other data, inter alia. Further, by evaluating what may happen in the immediate future, the system in a preferred embodiment can predict if that specific user will be happy or sad in the next few seconds. This prediction has extremely high value as an input to any number of advertising and marketing systems and campaigns.

Example 4. Users Creating Stimuli Questions and Response Options

An additional embodiment can allow users to create stimuli questions and possible response options themselves, optionally in real time. A preferred embodiment may then query a plurality of users with the created questions, optionally in addition to the generated questions. A preferred embodiment may further enable a first user to communicate a second user or with a plurality of other users via written, audio, video, or other means.

Example 5. Event-Reporting Channel

An additional embodiment can provide for an event-reporting channel, whereby the system and/or methods leverage a user-confidence tracking feature. Such an embodiment can allow a cohort of reporters, each reporter associated with a continual evaluation of each reporter's individual confidence levels, to be used to crowd-source input from a plurality of sources. These responses can be processed using the methods described herein to capture various points of view and evolution of sentiment and information over the course of the reported period. These events can also be processed by methods provided for in a preferred embodiment, which methods produce an accurate transcript of timeline of the reported event, by correlating the occurrences with the highest likelihood that were deemed to have occurred and had been reported on by users of the highest confidence and lowest latency.

Example 6. Financial Trading

Financial markets constantly publish a wide assortment of data about market status and various indicators, including future and past analysis of indicators, trends and events. The high volume of data, the rapid expiration of old data and the absolute volume of data produced and report make it extremely difficult to track in an actionable manner. A preferred embodiment of the present invention can provide for querying a plurality of users as to each of their impressions about released data (past impressions), and to further query a plurality of users as to what they think will happen in the future (future predictions). The system can process such user responses, optionally together with external data sources to enable accurate prediction of, for example, future financial instrument or commodity prices, without limitation, and to optionally either signal trades accordingly or to sell access to the predictions, again without limitation.

Example 7. Stock Exchanges

As with financial markets, stock exchanges also publish a wide assortment of data about market status and various indicators, including future and past analysis of indicators, trends and events, including stock prices, periodic financial reports from companies, option conversion dates and other company information, without limitation. The high volume of data, the rapid expiration of old data and the absolute volume of data produced and report make it extremely difficult to track in an actionable manner. Furthermore, users may be further influenced by reading company reports, leaks, news media, social media, etc, all of which may have an effect on the price of any traded stock. A preferred embodiment of the present invention can provide for querying, by computing device, a plurality of users as to what is each of their impressions of released data (past impressions), and to further query, by computing device, a plurality of users as to what they think will happen in the future (future predictions). The system according to such an embodiment provides further for processing such user responses, by a computing device, optionally together with external data sources, and generating accurate prediction of future economic and/or market events and/or event elements, such as, for example, without limitation, future prices of financial instruments or commodities, future likely changes to the price of company shares, future trading volumes, and future short and long positions. Further embodiments can provide for signaling trades accordingly and/or selling access to the predictions, again without limitation.

Example 8. Market Research

A market research or similar company can use large amount of data collected by an embodiment of the present invention to acquire insights as to customer sentiment towards various products, current events, and/or other trends. Such company may entice users to use various applications, including such applications that perform as client devices for the present invention, or as various computer games in order to send queries to users and analyze their responses.

Example 9. Advertising

A promotion or advertising company can use one or more embodiments of the present invention to send advertising to users while they interact with various query and response cycles as provided for by the present invention. Such users, using one or more embodiments, may interact with each other, with celebrities, or with other users as described in EXAMPLE 4, without limitation. The promotion or advertising company may choose to incentivize any user to further interact with the system.

One or more preferred embodiments can be understood in more detail and with more particularity by reference to the further processing approaches and steps that follow below and with illustrative reference to the Figures.

In at least one embodiment, the processing can be illustrated by letting E represent an entities graph, and letting e.1, e.2, . . . e.n be entity types 1 through n. Similarly, let e.1.1, e.1.2, . . . e.1.m be a set of m entities of type e.1. And let entities graph E be infinitely dimensioned.

FIG. 1 illustrates an initial set of connections between a plurality of entity types according to one or more embodiments of the invention. Three different entity types are illustrated, 101-103, each including some exemplary member entities. Connections 104 and 105 depict the initially-available connection between the illustrated entities and each of the entity types. Similar graphs can be created for each type of event (e.g. football game, Academy Awards ceremony, without limitation) for which a preferred embodiment of the present invention would apply. For each such event, a generic ontology can be created for defining connections between entity types which may happen at each occurrence within an event.

For example, still referring to FIG. 1, without limitation, for the event "Academy Awards Ceremony", entity of type "actress" 101, with entity type "actress" 101 denoting which entities of type "actress" (Angelina Jolie being actress.1, Glenn Close actress.2, and so on); with 102 denoting "attire" as the entity type such that "Blouse" is denoted as attire.3, and so on). Similarly. 103 denotes various colors, such that "Green" would be color 3. Entity type "actress" 101 can be connected to entity type "attire" 102 by connection 104 of type "is wearing." Entity type "attire" 102 can be connected to entity type "color" 103 via connection 105. The initial connections are {n:n}, which means that if a connection is defined between entity types a and b, all the entities in the former group are initially connected to all entities in the latter.

It should be understood that a connection between entities can, in one or more embodiments, be considered as a relationship descriptor or predicate (arc) that relates two objects (or nodes) in a semantic statement, or a semantic triple-store, such that numerous additional methods of database storage, including graph-type databases, can be used, and which can allow very rapid analysis of the graph-store utilizing multi-threading processor architectures, optionally arranged in any distributed processing topologies.

In a preferred embodiment, during the training phase of the model (or by analyzing prior events, and/or by applying defined rules for the event type, for example the official rules for a football game), for each point in time (which can alternatively be referred to as an "occurrence" or as an "event element"), the system and/or method can use the predictions of a set of users as to what will happen in order to assign weights to the various connection between the entities (the strength of the outgoing links from each entity are normalized to 1). The weights can be arranged as templates so that no prior knowledge about the particular actors of an event need be required; all that is needed is a general knowledge as to the type of the event.

Still with reference to FIG. 1, when creating entity types 101, 102 and 103, for example, and defining connections 104, all entities are initially connected. Based on the predictions of a set of users, only some of the links will be retained (e.g., all connections having strength below a predefined threshold or zero can be discarded). Once all valid connections have been defined, a preferred embodiment can then calculate the probability of each combination of connections to occur by multiplying the probabilities of all of its "elements" happening together (such as, for example, the probability that actress Angelina Jolie will arrive at the Academy Awards, the probability that she will arrive wearing a dress, and the probability that the dress will be blue).

The training process can be comprised of two distinct processing aspects. The system and/or method of one or more embodiments calculate (1) the users' predictions about future occurrences as well as (2) their impressions about past occurrences (the very near past, such as, for example, without limitation, sometimes only seconds in the past). At any given time, t, users can be presented with two series of questions: (a) questions that ask them to predict what will happen next (i.e., for example, what will be the next occurrence(s) at time t+1, t+2, or at later time points); and (b) what was the occurrence that took place at time t−1, t−2, or earlier time points. The latter question set also consists, in addition to "legitimate" questions designed to infer the sequence of occurrences within said event, of questions designed to detect frauds and intentionally incorrect answers.

Although information about past occurrences and events is usually more solid, the predictions about future occurrences offer two important advantages:

a) they encourage users to participate, as a sort of competition (which one or more embodiments may further realize as a game application of any kind);
b) they confer additional information (which is likely to be more abundant, because of the additional interest) that could be augmented into the data analysis.

By using a "sliding window" technique, the state of each occurrence within an event at each time t is updated at least twice—its initial state is set in time t−1 (as a prediction about the future) and is then modified again in time t+1 (as a question about the past). It should be further understood that either t+1 and/or t−1 can be t+p or t−q, designating any point in the past or the future). In addition, each state may be updated n additional times with n being the size of the sliding window. This is so because a preferred embodiment can use a Hidden Markov Model (HMM) algorithm to update and correct the states sequence. Other preferred embodiments may use other kinds of algorithms. While a preferred embodiment may allocate a lower weight to predictions about future occurrences in comparison to impressions about past occurrences that already happened in the calculation of the probabilities and states, they nonetheless play an important role.

It is important to note that multiple stimuli questions relating to the same occurrence may be created. For example, an occurrence of "Kobe Bryant shot a three pointer from 25 feet" may be a part of an almost identical set of stimuli questions, each specifying a slightly different distance. Each element in the question may vary, which of course leads to a large number of possible states. The likelihood of each state can be managed and determined by the algorithm or algorithms used in a preferred embodiment, including without limitation Hidden Markov Models, Conditional Random Fields, and other suitable methods It should be further noted that multiple algorithms may be used in parallel to create a multi agent system, optionally also using a "mixture of experts" or other ensemble methods to obtain better performance and/or accuracy. It should be further appreciated that the processing of any step or module of the present invention need not be limited to a single application running on a single computing device, and that numerous parallel processing and scalability can be applied to embodiments of the present invention.

During the training phase, the process according to at least one preferred embodiment can compare the predictions (stimuli responses) made by a set of users to the occurrences that actually transpired in the real world and match their prediction responses to "known good" input sources, such as human taggers and other sources of information that become available after an occurrence has been actually happened. A "human tagger" is a person or plurality of people who refine the data captured and processed by the system using human intelligence as well as their personal knowledge and experience as it applies to the analyzed event and its entities, all in order to enhance the accurate of the data during the training phase. When the system is operating in runtime phase, the process already possesses a large states matrix and information about various predictions. For this reason, each iteration only needs to calculate the various probabilities of each observation and it can "predict the past" almost instantaneously after it has occurred. In addition, by analyzing past occurrences, the process can calculate the "real" probabilities (or at least close enough approximation) of options that are likely to occur during an event.

At least one preferred embodiment of the invention can provide for a system that has an elaborate decision graph or state transition diagram, dynamically changing as a result of a live event. The event can be further comprised of multiple occurrences or event elements. Such a decision graph can represent options for events and/or event elements that have taken place and/or are taking place, as well as events that have not yet happened, but which may occur in the future. Some branches of such a decision graph according to one or more embodiments can be mutually-exclusive options; i.e., if one option occurs, then the other option(s) certainly do not occur. Therefore, if a derivative of such an option occurs, then the system can identify with very high probability that the other branch in the decision graph, and all of its derivatives, have been eliminated. For example, if it is given that A and B are mutually exclusive decisions (branches) on the same decision graph, with AA and BB being derivative decisions of options A and B, respectively, then if the system identifies that event BB occurred, the system can calculate with high probability that the entire A branch, and all subsequent options (including AA), have been eliminated. This can be further illustrated by an example, as follows: The system is asked to determine whether the weather today is sunny or cloudy. However, if during another question the user replies that it is raining, then certainly the system can identify that it is cloudy today.

Figure 2:
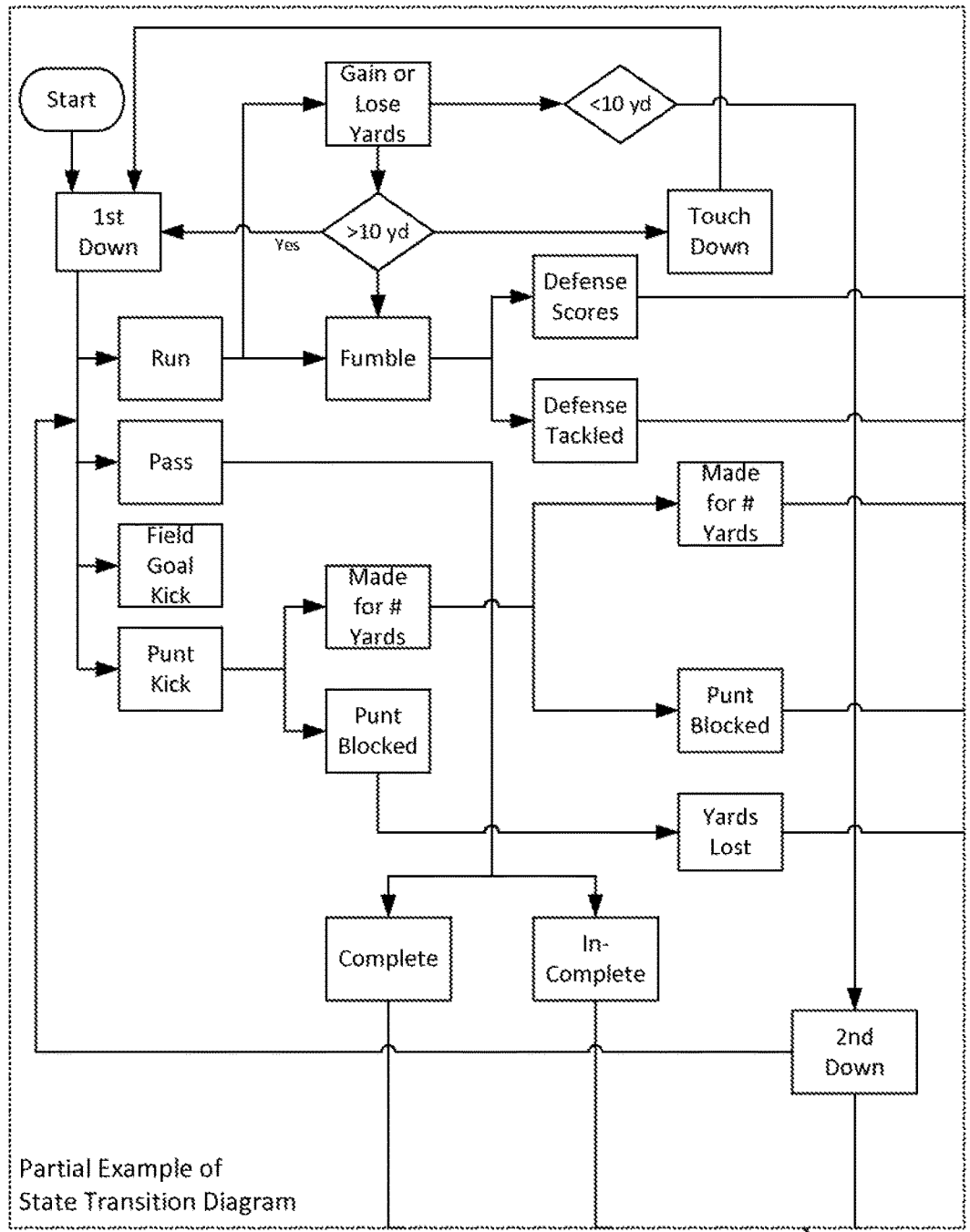
FIG. 2 illustrates an example of a state transition diagram according to one or more embodiments of the invention.

Referring now to FIG. 2, a decision graph 201 depicts a partial description (or an illustrative subset) of the different states and transitions that may occur during a game of NFL Football. It can be appreciated by a person skilled in the art that such a graph may be designed using a plurality of applications, such as, for example, without limitation, Bonitasoft® brand (version 5.5) business process management (BPM) or workflow software, and that the such graphs, optionally implemented as workflows, may be programmatically operated upon by applications such as, for example, without limitation, Apache Software Foundation's jBPM (version 5.4) software package.

A preferred embodiment can provide for modelling the problem described above as a Hidden Markov Model (HMM) problem, where a states transition matrix can be created by transcribing the rules, optionally using a decision graph or state transition diagram, of the event in question into computer-operable instructions. Still referring to FIG. 2, a state mapping or decision graph 201 can represent multiple elements of an event that can flow sequentially from another event element, and/or wherein legal transitions exist from one event element to another. "Legal transitions," as used here signifies those transitions in state space allowed by the rules of a game and/or allowed by the known and/or calculable physical, transactional, logical and/or other constraining requirements associated with a set of one or more event elements that comprise an event state space. The decision graph 201 can be optionally rendered as a state transition matrix, that can be further generated by a training phase (analysis of past events to determine legal occurrences, the likelihood of each occurrence, and optionally further refined by "known good" information such as a transcript of a prior event, comparison to a television recording and/or other data feed). In one or more embodiments, the states transition matrix and the observations matrix (and their probabilities to be connected with each state) can be further generated by analyzing a set of users' predictions. Further information about Hidden Markov Models (HMM) can be found at http://www.cs.sjsu.edu/faculty/stamp/RUA/HMM.pdf, herein incorporated by reference. http://cran.r-project.org/web/packages/HMM/index.html. HMM's can be further understood and implemented by one of ordinary skill in the art by reference to Ghahramani, Zoubin; Jordan, Michael I. (1997). "Factorial Hidden Markov Models". Machine Learning 29 (2/3): 245-273. doi:10.1023/A:1007425814087 (which is hereby incorporated by reference in its entirety).

According to one or more embodiments, the system can use HMM to determine the most likely set of events based on the set of observations provided by users over a certain span of time. By analyzing the observations and the probabilities of transitioning from one state to another (that is, for selecting which occurrence will happen next based on what has actually happened during an event), the system can determine the most likely set of states to have occurred and also correct its predictions when new information becomes available.

Sampling Intervals

It is important to elaborate on the sampling intervals, according to one or more preferred embodiments. The size of the interval that will be used for sampling will be determined based on the following factors:

1) Number of available users: Preferably, the number of users available to the system in one or more embodiments is in the range of 10 to 50 million, more preferably the number of users available to the system is in the range of 10 to 100 million, and most preferably the number of users available to the system is in the range of 10 to 50 billion. However, it is understood that some embodiments of the system and method can allow for as few as any plurality of users.

2) The number of possible likely outcomes—based on the states transition matrix and previously collected observations the system can determine when the range of possible future states is small or large. A small set of possible outcomes will enable an embodiment to approach a smaller number of users and query them with a larger interval. Preferably, the number of likely outcomes is in the range of 1 outcome to 1 million outcomes, more preferably the number of likely outcomes is in the range of 1 outcome to 10 million outcomes, and most preferably the likely outcomes is in the range of 1 outcome to 1 billion outcomes. It will be understood that the system and method of one or more embodiments allow for a number of likely outcomes in the range of 1 to more than 100 billion outcomes.

3) How dynamic is the event—events that are more dynamic, for example basketball or football games require more frequent sampling than a chess tournament. As such, a higher sampling frequency will be required to achieve sufficient accuracy, similar to Nyquist-Shannon sampling theorem (see Jerri, A. J., "The Shannon sampling theorem—Its various extensions and applications: A tutorial review," Proceedings of the IEEE, vol. 65, no. 11, pp. 1565, 1596, November 1977 doi: 10.1109/PROC.1977.10771; incorporated by reference herein in its entirety). A larger number of human users is also desirous in such cases, as it would be difficult for a small number of human users to respond sufficiently quickly and accurately to maintain statistical accuracy by the system. Automated users may of course respond faster. The more dynamic the event, the more users need to respond in order to get good accuracy—in chess a preferred embodiment only needs one user to report and they have 2 minutes to do it per move, with a very limited number of options (based on the state of the chess board): so perhaps in chess an approximate 5 legal moves and 2 minutes are needed to decide. By contrast, in the final minute of a basketball game the method prefers to have a lot of users each responding to a very simple question, and the method prefers a lot of various questions because the numbers of options is very large and the rate of change is also very large. Preferably, the frequency in which the system can send questions and receive responses to/from users is in the range of 5 to 20 seconds, more preferably the frequency in which the system can send questions and receive responses to/from users is in the range of 0.1 seconds to 10 minutes, and most preferably the frequency in which the system can send questions and receive responses to/from users is in the range of 1 picosecond to 100 days;

4) The attributes of available users—the users' location, level of reliability, among other attributes, can all be determining factors in the decision on sampling interval.

Sampling is performed by segmenting the users into groups and then querying the groups of users, by assigning a single query to each group per cycle, and with the understanding the multiple cycles can be executed in parallel, either to the same set of groups or to any set of groups. Each group will be assigned a single "observation" per such cycle and asked to respond about its occurrence. Groups may be queried for more than one type of observation at a time. The questions sent to users may be direct or indirect ones; Indirect ones being used to mask the actual question, but the users' answers to them enable, at minimum, deduction of a "yes" or "no" answer to the predicate.

TABLE 2 below illustrates an analysis of the responses of the users in each group and the calculation of the probabilities.

| Group | Observation | Yes Answers | No Answers | Probability |
|---|---|---|---|---|
| Group_1 | Player X shot from 15 feet | 900 | 100 | 0.9 |
| Group_2 | Player X shot from 25 feet | 600 | 400 | 0.6 |
| Group_3 | Player Y shot from 15 feet | 300 | 700 | 0.3 |

It should be understood that Hidden Markov Models are but one way to implement these steps in at least one preferred embodiment of the present invention, and that other algorithms may be available or may become available in the future, all of which are to be considered within the scope of the present invention.

Figure 3:
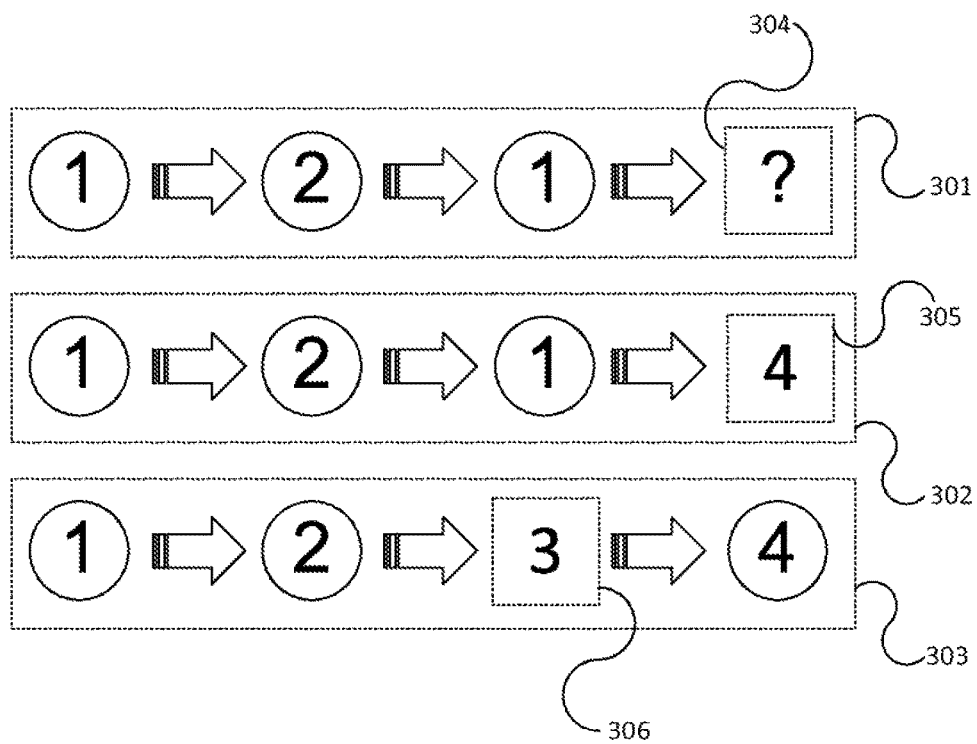
FIG. 3 demonstrates an illustrative process of applying a Hidden Markov Model transformation according to one or more embodiments of the invention.

Referring now to FIG. 3, a generic process of using Hidden Markov Models is depicted, enabling the process to revise its predictions with the arrival of new information. This is especially useful in the case of sports games where the results of a play may be changed due to a judgment call by the referees, or in any other type of event when a series of event elements has one or more elements that can be altered (by after-the-fact revision or by updated calculations with more data). At least one embodiment provides for analyzing event element group 301, wherein the process, analyzes user predictions of a successive number of event element occurrences (shown as an occurrence of "1" transitioning to an occurrence of "2," then transitioning to another occurrence of "1") in order to estimate the probability of the next event element occurrence 304. In event element group 302 the process has used the observations and the transition matrices in order to determine the most likely state of the next event element, 305, which in this illustration is an occurrence of "4." Then, by analyzing the process as a whole in event element group 303, the process can determine that the predicted state of the third event element (or node) 306 of the actual event sequence needs to be updated, in this illustration updating an occurrence of a "1" to and occurrence of a "3."

User Credibility and Time Intervals

At least three major elements dictate a set of users questioning strategy: one element first is how dynamic is the event in question: for example, a football game is much more fast-changing than a chess tournament. A second element is the time that has passed since the user has been presented with the question, and a third element is the user's credibility. While the first element is quite straightforward, the other two elements can be further explained as follows:
1) The time that has passed since the event. A prediction about the future that has arrived long after the event itself is of no use to the system. A simple method, such as provided for by one embodiment, could define a simple rule stating that all predictions that arrive after the event are ignored. However, this approach will not be taking other elements into account: delays in broadcast times are the simplest example, along with geographic distance, among others. Communication delays are also a legitimate reason for a delay in the response.

For this reason, a more preferred embodiment provides for employing an array of features designed to deduce whether or not the prediction is "legitimate." The array of features may comprise, for example, one or more of the GPS location of the phone, the timestamp of the message, the medium used by the user to view the event and the user's credibility score, without limitation.

In an algorithm of one preferred embodiment, the functions responsible for determining whether or not to process an answer returned by the user are the Wait_For_Response( ) function, which records the time the response was captured or returned and the Calculate_User_Response_Time_Fraud_Likelihood( ) function, which returns a number that reflects how legitimate the user's response time is, which number is a credibility metric that is then used this to train the model, group cohorts, and otherwise dynamically adjust the algorithm and which also takes into account how dynamic is the event and the user's credibility.
2) The user's credibility. The credibility of the user is determined by several factors:
   a) Past behavior—by comparing the user's responses to the actual events (either events a set of human taggers determined happened or events which had a high degree of certainty), the method can obtain a solid estimator of its reliability.
   b) Meta-data features—if the user's metadata contradicts the claims made by that user (for example, the user claims to have seen the event "live" while he was 100 km away in this case whatever score he had would be multiplied by zero—he's a fraud.
   c) Trapped by "honeypot questions"—part of the query mechanism generates "honeypot questions", questions that are known to be false and whose only use is to identify users who are not being true. For example, a question may refer to a commercial not shown is the user's claimed location or refer to a weather condition that did not occur.

All these factors, without limitation, can be used to determine the user's "credibility score," along with other data operated on by a preferred embodiment of the present invention. This score will factor the percentage of truthful answers to honeypot questions, the average likelihood (assigned by the HMM) of the observations made by the user and how dynamic the event in question (dynamic events are harder to call correctly). For example, comparing the last minute of an NBA basketball game versus the last move of a chess match: In basketball there could be (for example) 17 different options that occur in the next (for example) 10 seconds, whereas in chess there could be (for example) 3 options in the next (for example) 2 minutes.

As such, low latency and high accuracy are very important for the former basketball example, in order to provide accurate statistics and meaningful probability assessment in a minimum amount of time. Having a large body of users will generally decrease average latency, as some users will respond more quickly than others, therefore enabling the system to use a user credibility assessment metric in order to qualify those users that respond quickly and accurately. A person of ordinary skill in the art can appreciate that the proposed framework for the calculation of the credibility score can be Naïve Bayes or any other classifier, which is capable of taking advantage of the probabilistic nature of the HMM and produce a single value (ranging from 0 to 1) representing the user's credibility. One can further appreciate that in order to simplify the examples herein, a credible user is arbitrarily defined as one that has achieved 80% accuracy in the last 30 minutes, with any further indications of possible fraud. It is further appreciated that a preferred embodiment of the present invention may implement the credibility assessment function illustratively represented in the algorithm by the Calculate_User_Response_Time_Fraud_Likelihood( ) function, which factors a plurality of elements in order to determine if a user is suspected of fraud and to optionally decide whether or not to use the responses provided by the user. For example, a first user might answer 90% correctly over an interval of 30 minutes, however their latency might be more than one standard deviation away from the average latency for the group that first user is assigned to, and the first user's physical location has been determined to be outside of the event venue, such that the process can generate a decision that the first user is viewing the event via some broadcast medium with at least that medium's inherent latency and/or propagation delay. In contrast, a second user who answered only 80% accurately but has been determined to be inside the event venue and the second user's latency was less than half of one standard deviation away from the minimum latency of any user in the system is assumed to be reliable enough and accurate enough for this example purpose.

Processing Steps

One or more preferred embodiments of the invention can provide for a series of steps of processing information that are accomplished by machine instructions directing a computer processor. The software program of one such embodiment can be further described below in Tables 16-26, wherein the first column lists the line number (and matching figure and step) of the algorithm, the central column comprises descriptive commentary on the function of the software step and the right column depicts pseudo code as may be realized by at least on embodiment of the present invention.

The system can leverage what it knows about what happened or is about to happen and combine that with its analysis of the user's responses to know what teams, actors, and so on (without limitation) the user favors. Then, the system can leverage the propagation delay of the user to anticipate if that user will be happy or sad in the near future and send that signal to an advertising system that will offer that user an emotionally-contextual advertisement.

Example 10. Basketball Use Case

The work process of a method according to at least on preferred embodiment can be further illustrated through a use case example. In this example, the a basketball game is being analyzed. For simplicity's sake, it can be further assumed that only the following entities exist—"team", "player" and "ball." The following connections exist (among others):

a) "shooting a hoop from X feet"—a connection between player and ball (multiple instances of this connection exist, one for each possible distance)

b) "Has the ball"—a connection between a player and itself c) "Blocked by player Y"—a connection between two different player entities An example of the way these connections are defined is presented in Table 3.

TABLE 3 below illustrates the connections among entities of EXAMPLE 7.

| Entity_1 | Entity_2 | Connection |
| --- | --- | --- |
| Player | Ball | Has_ball |
|  | Player | Block_by |
|  | Ball | Shooting_hoop_from_5_feet |
|  | Ball | Shooting_hoop_from_10_feet |
|  | Ball | Shooting_hoop_from_15_feet |
|  | Ball | Shooting_hoop_from_20_feet |
| . | . |  |
| . | . |  |
| . | . |  |

To assure high initial accuracy and to minimize generation of irrelevant questions, it may be desirous to train the model before operating it on a live event in real time. This can be done in any number of simulation scenarios, including by allowing a group of users to watch a pre-recorded past event and to capture their observations and predictions for each point of time within the pre-recorded past event, or to input a prior transcript of the event into the model's training process. Before the training phase event begins, a default time interval is defined (performed when the function is activated, in line 1000 of Table 15). This time interval (for example, 2 seconds) will dictate the frequency for which each group of users will be chosen and queried either about events that have occurred or about their predictions for the future (lines 1020 and 1030 of Table 15). However, this interval may either increase or decrease based on the model's assessment of the current state—while a time out is called, for example, the interval may be increased to 30 seconds in order not to annoy the set(s) of users engaged by the system, yet still allow some observations to be captured, which can be especially important in order to determine the exact time at which the timeout ends and normal play resumes. The current state is updated after every iteration (line 1045 of Table 15) in order to optimally assess what the time interval should be.

In at least one preferred embodiment of the present invention, the querying process works as follows: for the point of time the users are to be queried about (at least once for the past and at least for the future, the process begins by selecting which the states the users are to be queried about (line 1120 of Table 16). For example, a preferred embodiment of the present invention may iterate through all possible states in the state transition table and select the top 50 possibilities based on their statistical likelihood of occurring, although other embodiments may use other methods. Next, analysis of the set of answers (about the past) and prediction (about the future) that were obtained in previous querying rounds is performed. The analysis of the sequence and the selection of the states is done by the Hidden Markov Models (HMM), described in later paragraphs below. Based on the state of the event that is deduced to be in at the time (for example, "group A has the ball, the ball is 30 feet from the hoop, player X has the ball"). Examples of possible questions are presented in Table 14. It can be appreciated by a person of ordinary skill in the art that functions can be included in the process to iterate through the possible states and connections of an event at any point of time and can further utilize Natural Language Generation techniques, including, for example, without limitation, the SimpleNLG method (A. Gatt and E. Reiter (2009); SimpleNLG: A realisation engine for practical applications. Proceedings of ENLG-2009; herein incorporated by reference in its entirety) to create human-readable questions based on the various possibilities for each future state to occur. It should be further appreciated that such questions can be sent to users via standard HTTP or other IP-based connections to either a standard web browser used by the user and/or to any number of connected proprietary applications employed by an embodiment of the present invention.

Training Phase

The training phase begins by calling the "main" function, which the process initializes with two parameters: a) the event parameter, which contains information about the event its entities, the connection between them and all other relevant attributes; b) the time interval, which provides the default interval for an iteration in the system (within an iteration, sets of questions are sent to users to users and the users' responses are processed).

The process begins by extracting the Current_State: the possible initial state(s) of the event and assigning them to a dedicated variable (line 1005). This is done in order to better enable the HMM process to identify the likely states (by providing an initial set from which to deduce the observation about which the users will be queried). In a basketball game, for example, the initial state would be {Team_X_on_the_offensive, Team_Y_on_The_Offensive}.

Once the initial states have been identified, the iterative questioning of the users and the analysis of their responses begins. Every time interval t (whose frequency is determined both by the default time interval and by the current state the model is presumed to be in at the moment), the following process takes place:

First, obtain the users' predictions about the future and impressions about the past (lines 1020, 1030 of Table 15). This process is identical in both cases (except for the time t for which it is executed) and therefore it is described once here in general.

This function begins by initializing the object that will contain the predictions made by the users (line 1110 of Table 16).

Then, the States object (which contains all the possible states according to the definitions of the event) is initialized and populated. The possible states are the states that are reachable from the current presumed state (that is, the transition probability is greater than zero).

The next step consists of generating the User Groups Matrix: the groups of users that will be assigned to each state (line 1130 of Table 16). The number of groups equals the number of possible states (shown in Table 4).

TABLE 4 below illustrates the segmentations of questions to different groups.

| Group Assignments | Observation queried |
|---|---|
| Group_1 | Player X shot from 15 feet |
| Group_2 | Player X shot from 25 feet |
| Group_3 | Player Y shot from 15 feet |
| . | . |
| . | . |
| . | . |

Following the creation of the groups, the process creates Questionnaires: the various questionnaires that will be used by the various groups (line 1140 of Table 16). The questions may be direct ("did player X score 3 points?"), implied ("Did player X dance when he scored 3 points?") or negative ("did player X miss the basket?"), but all questions, after data analysis, will enable deduction whether or not the said event took place.

Once this has been completed, for each group the following (starting at line 1160 of Table 16) steps are performed:

First, obtain the details of all users who are available for querying (line 1410 of Table 19). Then, analyze the number of available users and prioritize the possible states in order to determine which of them will be analyzed if the number of users is not sufficient to analyze them all (line 1420 of Table 19).

Following that, attempt to determine how dynamic the event is at the moment (that is, how likely is the next iteration to arrive). This action (line 1430 of Table 19) determines how long to wait for the answers to arrive.

The next step is to assign users to each group. This is executed by the function Assign_Queries_To_Users, called in line 1440 of Table 19. The result of this function is a matrix containing the assignments of users to each group. An example of this is presented in Table 5.

TABLE 5 below illustrates an assignment of users to query groups, further recording the time each query was sent to each user.

| Users | Group_Assignment | Transmission_Time |
|---|---|---|
| User_1 | Group_1 | T |
| User_1 | Group_1 | T |
| User_1 | Group_1 | T |
| User_1 | Group_2 | T + 1 |
| User_1 | Group_2 | T + 1 |
| User_1 | Group_2 | T + 1 |
| . | . | |
| . | . | |

Once the users have been assigned, the questionnaires are sent and the system waits for responses (line 1450 of Table 19).

When the responses are obtained, they are translated into a binary representation indicating whether the user replied that the state he was asked about took place (1) or not (0). Once these answers are gathered, the matrix in Table 5 above is populated with two additional columns (shown in Table 6), recording the responses and their respective arrival times.

TABLE 6 below illustrates an assignment of users to query groups, further recording the time each query was sent to each user and the time when the response was received.

| Users | Group_Assignment | Transmission Time | Responses | Response Time |
|---|---|---|---|---|
| User_1 | Group_1 | T | 1 | T + 30 sec |
| User_1 | Group_1 | T | 0 | T + 25 sec |
| User_1 | Group_1 | T | 1 | T + 12 sec |
| User_1 | Group_2 | T + 1 | 0 | T + 30 sec |
| User_1 | Group_2 | T + 1 | 1 | T + 34 sec |
| User_1 | Group_2 | T + 1 | 1 | T + 33 sec |
| . | . | . | . | . |
| . | . | . | . | . |

Once a sufficient number of responses have been gathered, the results (line 1480 of Table 19), are processed to remove responses that appear to be fraud. Since there are "yes" and "no" answers for the occurrence of each event, it is now possible to analyze them and calculate the probability of each event (see Table 7).

TABLE 7 below illustrates the observation probabilities derived from user responses to queries.

| Group_1 | Observation | Yes Answers | No Answers | Probability |
|---|---|---|---|---|
| Group_1 | Player X shot from 15 feet | 900 | 100 | 0.9 |
| Group 2 | Player X shot from 25 feet | 600 | 400 | 0.6 |
| Group_3 | Player Y shot from 15 feet | 300 | 700 | 0.3 |
| . | . | . | . | . |
| . | . | . | . | . |
| . | . | . | . | . |

These probabilities are returned in the object Analyzed_Responses.

Once the predictions about the future and the impressions about the past have been obtained, the process combines them in order to calculate the overall probability of each observation. This is done in line 1040 of Table 15. In which the process combines the two sets of probabilities into one (add the right figure with the circles). Once this is done, each observation is assigned with a single probability of its occurrence (see Table 8)

TABLE 8 below illustrates the collated prediction probabilities.

| | Player X shot from 15 feet | Player X shot from 25 feet | Player Y shot from 15 feet | Player Y shot from 25 feet | No one shot to the hoop |
|---|---|---|---|---|---|
| Prediction | 0.9 | 0.6 | 0.3 | 0.2 | 0.1 |

When the probabilities in Table 8 are normalized to one, the probabilities in Table 9 are obtained.

TABLE 9 below illustrates the normalized prediction probabilities from TABLE 8.

| | Player X shot from 15 feet | Player X shot from 25 feet | Player Y shot from 15 feet | Player Y shot from 25 feet | No one shot to the hoop |
|---|---|---|---|---|---|
| Prediction (normalized) | 0.428571 | 0.285714 | 0.142857 | 0.095238 | 0.047619 |

After the probabilities are calculated, they can be used to determine what the most likely next state is, and the process iterates again for the next time interval.

Once the event has been concluded, a sequence of observations and states has been obtained. Using these, it's possible to generate the State_Transition_Matrix and Observations_Matrix objects (lines 1070 and 1080 of Table 15).

TABLE 10 below illustrates an example of an Observation Matrix.

| State/Observation | Player Y committed foul on Player X | Player Z committed foul on Player X | Ball enters hoop | Ball misses hoop |
|---|---|---|---|---|
| Player_X_Shooting_hoop_from_5_feet | 0.05 | 0 | 0.5 | 0.37 |
| Player_X_Shooting_hoop_from_10_feet _ | 0.08 | 0.08 | 0.4 | 0.44 |
| Player_X_Shooting_hoop_from_15_feet | 0.1 | 0 | 0.35 | 0.55 |

TABLE 11 below illustrates an example of a States Transition Matrix.

| | Team X is on the offensive | Player 1 Shooting hoop from 5 feet | Player 2 Shooting hoop from 5 feet | Player 3 Shooting hoop from 5 feet | Player 4 Shooting hoop from 5 feet | ... |
|---|---|---|---|---|---|---|
| Team X is on the offensive | 0.1 | 0.05 | 0.06 | 0.04 | 0.05 | |
| Player 1 Shooting hoop from 5 feet | 0.02 | 0.1 | 0.08 | 0.1 | 0.04 | |
| Player 2 Shooting hoop from 5 feet | 0.06 | 0.02 | 0.1 | 0.07 | 0.07 | |
| Player 3 Shooting hoop from 5 feet | 0.06 | 0.04 | 0.05 | 0.1 | 0.04 | |
| Player 4 Shooting hoop from 5 feet | 0.07 | 0.1 | 0.05 | 0.04 | 0.1 | |
| . | | | | | | |
| . | | | | | | |
| . | | | | | | |

The final step of the training phase is the creation of the affinity matrix (using the Affinity_Matrix object). This is a user-entity matrix, where entries in specific user-entity cells indicate that the user has a certain sentiment towards the entity. A numeric values is used to represent the strength of the connection. It should be noted that for some users, the some of the cells in the matrix will remain empty.

TABLE 12 below illustrates an example of an Affinity Matrix.

| | Entity_1 | Entity_2 | Entity_3 | Entity_4 | Entity_5 ... |
|---|---|---|---|---|---|
| User_1 | | 2 | | 4 | |
| User_2 | | | | | 5 |
| User_3 | | | 4 | | |
| . | | | | | |
| . | | | | | |
| . | | | | | |

The Runtime Phase

The running phase is initialized with the following parameters: the event (with the same attributes as those of the training phase), the default time interval (can be the same as was used in the training phase, but there is no such requirement) and the two matrices which are among the products of the training phase—the states transitions matrix and the observations matrix.

The runtime phase begins by obtaining the initial state(s) of the event—as was done in the training phase (line 2005 of Table 22).

Then, for each time interval, do the following:
a) Get the user predictions for the past and the future (lines 2020 and 2022 of Table 22), combine and normalize them (lines 2024 and 2030 of Table 22).
b) Generate a temporary matrix that contains the probabilities of the observations made by the user for the current iteration (line 2040 of Table 22). This temporary matrix contains the following:

TABLE 13 below illustrates a temporary matrix containing the user observation probabilities.

| | Player X shot from 15 feet | Player X shot from 25 feet | Player Y shot from 15 feet | Player Y shot from 25 feet | No one shot to the hoops |
|---|---|---|---|---|---|
| Prediction (normalized) | 0.428571 | 0.285714 | 0.142857 | 0.095238 | 0.047619 | c) Update the states sequence based on the new information (in a preferred embodiment, this is done with Hidden Markov Models using the Baum-Welch algorithm or any of its derivatives, for example Baggenstoss, Paul M. "A modified Baum-Welch algorithm for hidden Markov models with multiple observation spaces." Speech and Audio Processing, IEEE Transactions on 9.4 (2001): 411-416.)
d) Present commercial content to the users, based on the current events and their affinity matrix values.
e) Update the user-entity affinity matrix. This matrix is the same one that was generated in the training phase, but additional values will be added to it as more and more information is collected from and about the users, due to the continuous interaction with them.
f) The number of groups is dependent both on the number of available users (spread over the time intervals) and that of the possible states. For demonstration purposes, a simple allocation is applied, designed to ensure that the responses the system obtains are certain to be true with a statistical significance of 90% (assuming a normal distribution in user responses), however one skilled in the art can appreciate that other methods of group segmentation can be realized in one or more embodiments of the present invention, and all such methods are incorporated herein in their entirety. For example purposes, the method only queries users whom the process deems "trustworthy" (users whose past responses have accurately coincided with actual data gathered during past events or within a past timeframe of the current event).
g) Once the groups have been generated, questions are allocated to each group (line 1140 of Table 16). The questions are derived from one state of the set of possible ones the system has previously generated. The questions can be derived automatically (for example, one possible question for the state "group A has the ball, the ball is 30 feet from the hoop, player X has the ball" is "did player X drop the ball 30 feet from the hoop?"), and multiple questions can (and are likely to) be generated for each state. Questions can also come from other users or from cohorts of the system (human or mechanical). Answers can come from the body of users or from cohorts of the system (human or mechanical). In addition to computing user reliability, external data can be used to arbitrarily define the reliability of any user, group or cohort, for example to enable certain trusted users to be assigned a high reliability ranks, for example if an expert basketball referee would become an employee of the operators of an embodiment of the present invention, and would then provide human-tagged input, optionally via the form of past impressions, for which the system will fix their probability and credibility as, for example, 100%. Similarly, external data which is known to be accurate can be incorporated into the process as past impressions that with a fixed probability and credibility, for example, of 100%.

TABLE 14 below illustrates exemplary questions (both on past and future events) presented to users.

| State | Question Type | Question Text |
|---|---|---|
| Player_X_Shooting_hoop_from_5_feet | Past | Did player X shoot a hoop? |
| Player_X_Shooting_hoop_from_5_feet | Past | Was a shot made from X feet? |
| Player_X_Shooting_hoop_from_5_feet | Past | Was the shot successful |
| Player_X_Shooting_hoop_from_5_feet | Future | Will a "time out" be called? |
| Player_X_Shooting_hoop_from_5_feet | Future | Will Player X shoot a hoop again in the next minute? |
| Player_X_Shooting_hoop_from_5_feet | Future | Which player will be MVP? |

Once the groups and queries are created, each group is assigned a query (line 1160 of Table 16) and query is sent to all the group's members. Once the queries are sent, the process waits for an answer from the users. The span of time the process may wait for each user to respond depends on a set of factors: for example, preferably the user's reliability metric (past on past interactions), more preferably also the user's location (determined by GPS, user's claims, connection metadata, phone metadata, audio content recognition and other signals as stated herein and otherwise found in the industry), and most preferably the medium through which the user is likely to obtain information about the event and so forth. Different embodiments may opt for any mixture of parameters, and that a person of ordinary skill in the art will appreciate that any number of such parameters can be collected and used by an embodiment for this purpose.

Once the number of obtained answers reaches a satisfactory number—one that enables the method to obtain statistical significance—the system calculates the probabilities of the perceived events (Table 16, line 1170). For example, if 7000 users indicated the basketball shot was "in" and 3000 said it was "out", the probability assigned to the former observation is 70% and the probability assigned to the latter is 30% (for ease of reference, the term "observation" is used in accordance with the terminology used by Hidden Markov Models as previously cited herein and further described below). One can appreciate that Hidden Markov Models are merely one possibility for the sequencing algorithm and that other methods are available and will become available, and the scope of the present invention is intended to not be limited to only that sequence algorithm described for this example of at least one preferred embodiment.

Once this iterative loop process of Function 1100 shown in Table 16 is completed, the observations made by the groups of users being iterated currently are added to a "container" object (Table 16, line 1180) and once all groups are queried this container is returned to the parent function (Table 16, line 1190). Note that this process can be distributed to a plurality of computing devices, optionally in different geographic regions, which perform this operation in parallel to allow analysis of a very large number of users and/or groups in a very small amount of time.

Once the predictions (about the future) and impressions (about the past) for the entire event are obtained, the event is over, and all the raw data are available), then it is time to combine them (Table 15, line 1040). In one embodiment, this can be done by assigning, for example, a 2:1 ratio to past observations versus future predictions. Obviously, more advanced methods can be applied, but at least one preferred embodiment can use this simple approach. This process is presented in FIG. 4. Should the need arise, the model is capable of functioning even when only partial information about the event is available. In a preferred example the process is described using the entire event.

Figure 4:
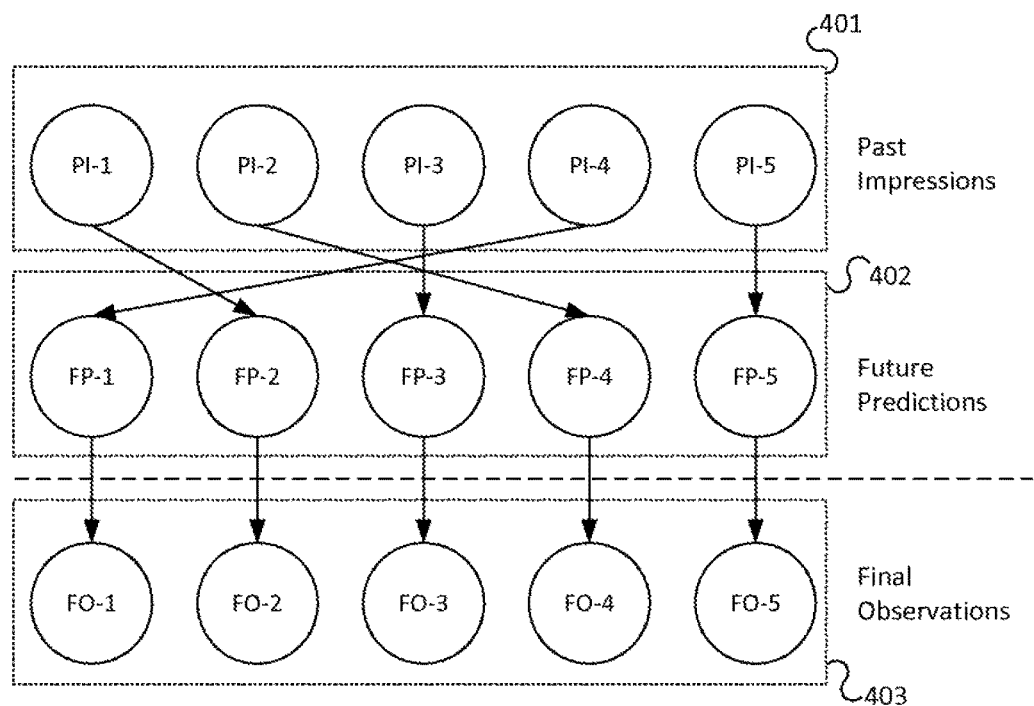
FIG. 4 illustrates paths of reaching a final observation through a state-transition analysis based on past impressions and future predictions according to one or more embodiments of the invention.

Referring to FIG. 4, a generic explanation of the process by which past impressions, future predictions and final observations are determined by the system. In this example, past impressions relating to t−1 401 collected from users at time t are combined with future predictions collected from the users at the same time t, asking the users what they predict will happen at time t+1 402 to create the final state observations 403 that will be used by the HMM. The probabilities of each observation are calculated separately for the past impressions and the future predictions. Once the probabilities are calculated, they are integrated into a final observation. For ease of reference, the method used for combining the probabilities is a weighted averaging technique where the weight assigned to past impressions is by default twice that of future predictions. This ratio may be modified by other preferred embodiments of the present invention, for example based on user reliability, response latency, external data (such as sensory data from one's phone phone) and other external factors. Continuing the example, a first past impression. PI-1, can be matched with a second future prediction, FP-2. Once more data is processed by the HMM, resultant Final Observation FO-2 is deemed to have the highest statistical probability that FO-2 has actually occurred.

Once a unified set of observations is created, it is possible to generate the observation states which are an integral part of the Hidden Markov Model (Table 15, line 1050). This is done in the following manner for each pair of entities ("player and ball" or "player1 and player2"), the method checks whether a connection between them is deemed possible by the definition of the event (Table 17, line 1230), as it was specified during the definition of the event. If the connection is possible and the input provided the users support its existence, then the program creates the observations state that represents the connections and add it to a list of observation states (line 1240 of Table 17). Once all entity combinations have been analyzed, the set of observation states is returned (Table 17, line 1250).

Once all the observations are obtained, the system can generate the states transition matrix (Table 15, line 1060). This matrix can be defined by a set of domain experts, and it defines all the "legal" transition between states in the event "eco system."

Example 11. State Transitions

A further example will assist describing the concept of state transitions in accordance with at least one preferred embodiment of the invention: during the above-mentioned basketball game, it is possible to transition from a state of "foul committed" to a state of "penalty shot." This state, in turn, can transition to another "penalty shot" or to "Player X has the ball." An illegal transition would be from "player X from team 1 has the ball" to "player Y from team 2 shooting hoop from 30 feet"; a state such as "Player X loses ball to player Y" must first take place. An example of the possible state transitions is presented in FIG. 5.

Figure 5:
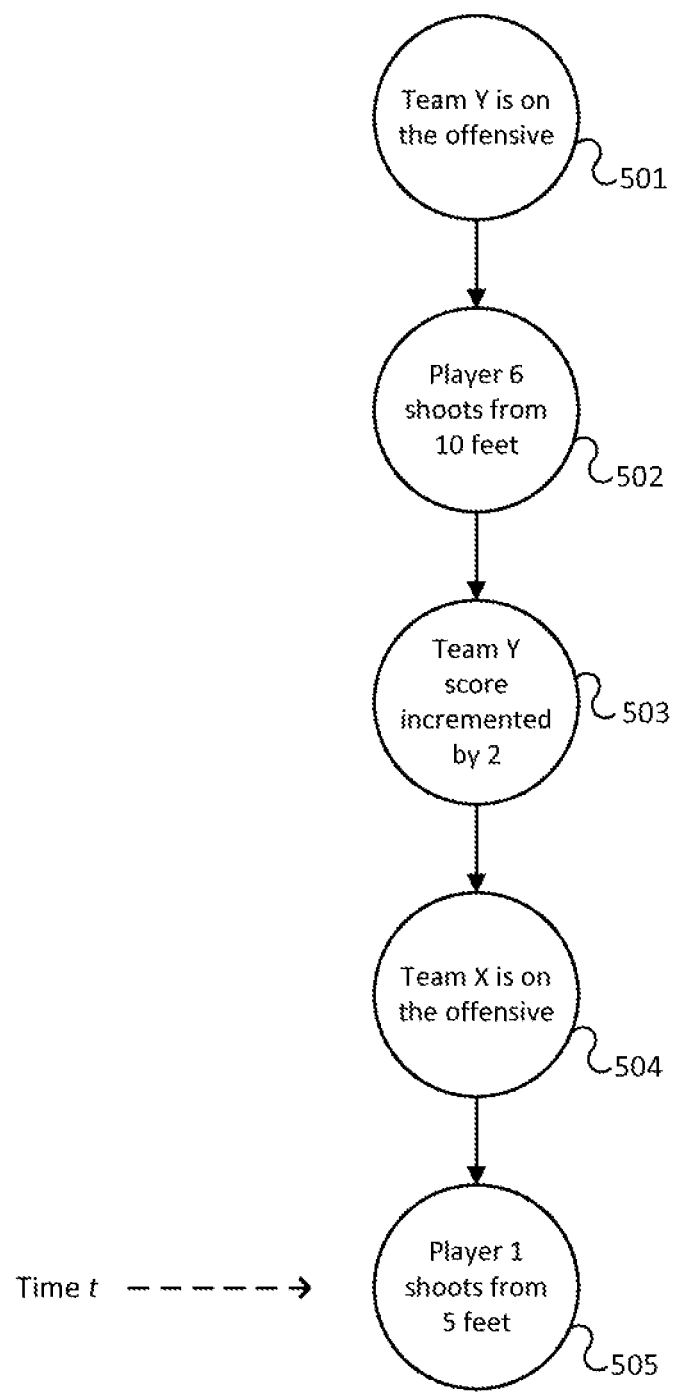
FIG. 5 depicts a potential sequence of event elements within an event according to one or more embodiments of the invention.

Referring to FIG. 5, a chain of events at a point in time t can be depicted according to at least one preferred embodiment, for example one analyzing an exemplary basketball game. Sequence 501-505 show the sequence of transitions of the state of the game from one to the next, in this case with team Y being on the offensive 501, player 6 (inferred to be from team Y) shooting the ball from 10 feet 502, followed by team Y's score being incremented by two 503, thereby inferring that a basket had been made. Next, the system can infer that team X is now in possession of the ball, as it is on the offensive per 504 and player 1 (inferred to be from team X) shoots the ball from five feet 505 at time t.

As stated, at this point in time, the system begins another iteration of the algorithm (as depicted in line 2010, Table 22). Once again, the time interval between two subsequent runs is determined by the time interval set by the modeling addition to the system's assessment of the current state, as defined in line 2075 of Table 22. Based on the current state of the state transition table, ("player 1 shoots from 5 feet") the system generate queries regarding the chances of the shot succeeding (the future) and regarding the distance from which the shot was thrown (the past). This is described in line 2020 of Table 22.

Once a sufficient number of answers has been obtained, an embodiment provides for normalizing the probabilities of all observations to one (line 2030 of Table 22) and then generating the top likely observations (line 2040 of Table 22). Using these observations, the method can use the matrices presented above to update a perceived chain of events (line 2050 of Table 22).

Figure 6:
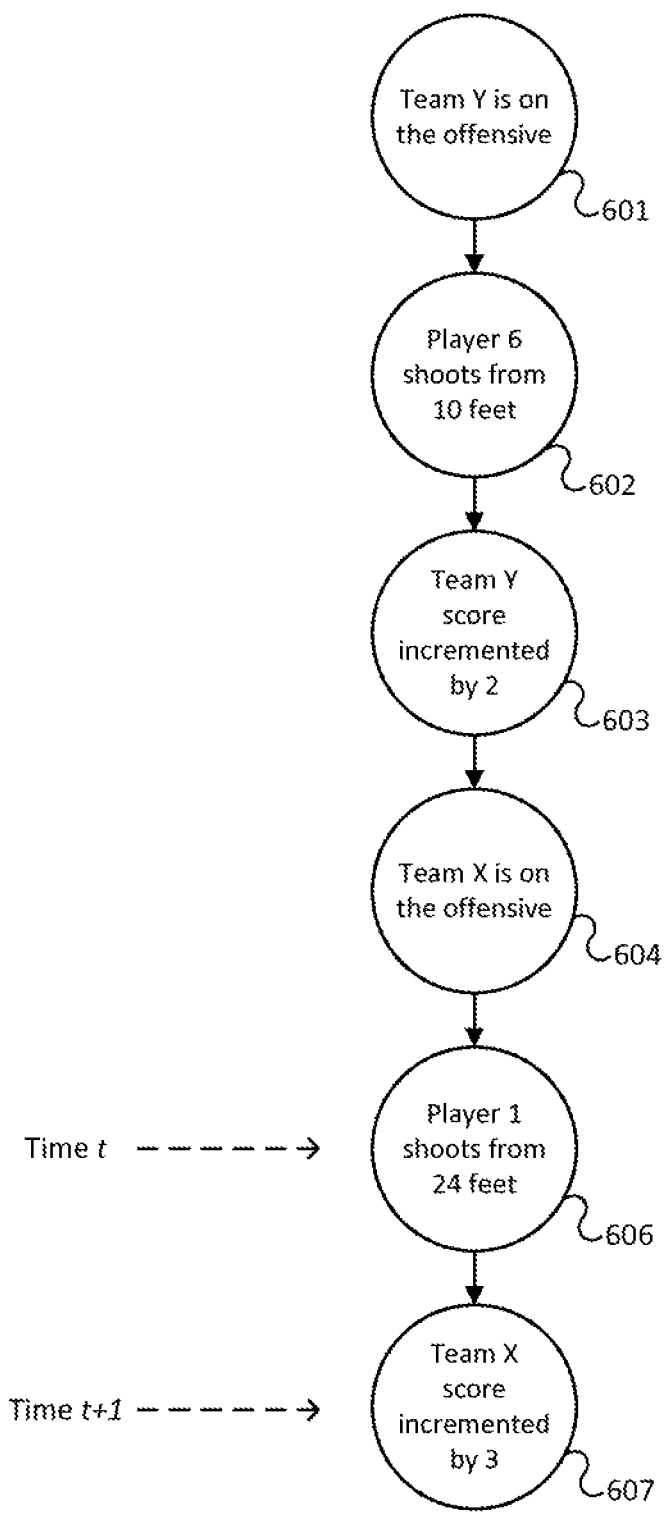
FIG. 6 depicts a further potential sequence of event elements within an event according to one or more embodiments of the invention.
Figure 8:
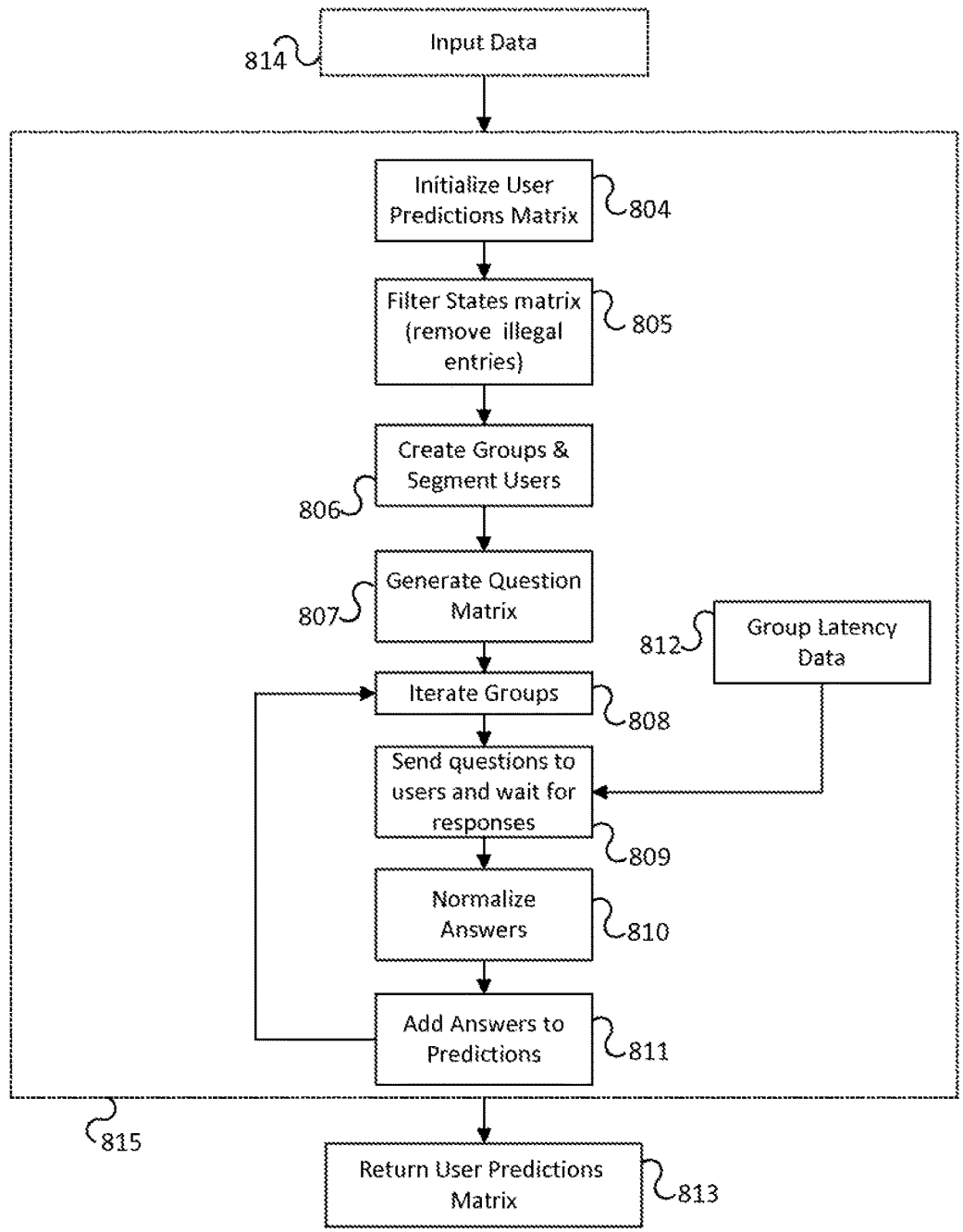
FIG. 8 shows steps for processing and transforming inputs in order to return a user prediction matrix according to one or more embodiments of the invention.

For simplicity of this example, it can be assumed that there is only one likely observation—that player 1 shot 3 points. This conclusion is reached following the analysis of past impressions and future predictions, as depicted in FIG. 4 Given this observation (and since there is zero probability that a shot from 5 feet could result in 3 points), the method can update its model and conclude (after reassessing all state transition probabilities) that player 1 shot the ball from at least 23 feet 9 inches (2013 NBA rules), as defined in the state transition diagram 201 and depicted in FIG. 2. As a result, the system updates the chain of events, as shown in FIG. 6:

Referring to FIG. 6, a revised chain of events at a point in time t+1 (relative to time t of FIG. 5) can be depicted according to at least one preferred embodiment, for example one analyzing an exemplary basketball game. Sequence 601-604 is the same as sequence 501-504 (respectively) of FIG. 8, show the sequence of transitions of the state of the game from one to the next, in this case with team Y being on the offensive in step 601, player 6 (inferred to be from team Y) shooting the ball from 10 feet in step 602, followed by team Y's score being incremented by two in step 503, thereby inferring that a basket had been made. As mentioned in step 504 the system can infer that team X had possession of the ball, as it was on the offensive and player 1 (inferred to be from team X) was believed to have shot the ball from five feet in step 505. However, new observations have since arrived, suggesting that team X's score was incremented by 3 points, mandating an update to the sequence and increasing the distance thrown from 5 feet to at least 23 feet 9 inches, depending on the probabilities defined in the state transition table. As the system iterates through time t+2 and onwards, the actual distance will be derived by analyzing ensuing observations as well.

Finally, the method generates the final component needed for the HMM process—the observation matrix. This matrix denotes the likelihood of obtaining a certain observation at a certain state, thus enabling the probabilistic process of the HMM to "interpret" the observations obtained from a set of users. The process used to generate this matrix is called in line 1070 of Table 15.

In at least one preferred embodiment, the process used to generate this matrix can be as follows: for each state (line 1320 of Table 18) the method analyzes each observation (line 1330 of Table 18) and checks whether the observation is possible (line 1340 of Table 18), as was defined so by the experts who set the parameters of the event prior to the experiment. If the observation is "legal", then the system assigns it to the said state with its probability (line 1350 of Table 18), as was determined during the analysis of the users' responses. This process results in a table (or matrix) where for each state/observation combination, a value representing its likelihood is present. An example of such a data structure is presented in Table 11.

This process is repeated iteratively throughout the course of the event. It should be noted that the present invention is by no means limited to only modifying the latest state in the chain: additional information from users with higher latency will also be taken into account (based on reliability and fraud filtering) and may very well be used to update the events. For example, in the case of a shot that was later disqualified by a referee only the responses received after the referee's call will contain "correct" observations. By maintaining and updating all observations and probabilities (for any amount of time) the method can address this issue.

The final component is the manner by which at least one preferred embodiment can utilize this information for commercial purposes. This is done in the following way: using the affinity matrix (generated in the training phase, if available) and the current affinity of the user to entities involved in the current state of the events chain (line 2060 of Table 22), the system attempts to determine whether the user has a strong positive affinity to any of the relevant entities. By iterating over all possible entities (for every user), it is possible to identify the entities for which the user has the greatest positive affinity (lines 2210-2240 of Table 24) and then either generate and send relevant advertisements, promotions, or other similar material, and/or signal an external system with this data for any action that system may then take. Related methods of targeted advertisement can use existing methods in the field of Recommender Systems presented by academia and others. The methods that can be used for identifying entities for which users have high affinity include collaborative filtering (Koren, Yehuda, and Robert Bell. "Advances in collaborative filtering." In *Recommender Systems Handbook*, pp. 145-186. Springer US, 2011,) and matrix factorization techniques including SVD (Weng, Xiaoqing, and Junyl Shen. "Classification of multivariate time series using two-dimensional singular value decomposition." *Knowledge-Based Systems* 21, no. 7 (2008): 535-539), both of which are incorporated herein by reference in their entirety.

Figure 7:
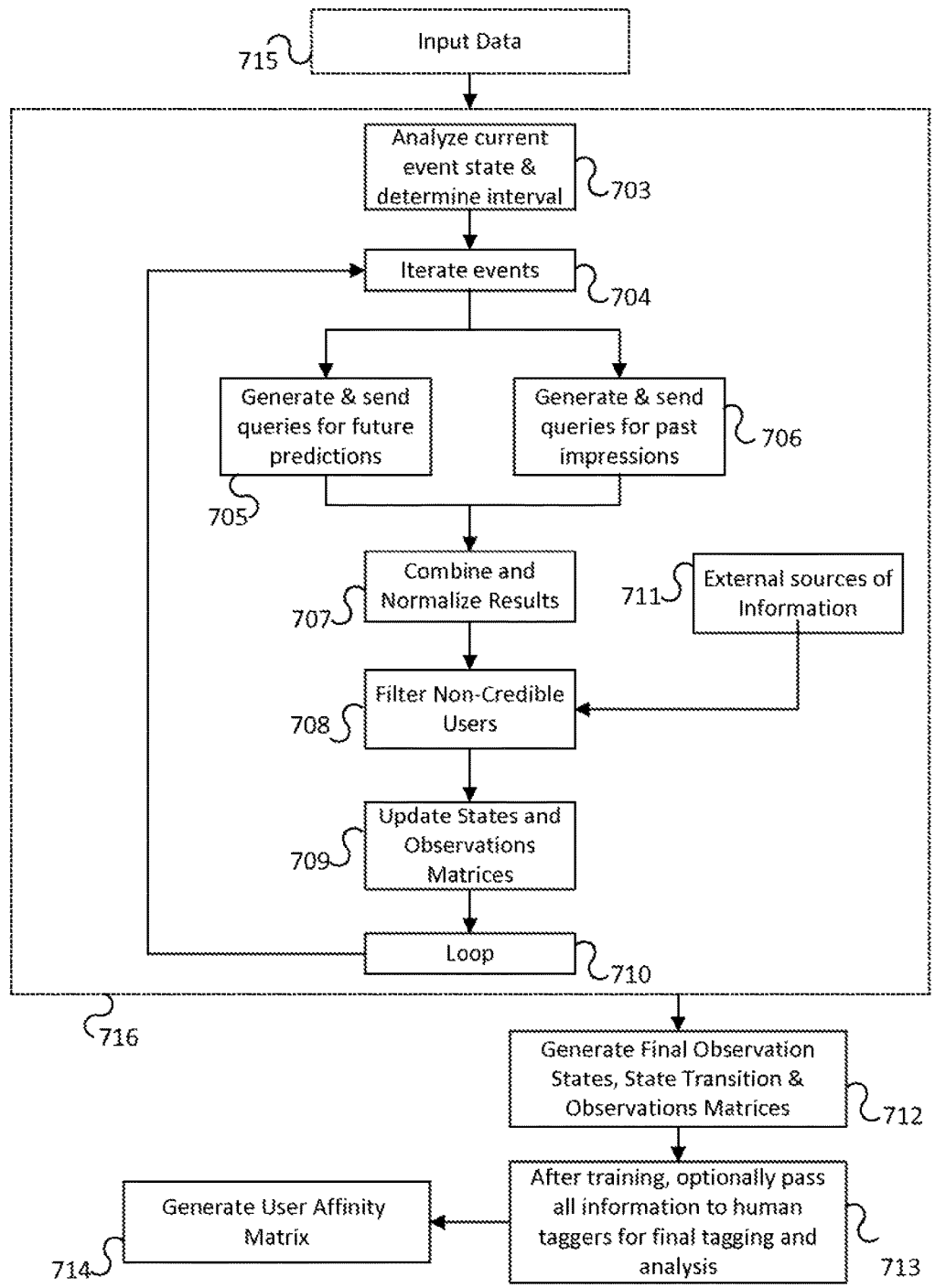
FIG. 7 shows steps for processing and transforming inputs in order to generate output matrices according to one or more embodiments of the invention.

FIG. 7 depicts an exemplary computer function for the training phase of the proposed method. Processing group 715 comprises input data including event information and an initial time interval. Main processing group 716 comprises the event state query step 703, determines the current event state, followed by loop 704 which iterates through each occurrence within a series of occurrences that comprise an event. Actual splits between occurrences can be time based, rule based, play based, external input (human, data or otherwise, including wireless signals, GPS location and time, microphone input, social media connections, interactions and check-ins, information prompts responses, without limitation) or otherwise, or any combination thereof, without limitation. Step 705 and 706 may run in parallel, sending questions to users and receiving the user responses by calling the function depicted in FIG. 8 twice: once for future predictions in step 705 that were captured prior to the selected occurrence of the same event (or using data from past events, or any combination thereof) for each of the questions about said selected occurrence, and a second time to receive past impressions in step 706 that were captured after said selected occurrence occurred (following the selected occurrence of the same event or using data from other events, or any combination thereof, without limitation) for each of the questions about said selected occurrence. Then, step 707 combines the results of both the future predictions from step 705 and past impressions from step 706 that were collected into a unified User Predictions Matrix which is then filtered by step 708 by calling the function on FIG. 17, optionally using external data sources 711 which may include human or machine generated data, including wireless signals, GPS location and time, microphone input, social media connections, interactions and check-ins, information prompts responses, without limitation. Step 709 then updates the current Event State and Observation Matrices, assessing most probable State Transitions and selecting the smallest time interval allows the method not to miss any occurrence yet not create excessive questions to users, prior to step 710 looping back to step 704 to process the next occurrence. After processing all event occurrences, step 712 combines the future and past user predictions captured from the users and updates the State Transition Matrix and the Observation Matrix, containing a possible a matrix of states (combinations of entities and occurrences whose chance of happening is greater than a threshold), by calling the function on FIG. 19. One ordinarily skilled in the art will appreciate that a preferred embodiment may then provide for human or external input to be used to further refine the data in step 713, for example using the a supervised learning method such as "The Wekinator" (Fiebrink, R., P. R. Cook, and D. Trueman. "Human model evaluation in interactive supervised learning." Proceedings of the SIGCHI Conference on Human-Computer Interaction (CHI'11), Vancouver, BC, May 7-12, 2011.). Finally, the User Affinity Matrix is generated in step 714 by calling the function in FIG. 13.

TABLE 15 below illustrates an exemplary pseudo code implementation of a main program routine for the training aspect, as applicable to a preferred embodiment of the present invention.

| Line (FIG/Step) | Comment | Pseudo Code |
| --- | --- | --- |
| 1000 (7/716) | Main program routine for the training phase. Assumes a State | Main(event, time_interval) |
| 1005 (7/703) | The current state of the event is required so that it would be possible to better assess what the next time interval should be. Initially, the state is defined by the type of the event. | Current_State<-event .Get_Initial_State( ) |
| 1010 (7/704) | Starts a loop that iterates through each occurrence within a series of occurrences that comprise an event. Actual splits can be time based, rule based, play based, external input (human, data or otherwise) or otherwise, and any combination thereof. | Foreach (t in Split_To_Time_Intervals(event.length, Current_State)) |
| 1020 (7/705) | For each occurrence of the selected event, call function 1100 (FIG. 8) to read user predications that were previously captured (prior to the selected occurrence of the same event or using data from past events, or any combination thereof) for each of the questions about said selected occurrence. | User_predictions_1<- Generate_User_Predictions_For_Time_Interval(t-1, event, False) |
| 1040 (7/707) | Next, the two types of predictions (past and future) are combined into one matrix and normalized, with the result illustrated in Table 13. | User_predictions[t] <- Combine_Predictions(User_predictions_1, User_Predicitons_2) |
| 1041 (7/708) | Filter non-credible users by calling function 1700 (FIG. 17). | Calculate_User_Response_Time_Fraud_Likelyhood(Response_Time, Event_Dynamic_Level, User_Details) |
| 1045 (7/709) | Now, update the current state. Assess several likely options and choose the smallest time interval that fits one of them, reducing the chance of missing anything, while also not bothering users with extra and redundant questions. | Current_State<- Determine_Current_State(User_predictions [t] ) |

TABLE 15-continued below illustrates an exemplary pseudo code implementation of a main program routine for the training aspect, as applicable to a preferred embodiment of the present invention.

| Line (FIG/Step) | Comment | Pseudo Code |
|---|---|---|
| 1048 (7/710) | | End For |
| 1050 (7/712) | Next, combine the user predictions captured from the users in time interval t as depicted in FIG. 4 and generate possible a matrix of "states" (combinations of entities whose chance of happening is greater than the threshold) by calling function 1200 (FIG. 19). | Observation_States<- Generate_Entity_Connections (event, User_Predictions) |
| 1060 (7/712) | Next, optionally employ external data (captured by human or mechanical means) to further analyze the results, and or use any combination of external data sources to remove any invalid states, thereby improving accuracy of the transition matrix. | State_Transition_Matrix<- Generate_State_Transition_Matrix(event) Note: This will only be done for the training step. An example of the matrix is presented in Table 11. |
| 1070 (7/712) | Finally, create an observation matrix using the state transition matrix and the various observations that were collected, as illustrated in Table 10. | Observations_Matrix<- Calculate_Observation_Matrix(event, Observation_States, State_Transition_Matrix) |
| 1075 (7/713) | After training, optionally pass all information to human taggers for final tagging and analysis. | (Not illustrated, can use any tagging and supervised learning method e.g. Fiebrink, R., P. R. Cook, and D. Trueman. "Human model evaluation in interactive supervised learning." Proceedings of the SIGCHI Conference on Human-Computer Interaction (CHI'11), herein incorporated by reference) Vancouver, BC, May 7-12, 2011.) |
| 1080 (7/714) | Once the states of the event have been set, it's time to assess the user's affinity (fondness) for each entity. For example, if the user interpreted the facts in a more favorable manner (for an entity) than the probabilities would otherwise suggest, or if the user's predictions were more optimistic | Affinity_Matrix<- Generate_Users_Affinity_Matrix(State_ Transition_Matrix, Observetions_Matrix, User_predictions) |

TABLE 15-continued below illustrates an exemplary pseudo code implementation of a main program routine for the training aspect, as applicable to a preferred embodiment of the present invention.

| Line (FIG/Step) | Comment | Pseudo Code |
|---|---|---|
| | than reality, the system can deduce his affinity alignment. A sample Affinity Matrix is illustrated in Table 12. | |
| | | End Main Routine |

Figure 19:
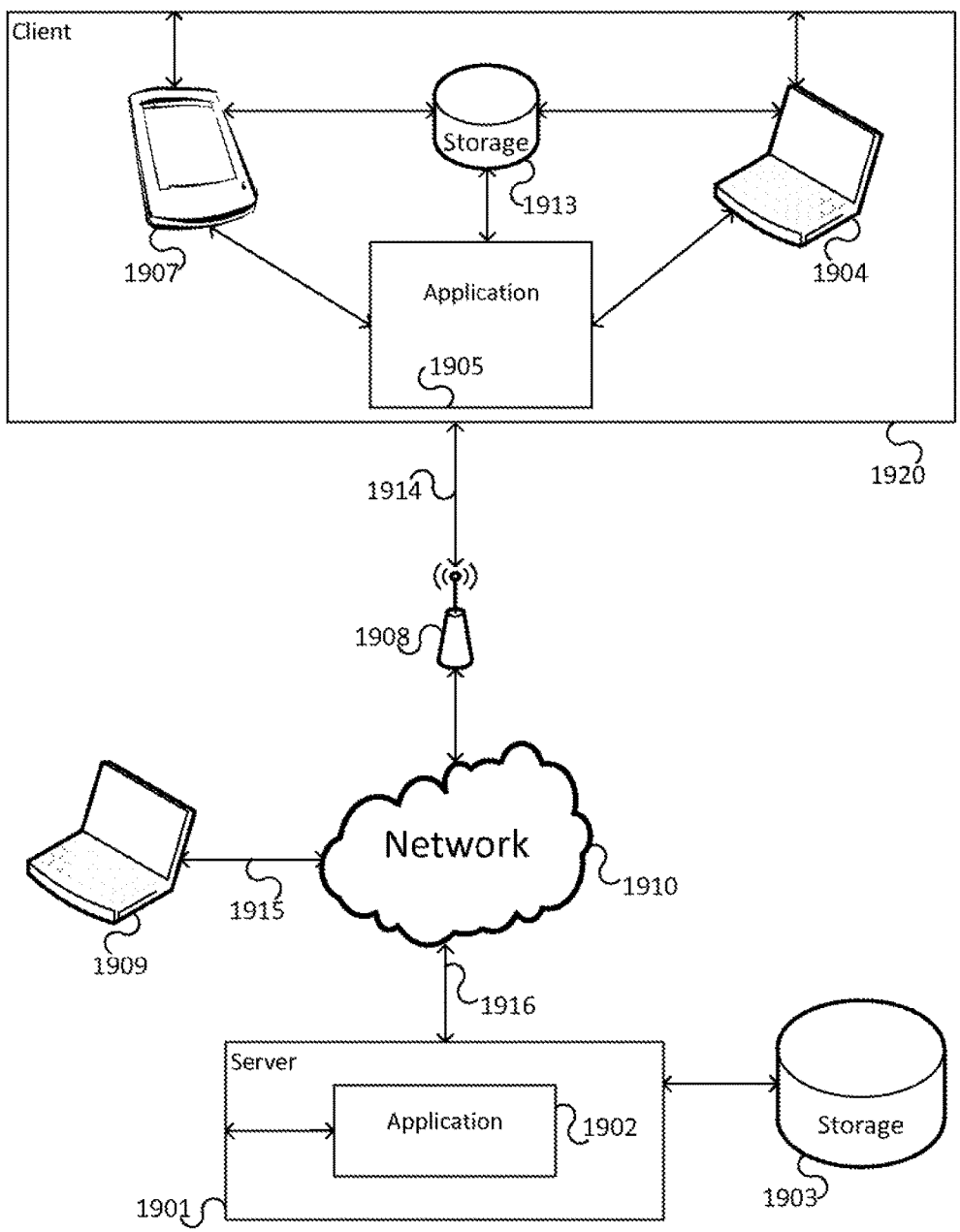
FIG. 19 illustrates various aspects of a communicating network of computing server and a plurality of computing device clients according to one or more embodiments of the invention.

FIG. 8 represents a computer function to generate user predictions for a selected time of an event. Processing group 814 comprises input data which is used to provide source data for the function, including information about event data, the selected time, a flag to indicate if past impressions or future predictions are to be processed, and the minimum user credibility score that should be used. Processing group 815 denotes the main execution code, starting with step 804, in which the User Predictions Matrix is initialized. Then, in step 805 the Event State Matrix is filtered to remove any illegal entries (for example, in NFL football, an "incomplete rush" is not a valid state and will thus be removed). Next, users are segmented into groups in step 806, for example by determining that as many groups as needed will be created to enable each possible event state option to be sent to a minimum of 50 users that each have a credibility score over 0.8, and optionally using additional data including user reliability data or other data sources. Next, in step 807 a matrix of possible (and legal) questions is generated; these questions relate to each of the possible states of the event based on the Event State and Event Observation matrices and thus the model's anticipation of what might happen. Then, iteration loop 808 begins iterating all groups created in step 806, sending questions to all users in step 809 (by calling the function in FIG. 11), for example via transmission over a communication network as depicted in FIG. 19 step 1910. Note that the parameters controlling the order and distribution of questions to users may also include latency data of each group 812, which is the system's anticipated latency (based on, for example user phone metadata and past performance) of how quickly members of the group will respond. Upon receipt of user responses, the probabilities are normalized to one in step 810, followed by step 811 in which the normalized user responses are added to the User Prediction Matrix and the iteration cycle is repeated. Finally, step 813 returns the User Prediction Matrix to the calling function.

TABLE 16 below illustrates an exemplary pseudo code implementation of a program function to capture user predictions based on the number of possible likely observations, as applicable to a preferred embodiment of the present invention.

| Line (FIG./Step) | Comment | Pseudo Code |
|---|---|---|
| 1100 (8/ 815) | Program function to capture user predictions on the number of possible likely observations (based on past observations, user data, event state and decision graph, determine the number of makeup of the population to query. | Generate_User_Predictions_For_ Time_Interval (t, event, based is_prediction_about_future, Min_Credibility_Score) |
| 1110 (8/ 804) | Initialize User Predictions Matrix. | User_Predictions<-(init) |
| 1120 (8/ 805) | Then use state diagram to determine ALL possible states for event (for example, in NFL football, an "incomplete rush" is not a valid state) as illustrated in FIG. 2. | States<-Determine_Possible_ States(t, event) |
| 1130 (8/ 806) | Next, segment active users and determine how many groups will be generated, optionally requiring that the users each of those groups them have a high credibility score. Segmentation can include location data from phone or any other source. A sample result of this step is illustrated in Table 5. | User_Groups<- Determine_Users_Groups(t, event, Min_Credibility_Score) |
| 1140 (8/ 807) | Next, generate matrix of possible (and legal) questions that relate to each of the possible states of the event based on the Event Observation Matrix | Questionnaires<-Generate_ Queries(t, event) |

TABLE 16-continued below illustrates an exemplary pseudo code implementation of a program function to capture user predictions based on the number of possible likely observations, as applicable to a preferred embodiment of the present invention.

| Line (FIG./ Step) | Comment | Pseudo Code |
|---|---|---|
| | and thus the prediction of probabilities as to what might happen. | |
| 1150 (8/ 806) | Start iterating through each group in the list of groups created in line 1130. | Foreach (group in User_Groups) |
| 1160 (8/ 809) | Call function 1400 (FIG. 11) to send questions to users and wait for responses. Note that the latency of each group is also used, as a - a prediction (based on phone, metadata and past performance) how quickly members of the group will respond. A sample result of this step is illustrated in Table 5. | Answers<-Assign_Questionnaires_To_User_And_Query (Questionnaires, group, event, t, States, group.latency, is prediction_about_future) |
| 1170 (8/ 810) | Normalize answers received from user responses. | Answer<-Normalize_Answers(Answers) |
| 1180 (8/ 811) | Add user responses from data collected in previous step. | User_Predicitons.Add(Answers) End For |
| 1190 (8/ 813) | Output matrix of user predictions. The result of this function is illustrated in Table 9. | Return User Predictions |

TABLE 17 below illustrates an exemplary pseudo code implementation of a program function used to generate the states based on the connections between entities of an event, as applicable to a preferred embodiment of the present invention.

| 1200 (9/ 910) | Program function used to generate the states based on the connections between the entities of an event. | Generate_Entity_Connections (event, User_Predictions) |
|---|---|---|
| 1210 (9/ 904) | The possible list of prediction combinations and likelihoods for each are obtained (for example, by analyzing a past event or by following a decision graph e.g. 201). | User_Prediction_States<-(new) |
| 1220 (9/ 905) | Recursively iterate all entity types. | Foreach (entity_type_1 in event.entities) |
| 1230 (9/ 906) | Within main iterative loop, evaluate each entity vs the entity selected in step 1220 to determine, for example, if actress is connected to dress and then if dress is connected to color. | If (entity_type_1.equals (entity_type_2) \|\| !event.Connection_Exists (entity_type_1, entity_type_2)) then process next item |
| 1240 (9/ 907) | Connect list entities for which any relationship was found. | User_Prediction_States<-Connect_Entities_Based_On_Predictions (entity_type_1.items, entity_type_2.items, User_Predictions) End For |
| 1250 (9/ 908) | Return list of possible states to be offered to users. | Return User_Prediction_States |

Figure 9:
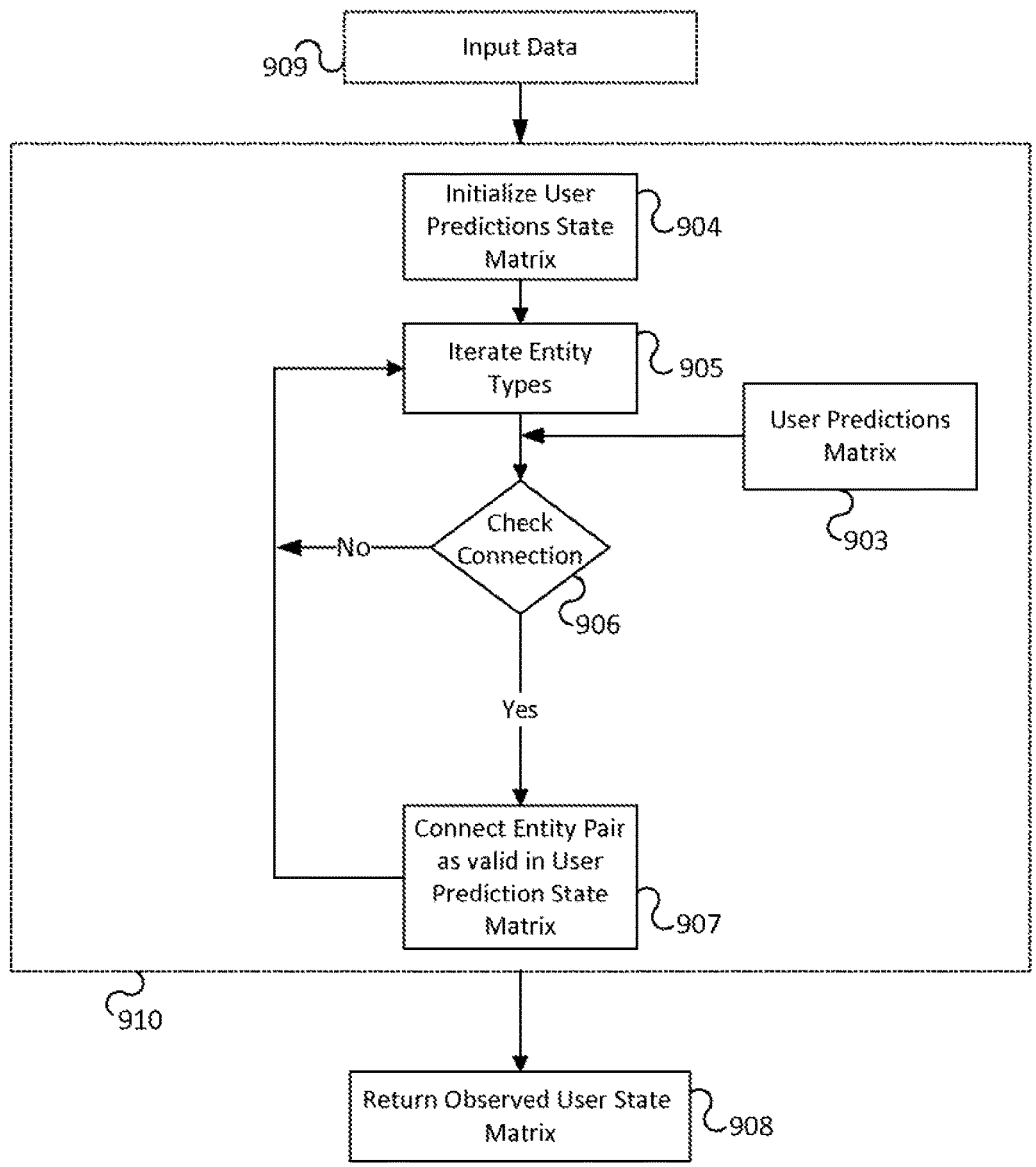
FIG. 9 illustrates steps for processing and transforming inputs in order to return a User Prediction State Matrix according to one or more embodiments of the invention.

FIG. 9 represents a computer function to generate valid connections between various entities of an event (for example, ball is connected to player, player is connected to team, dress is connected to actress, blue is connected to dress, etc.), which will be populated into the User Predictions Matrix in anticipation of derived questions being sent to users. Processing group 909 comprises input data including information about event data and the User Predictions Matrix. Processing group 910 denotes the actual execution code, starting with step 904 which initializes the User Predictions State Matrix to initially contain all possible valid entity connection using data derived from State Transition Diagram 201, for example, and using probabilities that were derived from analysis of past events or by human tagging of relationships of entities that appeared in past events. Then, step 905 begins an iteration loop which in step 906 evaluates each entity in relation to every other entity, and when a connection between two entities is found in any prior prediction (for example, from the User Predictions Matrix 903) or observation (including data from the training phase), step 907 adds the connection and its probability to the User Predictions Matrix which is finally returned to the calling function in step 908.

Figure 10:
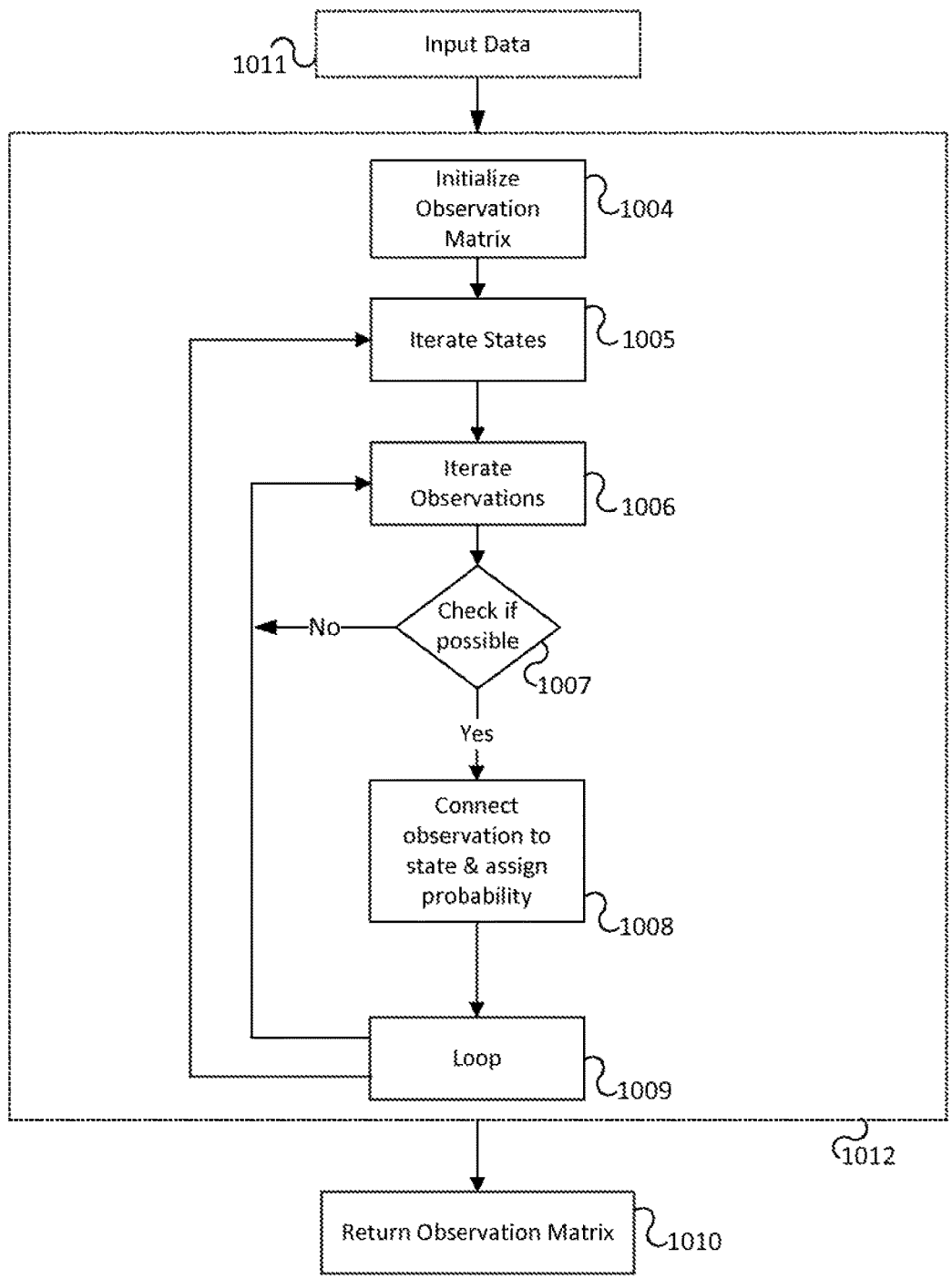
FIG. 10 depicts steps for processing and transforming inputs in order to return an Observation Matrix according to one or more embodiments of the invention.

FIG. 10 represents a computer function to calculate the probability of any particular observation to occur in any particular event state. These values are to be placed in a matrix object, and enable a preferred embodiment to use Hidden Markov Models (or other analysis methods, without limitation) to infer the true sequence of event elements in the real world. Processing group 1011 comprises input data, including event data and the current Observation States and State Transition matrices. Within main execution group 1012, Step 1004 initializes the Observation Matrix, followed by two nested iterative loops 1005 and 1006, respectively. Outer loop 1005 iterates through all states, and inner loop 1006 iterates all observations within the state currently evaluated in step 1005. Step 1007 evaluates the possibility of each observation within occurring within the iterated state, continuing to step 1008 if a possible connection exists or returning to step 1006 if not, in which case the next possible observation is evaluated. If a possible connection exists, step 1008 updates the Observation Matrix to connect the iterated state to the iterated observation using the probability derived from the User Prediction Matrix. Step 1009 returns execution to the relevant iterative loop, once all states and all observations within have been evaluated, step 1010 returns the Observation Matrix (illustrated in Table 13) to the calling function.

TABLE 18 below illustrates an exemplary pseudo code implementation of a program function used to calculate the probabilities of a particular observation to occur in a particular state, as applicable to a preferred embodiment of the present invention.

| Line (FIG./ Step) | Comment | Pseudo Code |
|---|---|---|
| 1300 (10/ 1012) | Based on the states and their assigned probabilities, calculate the probabilities of observation O to occur in state S. these values will be placed in a matrix object, and enable the use of Hidden Markov Models to infer the true series of events in the real world. | Calculate_Observation_Matrix (event, Observation_States, State_Transition_Matrix) |
| 1310 (10/ 1004) | Initialize observation matrix. | Observation_Matrix<-(new) |
| 1320 (10/ 1005) | Main iterative look that evaluates each state within the state transition matrix. | Foreach (State in State_Transition_Matrix) |
| 1330 (10/ 1006) | Within main iterative loop, further recursively iterate each observation in the observation states, matrix | Foreach (Observation in Observation_States) |
| 1340 (10/ 1007) | Evaluate if an observation selected in step 1330 is possible, in the state selected in line 1320. | If (event.Observation_Is_ Possible_In_State (State, Observation) |
| 1350 (10/ 1008) | Then add the observation selected in line 1330 as a valid possibility for the state selected in line 1320. | Then Observation_Matrix.Add (State, Observation) |
| 1351 (10/ 1009) | | End for |
| 1352 (10/ 1009) | | End for |
| 1360 (10/ 1010) | (a sample of such returned matrix is illustrated in Table 10) | Return Observation_Matrix |

Figure 11:
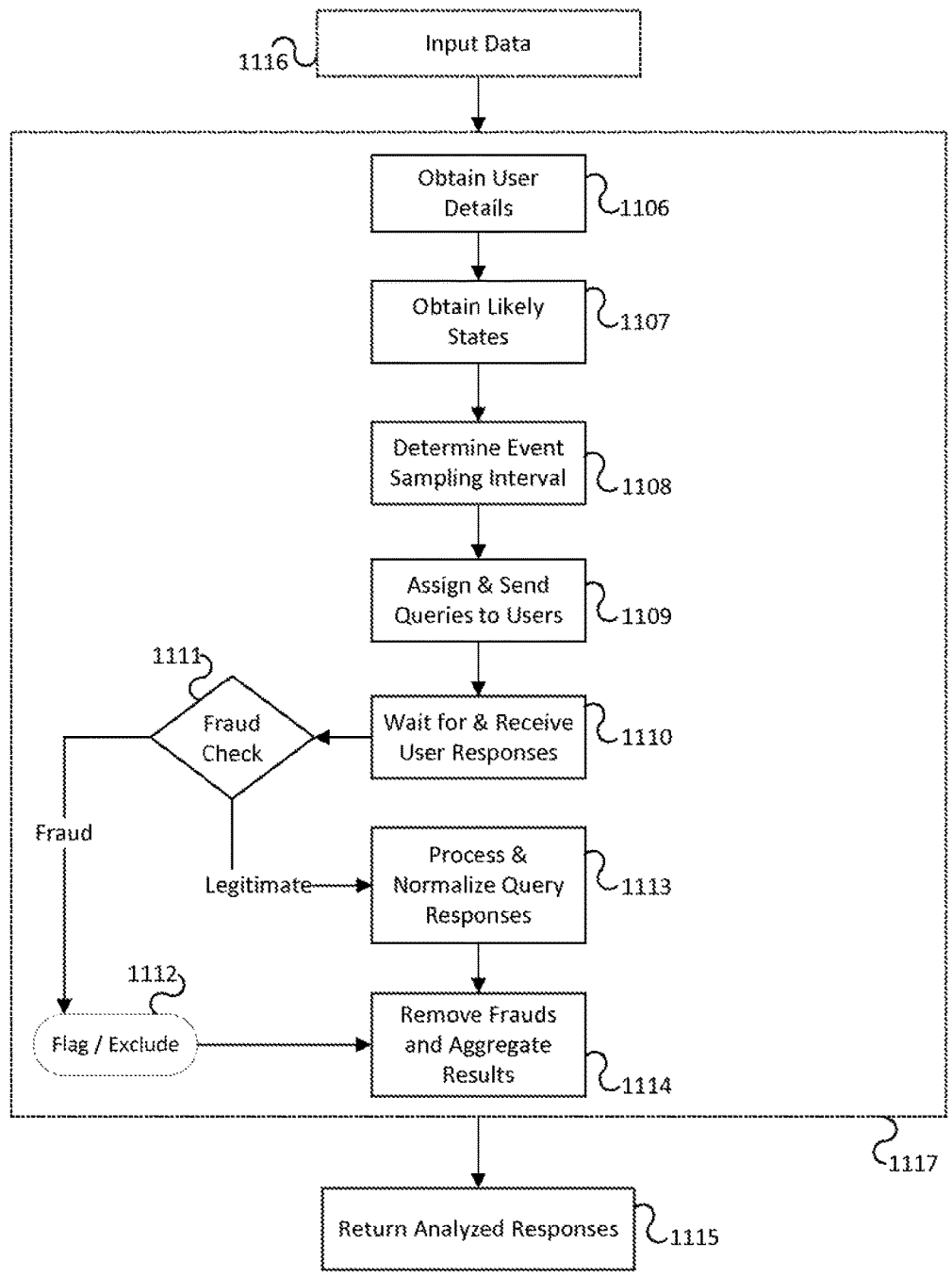
FIG. 11 shows steps for processing and transforming inputs in order to return Analyzed Responses according to one or more embodiments of the invention.

FIG. 11 represents a computer function to send selected questions to selected users and receive their timestamped responses. Processing group 1116 comprises input data elements including data elements containing the current Questionnaires and User Prediction States matrices, group assignment and latency, event data and time, and a flag to determine if the generated questions (and ensuing analyzed responses) relate to past impressions or future predictions. Within main execution group 1117, step 1106 analyzes the user's characteristics including location, reliability and latency (without limitation), followed by step 1107 which obtains the most likely possible states (that is, the valid states with the highest probability, including data from the State and Observation matrices, without limitation). Next, step 1108 analyzes the required sampling frequency of the selected event; for example, a football game with its 25 second play timers is substantially "faster" than a chess match with a 2 minute play timer, thus requiring a faster sampling frequency. This information is very important for determining group partitioning (which users to query), as the latency of the various users becomes more and more important the higher the sampling frequency. Step 1109 calls the function on FIG. 12 to assign possible states to the groups most likely to respond accurately and quickly, followed by the actual transmission of the questions (past impressions or future predictions) to the users. It should be noted that more than one question can be sent to any group, and that groups may be partitioned differently for each question. User responses arrive back to the system in step 1110, upon which the responses are evaluated for fraud in step 1111 (using the function on FIG. 15) by analyzing response data for each user and evaluating if it is within a threshold. The threshold can be dynamically adjusted depending on various factors including number of active users, their locations, connectivity methods, broadcast delays, event sampling frequency as well as external data sources, all without limitation. It should further be noted that for the purpose of this example, an exemplary value such as 0.8 can be used, which represents a requirement that the user has provided correct answers at least 80% of the time in the past 30 minutes, and that additional embodiments may make sure of alternate or more advanced methods for fraud detection, all of which are incorporated herein in their entirety. Suspected frauds are flagged in step 1112, while legitimate responses are processed and normalized in step 1113, followed by removal of fraudulent responses and aggregation of the results in step 1114. Finally, the Analyzed Response Matrix is returned to the calling function in step 1115.

TABLE 19 below illustrates an exemplary pseudo code implementation of a program function used to send selected questions to selected users and collect their timestamped responses, as applicable to a preferred embodiment of the present invention.

| Line (FIG./ Step) | Comment | Pseudo Code |
|---|---|---|
| 1400 (11/ 1117) | Function to send selected questions to selected users and collect their timestamped responses. | Assign_Questionnaires_To_User_ And_Query(Questionnaires, group, event, t, User_Prediction_ States, group_latency, is_prediction_about_future ) |
| 1410 (11/ 1106) | Calculates the user's characteristics (location, reliability, etc.). | User_Details<- Obtain_ Users_Characteristics (group, event, t, User_Prediction_States) |
| 1420 (11/ 1107) | Determine which are the possible states and what is the likelihood of each, based on evaluating the data in the model's matrices. | Likely_States<- Obtain_Likely_States(User_ Prediction_States, t, event, is_prediction_about_future) |
| 1430 (11/ 1108) | Factor the "tempo" Dynamic Level of an event into the calculations; for example, a football game with its 25 second play timers is | Event_Dynamic_Level<- Determine_Event_ Dynamic_Level(event, t, Likely_states, is_ prediction_about_future) |

TABLE 19-continued below illustrates an exemplary pseudo code implementation
of a program function used to send selected questions to
selected users and collect their timestamped responses, as
applicable to a preferred embodiment of the present invention.

| Line (FIG./Step) | Comment | Pseudo Code |
|---|---|---|
| | substantially "faster" than a chess match with a 2 minute play timer. This information is very important for determining group partitioning (which users to query), as the latency of the various users becomes more and more important the shorter the event timers are. | |
| 1440 (11/1109) | Based on all these factors (among others and without limitation), the questionnaires can now be generated by calling Function 1500 (FIG. 12), with a sample result illustrated in Table 5. | User_Queries_Assignments<-Assign_Queries_To_Users(event, Questionnaires, group, User_Details, Likely_States, Event_Dynamic_Level, group_latency) |
| 1450 (11/1110) | Send questions to users based on assignments generated in steps above and measure their response times. | Response_Time<-Wait_For_Response( ) |
| 1460 (11/1111) | Call Function 1700 (FIG. 15), to analyze response time for each user and evaluate if it is within a threshold. The threshold can be dynamically adjusted depending on various factors including number of active users, their the locations, connectivity methods, broadcast delays, event dynamics etc. | If (Calculate_User_Response_Time_Fraud_Likelyhood (Response_Time, Event_Dynamic_Level, User_Details) < Minimum_Legitimacy_Threshold( ) Note: for the purpose of this example, the function Minimum_Legitimacy_Threshold( ) returns value 0.8, which represents a requirement that the user has provided correct answers at least 80% of the, time in the past 30 minutes. |
| 1470 (11/1112) | Return null if a users' response is considered fraudulent and is excluded. | Return (null) |
| 1480 (11/1113) | Process the responses obtained from the users, as illustrated in Table 7. | Responses<-Process_Query_Responses (group, Questionnaires, User_Queries_Assignments) |
| 1490 (11/1114) | Enhance raw responses obtained in line 1480 by removing fraudulent responses and aggregate responses. | Analyzed_Responsese<-Remove_Frauds_And_Aggregate_Results(Responses) |
| 1495 (11/ | Return enhanced responses to | Return Analyzed_Responses |
| 1115) | calling function, as illustrated in Table 9. | |

Figure 12:
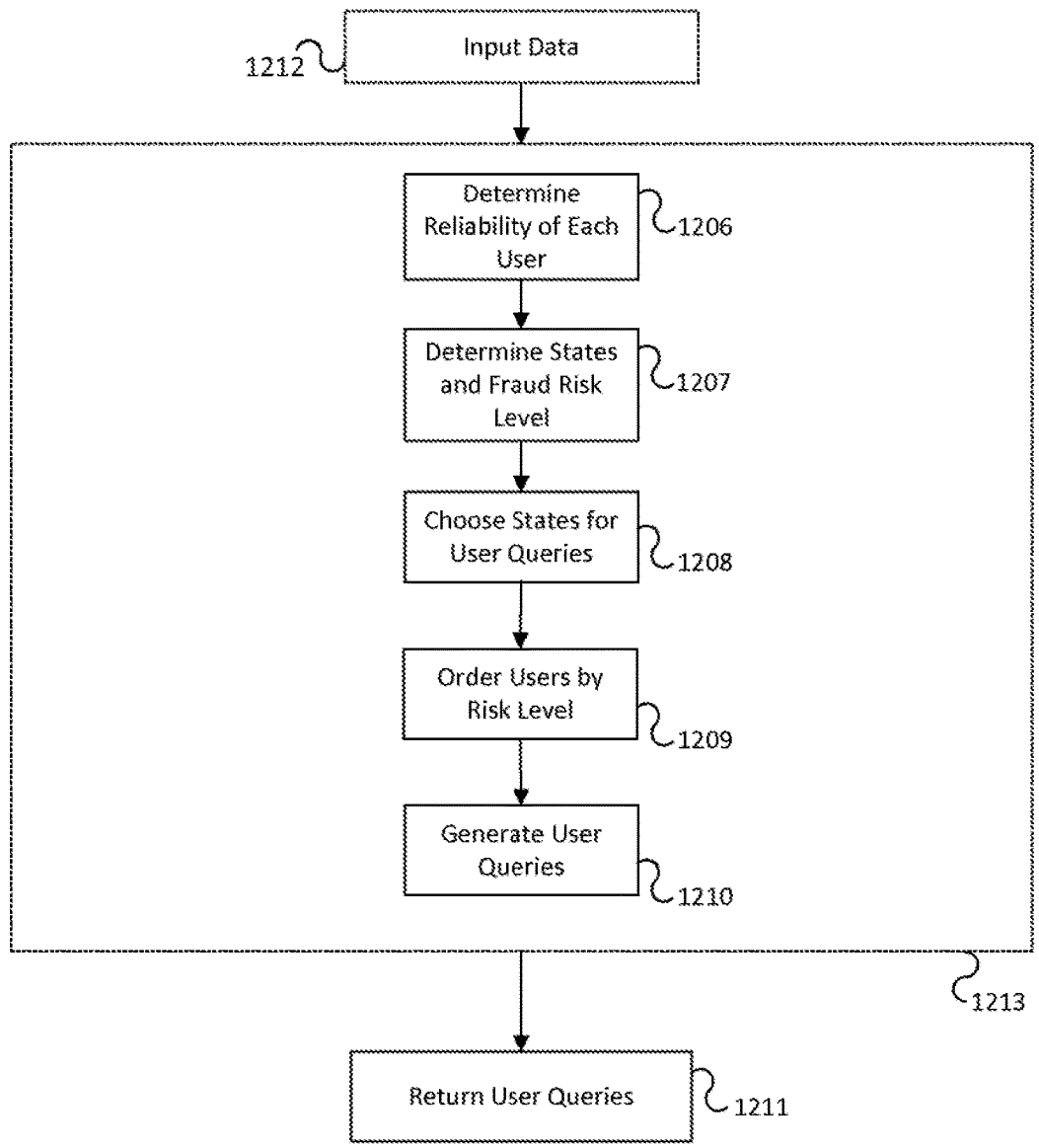
FIG. 12 illustrates steps for processing and transforming inputs in order to return User Queries according to one or more embodiments of the invention.

FIG. 12 represents a computer function to determine what type of question to send to each user. In at least one preferred embodiment, this is determined by the number of available users, the type of the event, the confidence index of possible events and historical user behavior. Processing group 1212 comprises input data elements, including event data, Questionnaires, User and Group matrices, group latency data and the current level of activity in the event. Within main execution group 1213, step 1206 analyzes the reliability of each user, using (for example) the users' details and their group assignment. This function is not demonstrated, however, it should be noted that for the purpose of this example, an exemplary value such as 0.8 can be used, which represents a requirement that the user has provided correct answers at least 80% of the time in the past 30 minutes, and that additional embodiments may make sure of alternate or more advanced methods for fraud detection, all of which are incorporated herein in their entirety. In step 1207, the states that the user will be queried about are chosen. Also, the risk level metric is used to determine how vulnerable is the current event, in its present state, to attempted fraud: in fast-changing events it is more difficult to quickly detect fraud than in slower ones. Next, the states the users will be queried about are chosen in step 1208, followed by ordering of the users in step 1209 such that the most reliable users are queried first (long latency also adds to risk, so higher reliability is given to users that respond quickly, thereby improving accuracy of the data). The questions to be sent to the users (in the order determined by step 1209) are then generated in step 1210 and finally the User Queries table returned to the calling function in step 1211.

TABLE 20 below illustrates an exemplary pseudo code implementation of a program
function used to determine what type of question to send to each
user, as applicable to a preferred embodiment of the present invention.

| Line (FIG./Step) | Comment | Pseudo Code |
|---|---|---|
| 1500 (12/1213) | Program function to determine what type of question to send to each user. This is determined by the number of available users, the type of the event, the confidence index of possible events and the historical user responses. | Assign_Queries_To_Users(event, Questionnaires, group, User_Details, Likely_States, Event_Dynamic_Level, group_latency) |

TABLE 20-continued below illustrates an exemplary pseudo code implementation of a program function used to determine what type of question to send to each user, as applicable to a preferred embodiment of the present invention.

| Line (FIG./Step) | Comment | Pseudo Code |
|---|---|---|
| 1510 (12/1206) | Evaluate, the reliability of each user, using (for example) the users' details and their group assignment. | User_Reliability<-Determine_User_Reliability(event, User_Details, group_latency) Note: This function is not demonstrated. However, for the present purpose, assume that a reliable user is one whose answers have been 80% correct (or more) in the past 30 minutes. |
| 1520 (12/1207) | Choose the states that the user will be queried about. Also, the risk level is used to determine the vulnerability to fraud attempts: in fast-changing events it is more difficult to detect fraud than in slower ones, given all other factors are equal. | Risk_Level<-Determine_Risk_Level (Event_Dynamic_Level, event, Likely_States, Group_latency, User_Reliability) |
| 1530 (12/1208) | Populate matrix and choose the states the user will be, queried about. | Chosen_States<-Select_Relevant_States(Likely_States, User_Reliability, event, Risk_Level) |
| 1540 (12/1209) | Users are ordered so that they are queries by order of the least risky first (long latency also adds to risk, so higher reliability is given to users respond quickly, thereby reducing noise in the model). | User_Order<-Order_Users_By_Risk (User_Reliability, Risk_Level, Chosen_States) |
| 1550 (12/1210) | Table of queries for users is generated. | User_Query<-Generate_User_Query(event, Chosen_States) |
| 1560 (12/1211) | Return user queries table to calling function. | Return User_Query |

Figure 13:
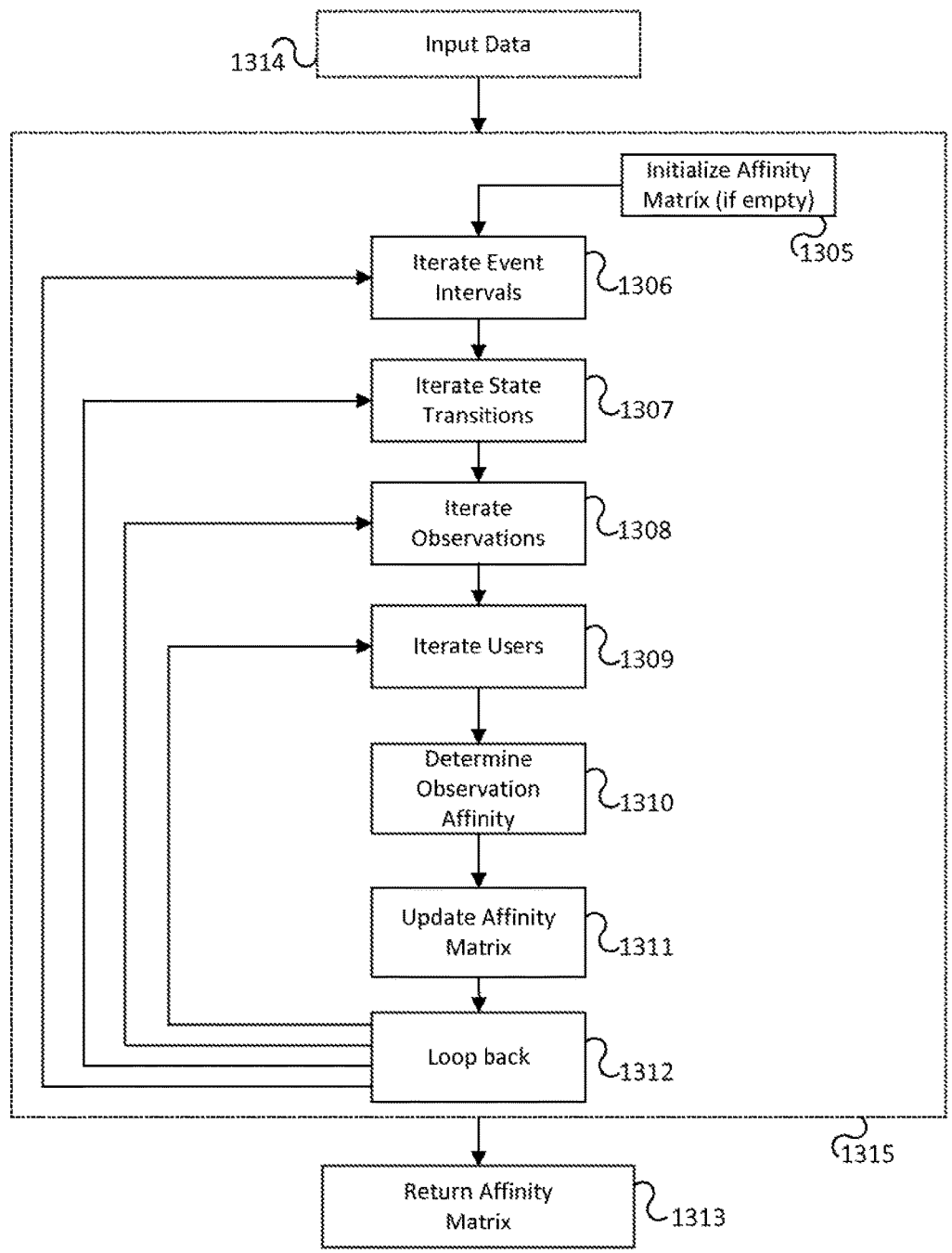
FIG. 13 shows steps for processing and transforming inputs in order to return an Affinity Matrix according to one or more embodiments of the invention.

FIG. 13 represents a computer function to create or update an affinity matrix that stores the predicted sentiment between users and entities, used to determine which entities are liked by each user and to what degree, by analysis of user responses. Processing group 1314 comprises input data elements including the Observation, State Transition and User Predictions matrices, among others and without limitation. Processing group 1315 comprises the Affinity Matrix initialization step 1305 which initializes the Affinity Matrix, followed by four nested iterative processing loops which iterate event intervals 1306, state transitions 1307, observations 1308 and finally users 1309. For each combination of interval, state transition and observation, the actions of each user are analyzed. For example purposed, a simple increment of observation rate per entity can be used, however a preferred embodiment of the present invention can also use more advanced methods which are available or may become available, all of which are incorporated herein by reference. The affinity matrix is then updated in step 1311 and the nested loops are respectively looped back to process the next iteration. Finally, the Affinity Matrix is returned to the calling function in step 1313. It should be further noted that for example purposes no optimization of processing efficiency was depicted and that embodiments of the present invention may further optimize this function. A person skilled in the art would appreciate that such optimizations do not alter the core functionality of this function.

TABLE 21 below illustrates an exemplary pseudo code implementation of a program function used to create an "affinity matrix" between users and entities, as applicable to a preferred embodiment of the present invention.

| Line (FIG./Step) | Comment | Pseudo Code |
|---|---|---|
| 1600 (13/1315) | Creates an "affinity matrix" between users and entities. The goal is to determine which entities are liked by each user and which aren't | Generate_Users_Affinity_Matrix(State_Transition_Matrix, Observations_Matrix, User_predictions) |
| 1610 (13/1305) | Initialize the object that will be returned | If (Affinity_Matrix.sizeof( ) = 0) then Affinity_Matrix<-(new) |
| 1620 (13/1306) | Iterate event elements | Foreach (t in Split_To_Time_Intervals(event.length)) |
| 1630 (13/1307) | Iterate states | Foreach (State, in State_Transition_Matrix) |
| 1640 (13/1308) | Iterate observations | Foreach (Observation in Observation_States) |
| 1650 (13/1309) | Iterate users | Foreach (User in User_Prediction.Get_Users( )) |
| 1660 (13/1310) | Taking into account the time, state, observation and the input provided by the user (among others and without limitation), determine whether the prediction was (un)favorable enough to deduce there's an affinity. | Affinity<-Determine_Observation_Affinity(State, Observeation, User_Predictions[User][t], event.State_At(t)) |
| 1670 (13/1311) | Update the final object with the user's affinities | Update_Affinity_Matrix(Affinity_Matrix, affinity) |
| 1680 (13/1312) |  | End for |
| 1690 (13/1312) |  | End For |
| 1695 (13/1312) |  | End For |
| 1696 (13/1312) |  | End For |
| 1697 (13/1313) | An example of the returned affinity matrix is presented in Table 12. | Return Affinity_Matrix |

Figure 14:
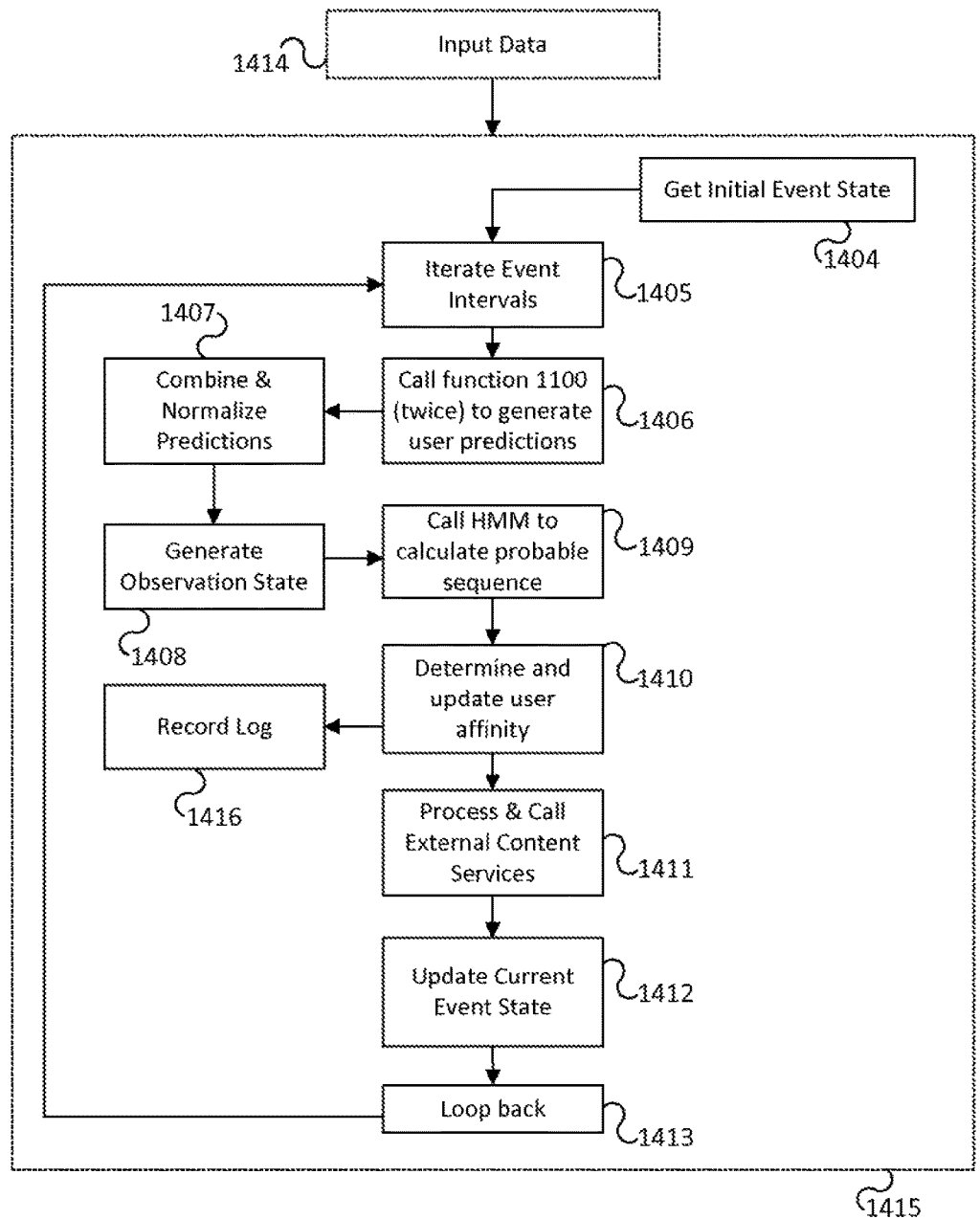
FIG. 14 illustrates a series of ongoing processing steps for an operating or running event prediction system and method in accordance with at least one preferred embodiment of the invention.

FIG. 14 represents an exemplary computer function for the main program execution loop of an embodiment of the present invention. Processing group 1414 comprises input data elements including event data, initial time interval, and the State Transition and Observation Matrices. Main processing group 1415 comprises the initial event state query step 1404, passing control to the main processing loop 1405 which preferably runs for the selected duration (and optionally longer or shorter) of the selected event. Step 1406 calls the function depicted in FIG. 8, and the user predictions are then normalized to one in step 1407. Step 1408 calls the function depicted in FIG. 15, to generate observations for the current event interval, which are then passed to the Hidden Markov Model 1409 to calculate the most probable sequence of occurrences. User affinity is then determined by calling the function in FIG. 13, which updates the User Affinity Matrix that is then optionally processed by step 1411 by calling the function depicted in FIG. 16. A log of data the current state of the event, user actions and predictions can be recorded in step 1416. The current state of the event is updated in step 1412 before looping back in step 1413 to process the next occurrence within the event.

TABLE 22 below illustrates an exemplary pseudo code implementation of a main program function used to create the main program execution loop for a preferred embodiment of the present invention.

| Line (FIG./Step) | Comment | Pseudo Code |
|---|---|---|
| 2000 (14/1415) | main program function for system runtime operations. | Main (event, time_interval, State_Transition_Matrix, Observation_Matrix) |
| 2005 (14/1404) | Initialize the current state variable. | Current_State<-event.Get_Initial_State ( ) |
| 2010 (14/1405) | Starts a loop that iterates through each occurrence within a series of occurrences that comprise an event. Actual splits can be time based, rule based, play based, external input (human, data or otherwise) or otherwise, and any combination thereof. | Foreach (t in Split_To_Time_Intervals(event.length, Current_State) |
| 2020 (14/1406) | For each occurrence of the selected event, call function 1100 (FIG. 8) to read user predications that were previously captured (prior to the selected occurrence of the same event or using data from past events, or any combination thereof) for each of the questions about said selected occurrence. | User_predictions_1[t] <- Generate_User_Predictions_For_Time_Interval (t-1, event, False) |
| 2022 (14/1406) | For each occurrence of the selected event, function 1100 (FIG. 8) is called to read user predications that were captured after said selected occurrence (following the selected occurrence of the same event or using data from other events, or any combination thereof) for each of the questions about said selected occurrence. | User_predictions_2[t] <- Generate_User_Predictions_For_Time_Interval (t+1, event, True) |
| 2024 (14/1407) | Next, the two types of predictions (past and future) are combined into one matrix . . . | User_predictions[t] <- Combine_Predictions(User_predictions_1, User_Predicitons_2) |
| 2030 (14/1407) | . . . and normalized. | User_predictions [t] <- Normalize_Predictions(User_predictions[t]) |
| 2040 (14/1408) | Call Function 2100 on FIG. 15 to calculate what are the likely states based on the predictions of the users. | Observation_States<- Generate_Obeervation_States(event, User_predictions) |
| 2050 (14/1409) | In at least one embodiment, use the backwards recursion algorithm for HMM. | States_Sequence<- Calculate_Likely_States_Seguence (Observation_States, Observations_Matrix, State_Transition_Matrix) |
| 2060 (14/1410) | Get the user's current affinity based on the latest prediction. | Affinity<- Determine_Observation_Affinity(States_Sequence.Get_Current_State( ), Observation, User_Predictions[User][t], event.State_At(t)) |
| 2065 (14/1416) | Record event log, event timeline, user actions. | Log<- (States_Sequence.Get_current_State( ), Observation, User_Predictions[User] [t], event.State_At(t)) |
| 2070 (14/1411) | Monetization and commercial integration options are called via function 2200 on FIG. 16, (using data from both the present affinity calculation and the Affinity Matrix from the training phase). | Generate_And _Send_Relevant_Content (event, State_Sequence, affinity, Affinity_Matrix) |
| 2075 (14/1412) | Now, update the, current state and assess several likely options, choosing the smallest time interval that fits one of them. This way it is less likely to miss anything, while also not creating spurious questions that are sent to users | Current State<- Determine_Current_State(User_predictions [t]) |
| 2080 (14/1413) | End For | |

Figure 15:
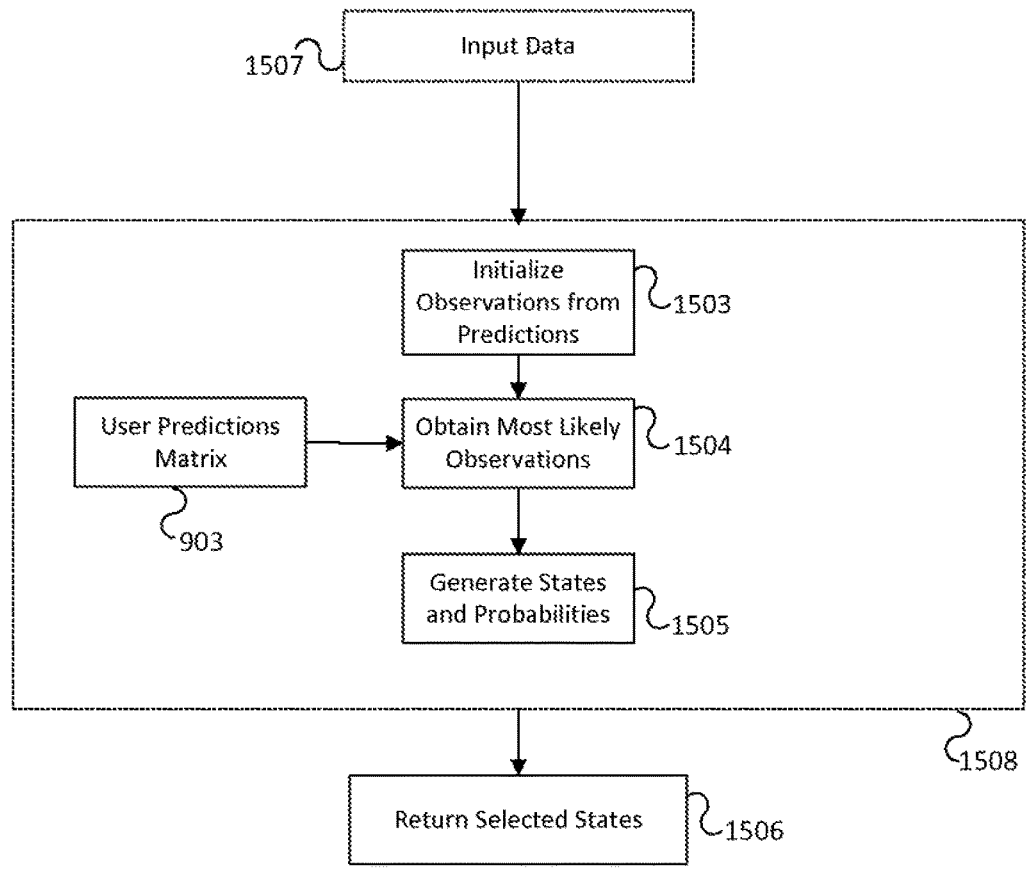
FIG. 15 shows steps for processing and transforming inputs in order to return a set of Selected States, according to one or more embodiments of the invention.

FIG. 15 represents a computer function to create or update observations based on the selected events and the user predictions matrix that was created during the training phase. Processing group 1507 comprises input data elements including event data and the User Predictions Matrix. Processing group 1508 comprises initialization step 1503 which converts previous user predictions into initial potential observations, followed by step 1504 which calculates the probability of all observations processed by the previous step based on analysis of previous (or trained) user predictions, using, in at least one preferred embodiment. User Predictions Matrix 903. All event state transitions that are over a probability threshold are then created in step 1505, with the processed data returned to the calling function in step 1506.

TABLE 23 below illustrates an exemplary pseudo code implementation of a
program function used to generate a list of observations
based on the selected events and the user predictions matrix, as
applicable to a preferred embodiment of the present invention,

| Line (FIG./ Step) | Comment | Pseudo Code |
|---|---|---|
| 2100 (15/ 1508) | Program function to generate list of observations based on the selected events and the user predictions matrix that was created during the training phase. | Generate_Observation_States(event, User_predictions) |
| 2110 (15/ 1503) | Populate initial observations matrix. | Initial_Observations<- Translate_Predicitons_To_Observations (event, User predictions) |
| 2120 (15/ 1504) | Calculate probability of observations. | Likely_Observations<- Obtain_Top_Likely_Observations (event, User predictions) |
| 2130 (15/ 1505) | Generate, the most "likely" states based on the chosen likely observations. These states are used in the HMM model in order to deduce the most likely sequence of states. | Chosen_States <- Generate_Chosen_States_And_ Probabilities (event, Likely_Observations) |
| 2140 (15/ 1506) | Return matrix of chosen states to the calling function. | Return Chosen_States |

Figure 16:
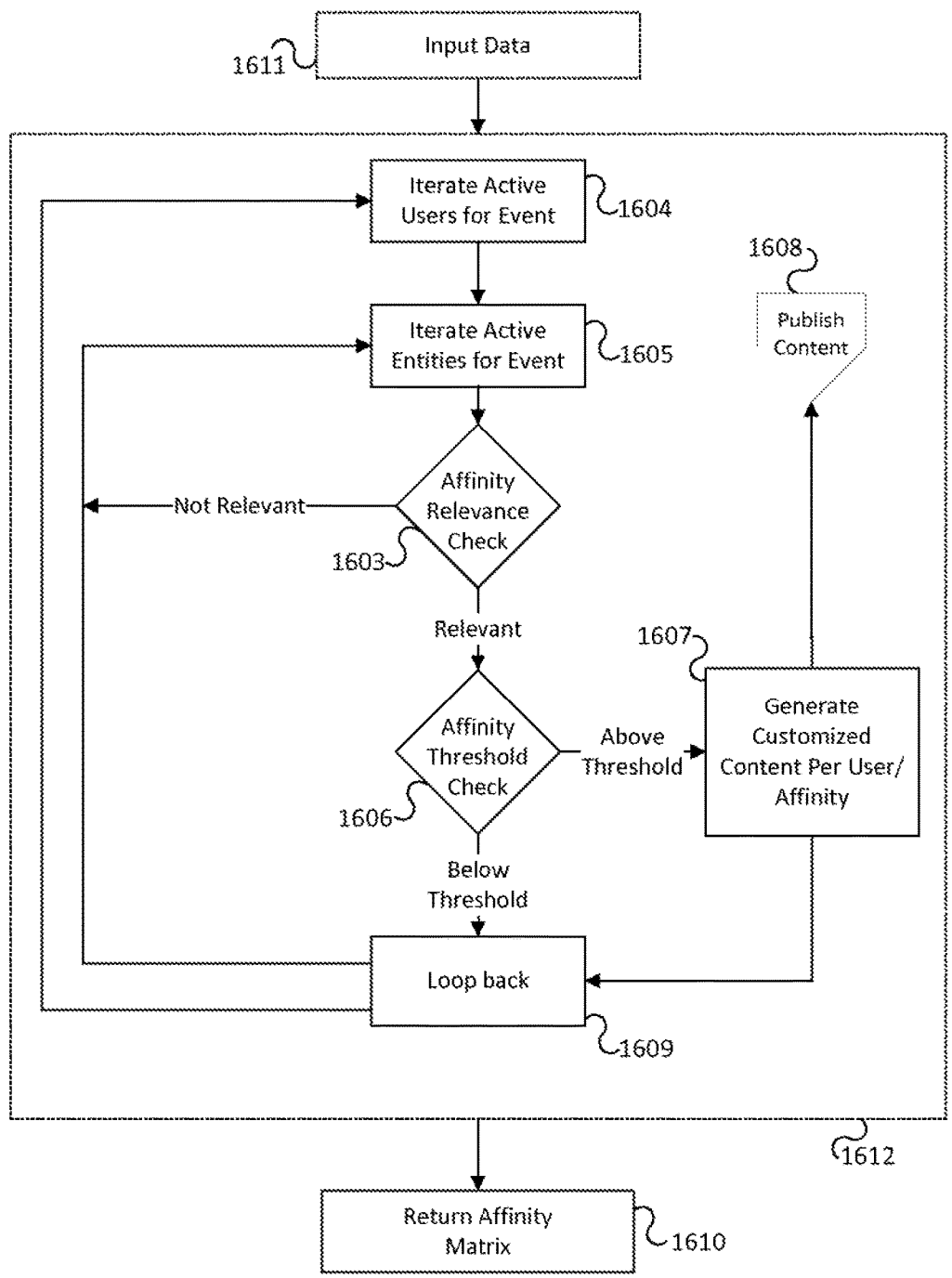
FIG. 16 shows steps for processing and transforming inputs in order to return an Affinity Matrix, according to one or more embodiments of the invention.

FIG. 16 represents a computer function to create and transmit user-directed content as a result of a user's affinity to a particular entity in the event. This function may be used to call an external advertising system, for example, signaling the user's information and enabling display of relevant advertising, promotional messaging, or other similar content on a user's device as a result of the user's actions, their affinity, and possibly in relation to any entity. Processing group 1611 comprises input data elements including event data, the desired affinity relationship and the State Sequence and Affinity Matrices. Processing group 1612 contains two nested loops, iterating users 1604 and active entities 1605 respectively. For each combination, the relevance 1603 of the affinity to the iterated entity is evaluated first, followed by evaluation 1606 of the affinity of the specific user is evaluated against all entities, with any affinity value over a threshold is sent to step 1607, which generates relevant content or signals and transmits those to the content publication step, 1608, an example of which is depicted in step 2004 of FIG. 20. In either case (above or below affinity threshold) control is then returned to step 1609 and the nested iteration loops process their next respective iteration. Finally, the updated Affinity Matrix is returned to the calling function in step 1610.

TABLE 24 below illustrates an exemplary pseudo code implementation
of a program function used to create and transmit user-directed
content as a result ofa user's affinity to a particular entity in the event,
as applicable to a preferred embodiment of the present invention.

Figure 20:
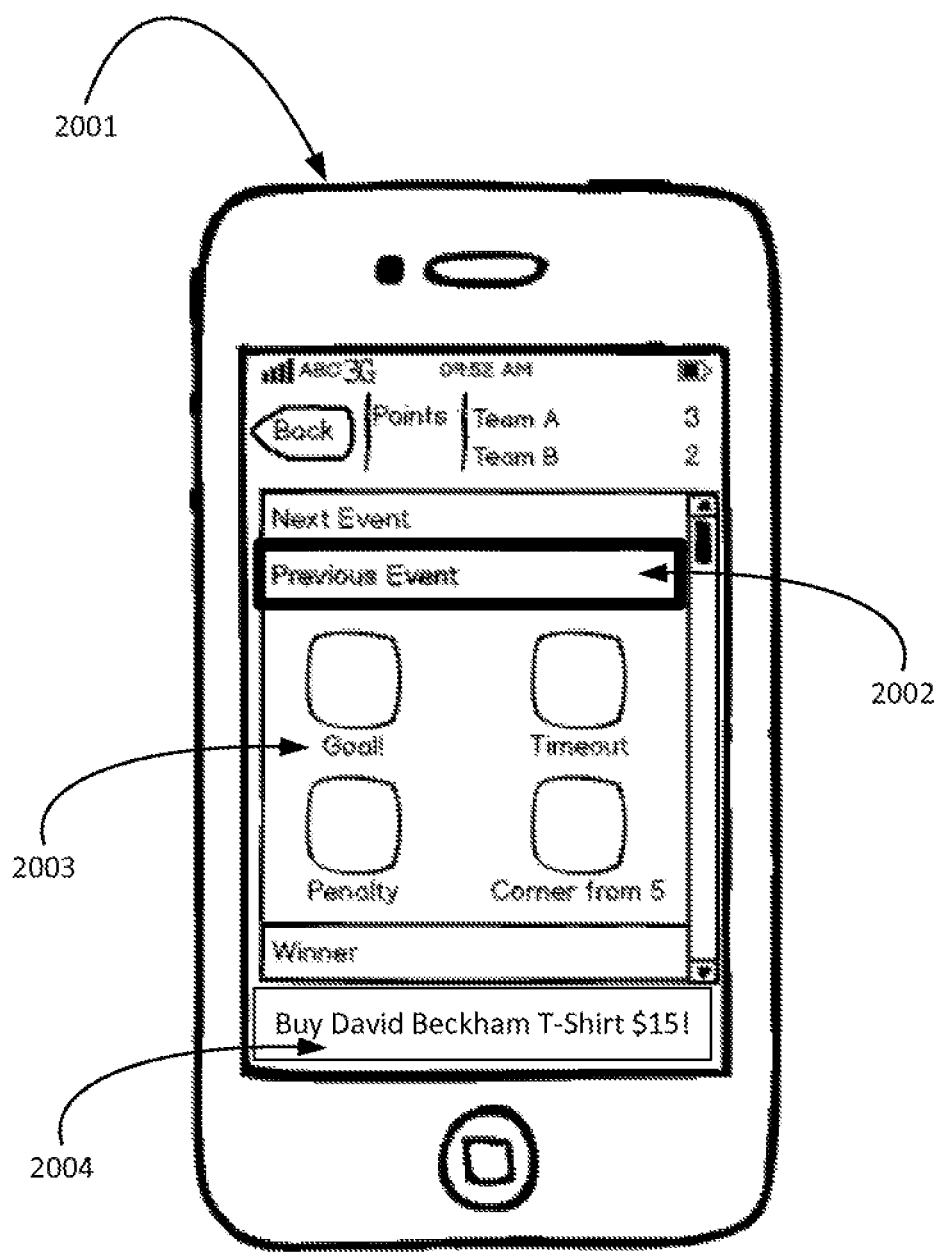
FIG. 20 illustrates a presentation of a screenshot of a graphical user interface on a portable client computing device according to one or more embodiments of the invention.

| Line (FIG./ Step) | Comment | Pseudo Code |
|---|---|---|
| 2200 (16/ 1612) | | Generate_And _Send_Relevant_Content (event, State_Sequence, Affinity, Affinity_Matrix) |
| 2210 (16/ 1604) | Iterate Active Users for Event | Foreach (User in User_Prediction.Get_Users( )) |
| 2220 (16/ 160.5) | Iterate Active Entities for Event | Foreach (Entity in event.Entities) |
| 2230 (16/ 1603) | Evaluate affinity relevance against iterated entity | If (State_Sequence.Entity_Is_Relevant(Entity) |
| 2240 (16/ 1606) | Evaluate affinity connection against iterated entity | If (Positive_Affinity_Exists(User, event, Affinity, Affinity_Matrix) |
| 2250 (16/ 1607) | Publish advertising or other content to user device, for example as illustrated on step 2004 of FIG. 20. | Generate_And_Publish_Content_ To_User(User, Entity, event.Get_Event_Advertisment( )) |
| 2285 (16/ 1609) | End For | |
| 2285 (16/ 1610) | Return Affinity Matrix to calling function. | Return (Affinity_Matrix) |

Figure 17:
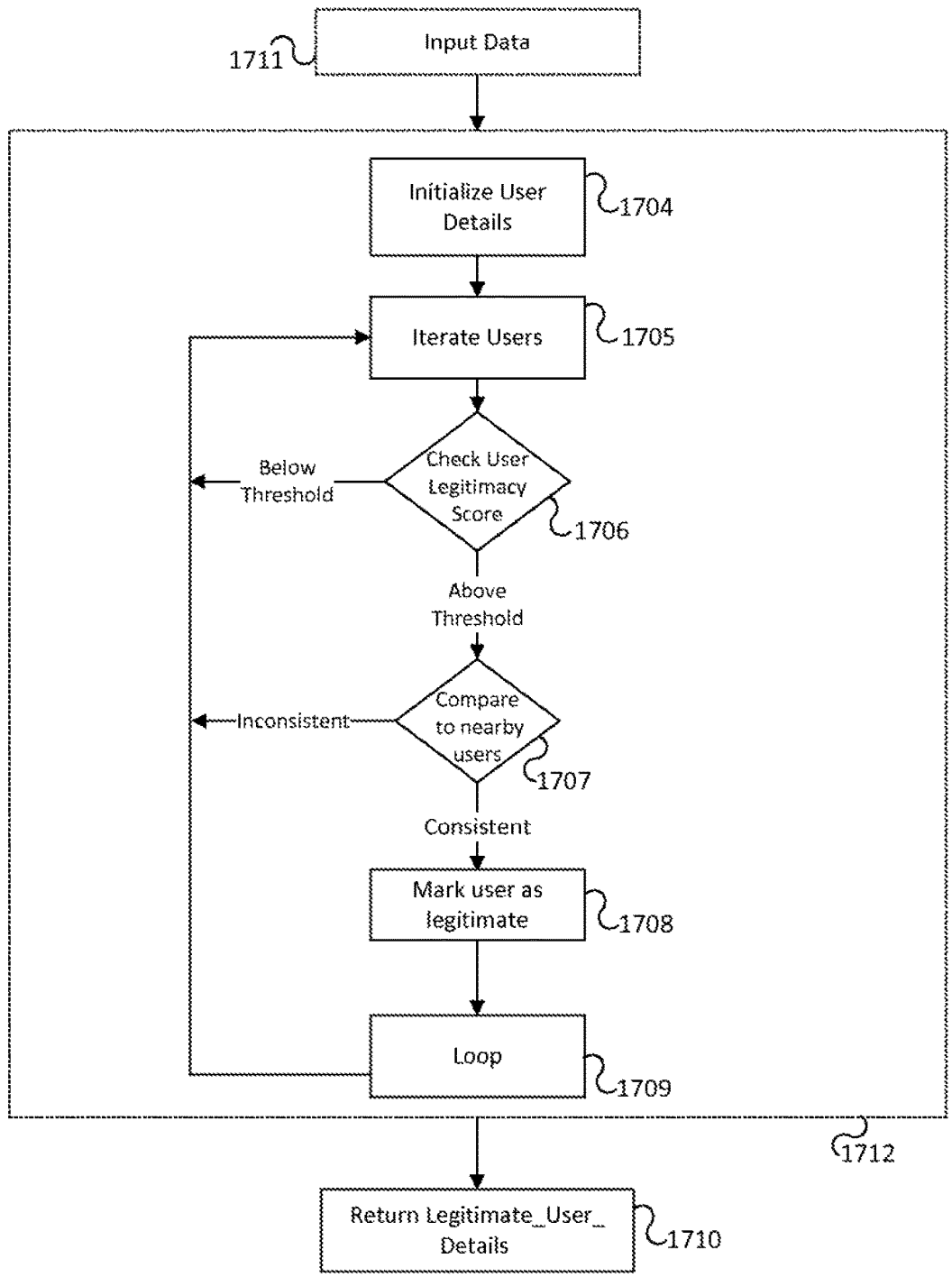
FIG. 17 shows steps for processing and transforming inputs in order to return a credibility score for a plurality of users, wherein the credibility score is used to evaluate, detect and optionally mitigate cheating attempts, according to one or more embodiments of the invention.

FIG. 17 represents a computer function to analyze user responses and determine whether a sufficient number of users are available with a sufficient legitimacy score. Processing group 1711 comprises input to the function, including response time data, the level of event activity and the user details matrix. Within main execution group 1712, Step 1704 initializes the legitimate users matrix, followed by iterative loop 1705 which iterates all users, passing them to step 1706 which then determines if each If the user's reliability score is above or below the threshold returned by the Minimum_Legitimacy_Threshold( ) function. Users with scores below the threshold are skipped, and users with scores above the threshold are passed on to step 1707 which compares the response data (including, but not limited to, response time, connection data, latency data, and so on) of the user is consistent with that of a majority of the users whose geo-location is similar to that user. As before, users with inconsistencies are skipped and users with data that is consistent are passed to step 1708 which marks that user as legitimate in the Legitimate_User_Details table. Finally, step 1710 returns the estimated response reliability of the Legitimate_User_Details table to the calling function.

TABLE 25 below illustrates an exemplary pseudo code implementation of a program function used to analyze user responses and to determine whether there is a sufficient number of users are available with a sufficient legitimacy score, as applicable to a preferred embodiment of the present invention.

| Line (FIG./Step) | Comment | Pseudo Code |
|---|---|---|
| 1700 (17/1712) | Analyzes the answers provided by all the users and Dynamic Level, determines whether there is a sufficient number of users with a sufficient legitimacy score. | Calculate_User_Response_Time_Fraud_Likelyhood (Response_Time, Event_Dynamic_Level, User_Details) |
| 1710 (17/1704) | Initialize the object that will contain the users whose reliability exceeds a predefined threshold. | Legitimate_User_Details<-(new) |
| 1720 (17/1705) | Iterate users | Foreach (User in User_Details) |
| 1730 (17/1706) | If the user's reliability is above the threshold, it will be used for analysis later | If (user.Legitimacy_Score < Minimum_Legitimacy_Threshold( ) |
| 1740 (17/1706) | | Continue |
| 1750 (17/1707) | If the response of the user is consistent with that of a majority of the users whose geo-location is similar to his, then . . . | If (User_Response_Is_Consistent_With_Proximate_Users(User, User_Details)) |
| 1760 (17/1708) | . . . add the user to the list of legitimate users. | Legitimate_User_Details.Add(User) |
| 1770 (17/1709) | | End For |
| 1780 (17/1710) | Return estimated number and reliability of the remaining users and determine a legitimacy score (the higher the better). | Return (Estimate_Response_Rellability(Legitimate_User_Details)) |

Computing System

Figure 18:
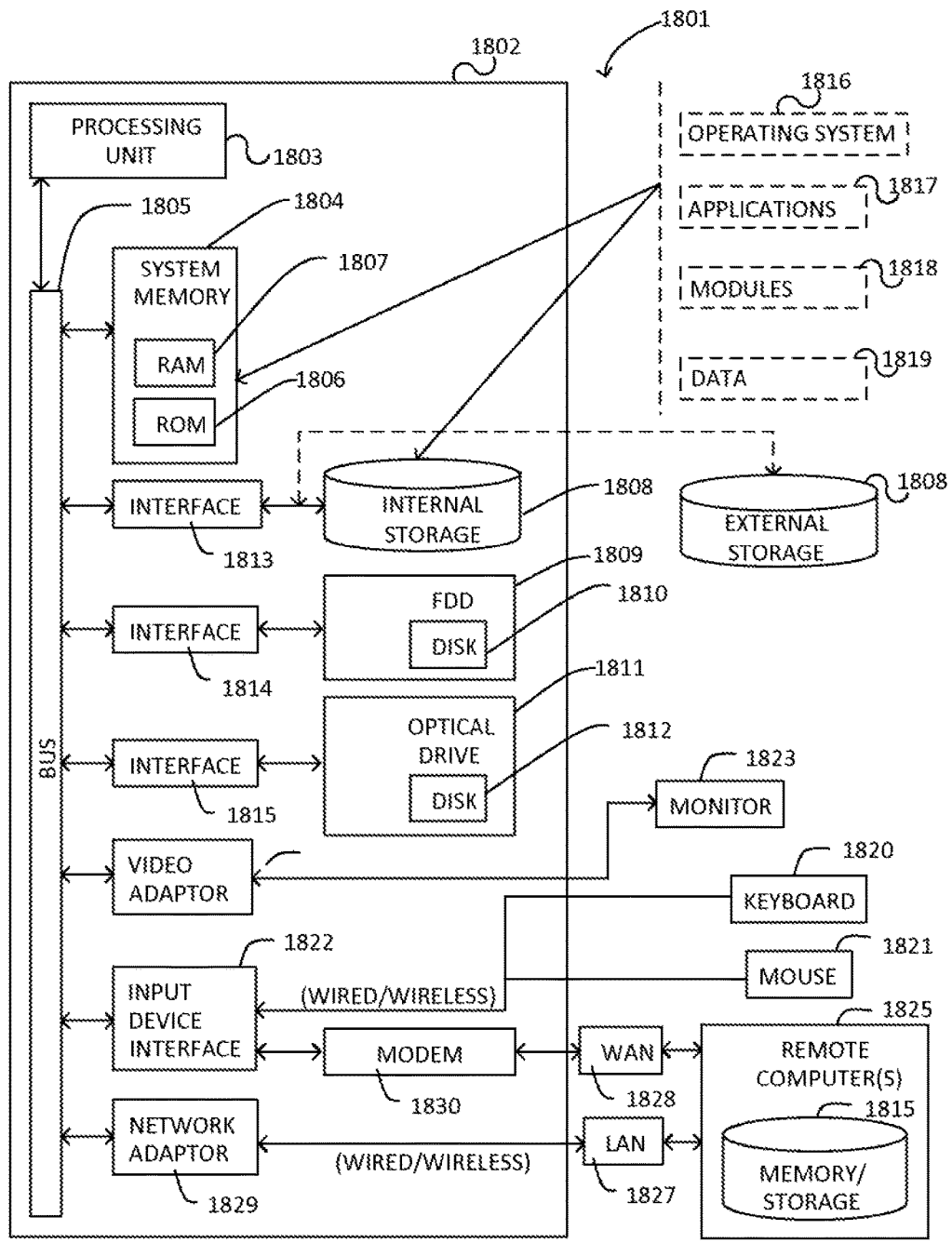
FIG. 18 illustrates various aspects of a networked computing system according to one or more embodiments of the invention.

Referring now to FIG. 18, there is illustrated a block diagram of a computer operable to execute the disclosed architecture. In order to provide additional context for various aspects of the subject invention, FIG. 18 and the following discussion are intended to provide a brief, general description of a suitable computing environment in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices, including various architectures such as cloud computing.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, cellular, infrared and other wireless media. Combinations of the any of the above should also be included within the scope of computer-readable media.

With reference again to FIG. 18, there is illustrated an exemplary environment 1801 for implementing various aspects of the invention that includes a computer 1802, the computer 1802 including a processing unit 1803, a system memory 1804 and a system bus 1805. The system bus 1805 couples system components including, but not limited to, the system memory 1804 to the processing unit 1803. The processing unit 1803 can be any of various commercially available processors. Dual microprocessors and other multi-processor architectures may also be employed as the processing unit 1803. The system bus 1805 can be any of several types of bus structure that may further interconnect to a memory bus (with or without a memory controller), a peripheral bus, and a local bus using any of a variety of commercially available bus architectures. The system memory 1804 includes read only memory (ROM) 1806 and random access memory (RAM) 1807. A basic input/output system (BIOS) is stored in a non-volatile memory 1806 such as ROM, EPROM, EEPROM, which BIOS contains the basic routines that help to transfer information between elements within the computer 1802, such as during start-up. The RAM 1807 can also include a high-speed RAM such as static RAM for caching data.

Still referring to FIG. 18, the computer 1802 can further includes an internal hard disk drive (HDD) 1808 (e.g., EIDE, SATA), which internal hard disk drive 1808 may also be configured for external use in a suitable chassis (not shown), a magnetic floppy disk drive (FDD) 1809, (e.g., to read from or write to a removable diskette 1810) and an optical disk drive 1811, (e.g., reading a CD-ROM disk 1812 or, to read from or write to other high capacity optical media such as the DVD). The hard disk drive 1808, magnetic disk drive 1809 and optical disk drive 1811 can be connected to the system bus 1805 by a hard disk drive interface 1813, a magnetic disk drive interface 1814 and an optical drive interface 1815, respectively. The interface 1813 for external drive implementations includes at least one or more of Universal Serial Bus (USB) and IEEE 1394 interface, PCIe. Thunderbolt, SCSI, or SAS technologies. The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

Continuing to refer to FIG. 18, a number of program modules can be stored in the drives and RAM 1807, including an operating system 1816, one or more application programs 1817, other program modules 1818 and program data 1819. All or portions of the operating system, applications, modules, and/or data can also be cached in the RAM 1807. It is appreciated that the invention can be implemented with various commercially available operating systems or combinations of operating systems. A user can enter commands and information into the computer 1802 through one or more wired/wireless input devices, e.g., a keyboard 1820 and a pointing device, such as a mouse 1821. Other input devices (not shown) may include a microphone, an IR remote control, a joystick, a game pad, a stylus pen, touch screen, or the like. These and other input devices are often connected to the processing unit 1803 through an input device interface 1822 that is coupled to the system bus 1805, but can be connected by other interfaces, such as a parallel port, an IEEE 1394 serial port, a game port, a USB port, an IR interface, etc.

FIG. 18 further illustrates a monitor 1823 or other type of display device can be connected to the system bus 1805 via an interface, such as a video adapter 1824. In addition to the monitor 1823, a computer typically includes other peripheral output devices (not shown), such as speakers, printers, etc., without limitation. The computer 1802 may operate in a networked environment using logical connections via wired and/or wireless communications to one or more remote computers, such as a remote computer(s) 1825. The remote computer(s) 1825 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory storage device 1826 is illustrated. The logical connections depicted include wired/wireless connectivity to a local area network (LAN) 1827 and/or larger networks, e.g., a wide area network (WAN) 1828. Such LAN and WAN networking environments are commonplace in offices, and companies, and facilitate enterprise-wide computer networks, such as intranets, all of which may connect to a global communication network, e.g. the Internet. For the purposes of the present invention, any and all handheld wireless devices such as Apple Inc.'s iPhone, IPad, any device running Google's Android operating system, or similar devices made by BlackBerry and others are also considered computers. When used in a LAN networking environment, the computer 1802 is connected to the local network 1827 through a wired and/or wireless communication network interface or adapter 1829. The adaptor 1829 may facilitate wired or wireless communication to the LAN 1827, which may also include a wireless access point disposed thereon for communicating with the wireless adaptor 1829.

The computer 1802 depicted in FIG. 18 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices. When used in a WAN networking environment, the computer 1802 can include a modem 1830, or is connected to a communications server on the WAN 1828, or has other means for establishing communications over the WAN 1828, such as by way of the Internet. The modem 1830, which can be internal or external and a wired or wireless device, is connected to the system bus 1805 via the serial port interface 1822. In a networked environment, program modules depicted relative to the computer 1802, or portions thereof, can be stored in the remote memory/storage device 1826. It will be appreciated that the network connections shown are exemplary and other means of establishing a communications link between the computers can be used.

Referring now to FIG. 19, a networked system according to one or more embodiments can comprise a system server 1901 having application 1902 and storage 1903 intercommunicably connected to each other and to a variety of client devices via a plurality of wired and wireless connections. Server 1901 is running at least one component of a preferred embodiment of the present invention 1902 and server 1901 may comprise further operating, memory and storage features as characterized for a computing system in FIG. 18. Connection to network 1910 (which, for example, without limitation, can comprise the Internet, in full or in part) can be had via any combination of wired or wireless connections 1916. User device 1909 can be connected to network 1910 via any combination of wired or wireless connections 1915, which in turn connects to the system server 1901 via connection 1916. A network 1910 can further include a wired Internet network 1915 and/or a wireless network 1914 through which transmissions are distributed by wireless transmitters 1908, as well as other forms of computing and transmission networks, all without limitation. A wireless device 1907, according to some embodiments, is preferably a cellular phone, tablet, or other mobile device capable of connecting to a network via any combination of wired, wireless, infrared, auditory or similar means. In other embodiments a PDA, a computer, a laptop 1904 or any other device capable of communicating with the server 1901 is possible. An application 1905 stored on the device 1907 and/or device 1904, which application can comprise a web browser application and/or a proprietary application, or a combination of such applications working integrated fashion, the application comprising one or more configurations of machine instructions for controlling a computer processor. In some embodiments, software to identify the physical location of the device 1907 or device 1904 can be stored on the devices, and location data as well as other data can be stored in storage media 1913 resident on such devices, or stored in distributed storage locations on the network. Furthermore, the devices 1909, 1907 and 1904 can receive data that are used to enable the user to respond to questions, and to capture the user's answers as well as the time in which the user responded. Additional applications are able to be included on the server 1901 and on the devices 1909, 1907 and/or 1904, as necessary, for smooth operation of the process and method, according to one or more embodiments. Although some of the applications are described separately above, in some embodiments the applications are included in one large application, or are accessed via any combination of applications on the device.

Still referring to FIG. 19, wireless transceiver 1908 can be WiFi, WiMax, cellular, or other wireless medium, connected to network 1910 via any combination of wired or wireless connections. User devices 1907 and 1904 can be connected to network 1910 via any combination of wired or wireless connections 1914 and to wireless transceiver 1908 running either a standard web browser or a customized application by which they access application 1902 on server 1901 via any combination of wired or wireless transmissions.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b/g) data rate, for example, or with experimental results that contain both bands (dual band), so the networks can provide real-world performance similar to the basic 10/100/1000BaseT wired Ethernet networks used in many offices. A further embodiment can even allow for transmission via a wireless method described in RFC 1149 (See http://tools.ietf.org/pdf/rfc1149.pdf, incorporated herein by reference).

Referring now to FIG. 20, depicted is an illustrative a presentation of a screenshot of a graphical user interface on a portable client computing device 2001, displaying questions about a past event element that the user may respond to. In one or more embodiments of the present invention, the user is informed that the questions relate to a past event element, in this case by a highlighted graphical object 2002. The user may then indicate their past predictions by indicating any of the options presented onscreen within region 2003, at which point the device shall transmit the user's response back to the system. Region 2004 depicts an illustrative example of a first affinity-related advertisement that was generated by the function depicted in FIG. 16 and sent to a user's portable computing device 2001.

Figure 21:
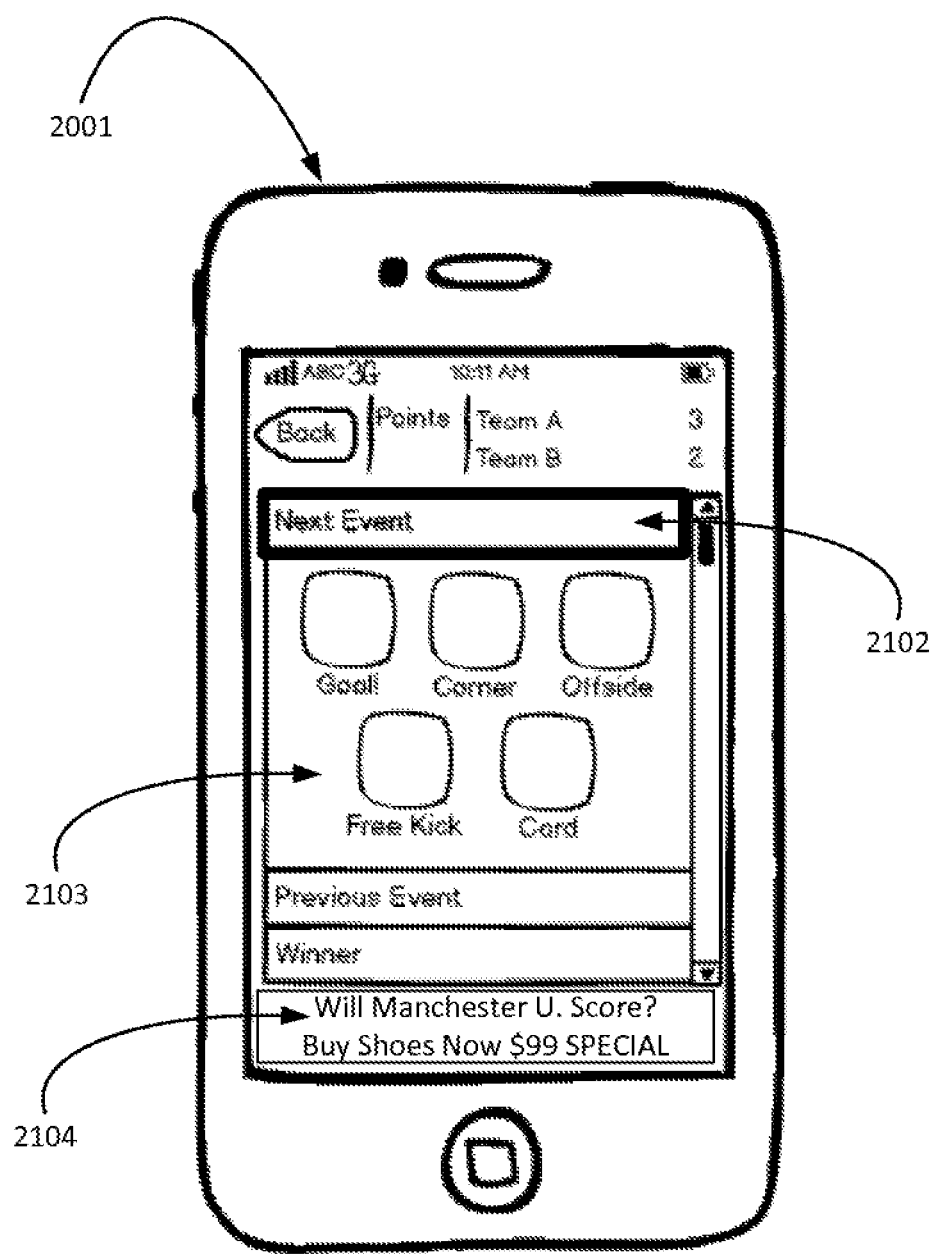
FIG. 21 depicts a further presentation of a screen of a graphical user interface on a portable client computing device according to one or more embodiments of the invention.

Referring now to FIG. 21, depicted is an illustrative a presentation of a screenshot of a graphical user interface on a portable client computing device 2101, displaying questions about a future possible event element so that the user may choose to predict what they believe will happen in the future. In one or more embodiments of the present invention, the user is informed that the questions relate to a past event element, in this case by a highlighted graphical object 2002. The user may then indicate their past predictions by indicating any of the options presented onscreen within region 2003, at which point the device shall transmit the user's response back to the system. Region 2104 depicts an illustrative example of a second affinity-related advertisement that was generated by the function depicted in FIG. 16 and sent to a user's portable computing device 2001.

Advantages

It can be appreciated that various embodiments of the invention confer numerous advantages and benefits. These include, without limitation, being able to generate a transcript of any event which is concurrently observed by a plurality of entities in a manner whereby each such entity can react to a plurality of stimuli and thereby interact with the system contemplated herein such that an accurate transcript will be produced by the system. Further benefit derives from being able to detect any of attempted fraud or cheating by any such entity. Additionally, it can be appreciated that benefits flow from being able to accomplish the above without the requirement for a physical presence at the location of the event and/or without the requirement to have an accurate time reference.

Scope not Limited

Those of ordinary skill in the art will recognize that the method and apparatus of the present invention described herein and others implied have many applications; therefore, the present invention which is the subject of this application is not limited by or to the representative examples and/or methods disclosed herein, nor limited by or to the preferred embodiments described herein. Moreover, the scope to the present inventions covers conventionally known variations and modifications to the system components (hardware, software, devices, methods, etc.) described herein, as would be known by those skilled in the art. Various other embodiments and modifications to these preferred embodiments may be made by those skilled in the relevant art without departing from the scope or spirit of these inventions. Accordingly, the inventions are not to be limited, except as by the appended claims to forthcoming applications.

What is claimed is:

1. A method for detecting unreliable users in an interactive electronic network and providing an accurate timeline of an event viewable by a plurality of users of the interactive electronic network, the method comprising steps of:
   (a) setting, via a computing device, an initial state of the event viewable by the plurality of users of the interactive electronic network based on a set time associated with the event;
   (b) transmitting, from the computing device via the interactive electronic network, first stimulus data to a plurality of user devices, each of the plurality of user devices associated with a respective user of the plurality of users of the interactive electronic network, the first stimulus data including information related to the event and machine readable instructions to present a first message to each user on each user device that prompts a response from each of the plurality of users regarding the event;

(c) receiving, by the computing device via the interactive electronic network, a first response data communication from one or more of the plurality of user devices, the first response data communication including:
  (i) first response information related to the message presented on each user device of the one or more user devices; and
  (ii) user information specific to the respective user associated with each user device of the one or more user devices;

(d) storing each first response data communication in a memory accessible by the computing device;

(e) determining, by the computing device, authenticity of the first response data communication from each of the one or more user devices, by performing at least the following steps:
  (i) determining, by the computing device, whether the first response data communication includes first response information that corresponds to activity in the event; and
  (ii) determining, by the computer device, whether the first response data communication includes first response information relating to event elements available to the user when the first message was displayed to the user on the user device;

(f) assigning, by the computing device, a reliability rating for each user of the one or more user devices based on the authenticity of the first response data communication received from the user device associated with each user, where for each user a reliable rating is assigned to the respective user:
  (i) when the first response information received in the first response data communication from the user device associated with the respective user corresponds to activity in the event; or
  (ii) when the first response information received in the first response data communication from the user device associated with the respective user includes information available to the respective user when the first message was displayed to the respective user on the user device associated with the respective user; and where for each user an unreliable rating is assigned to the respective user:
  (iii) when the first response information received in the first response data communication from the user device associated with the respective user does not correspond to activity in the event; or
  (iv) when the first response information received in the first response data communication from the user device associated with the respective user includes information not available to the respective user when the first message was displayed to the respective user on the user device associated with the respective user;

where the reliability rating is set for a first predetermined period of time;

(g) identifying, by the computing device, one or more unreliable users based on the reliability rating thereof;

(h) weighting, by the computing device, first response information from the plurality of user devices, wherein the computing device weights first response information from the first response data communications received from the plurality of user devices based on the reliability rating of the respective user associated with the user device providing the first response data communication such that first response information from first response data communications from user devices associated with respective users with reliable ratings is weighted more heavily than first response information from first response data communications from user devices associated with respective users with unreliable ratings; and
  (i) creating, by the computing device, a timeline of the event for the first predetermined period of time based on the weighted first response data communications from the plurality of user devices.

2. The method of claim 1, wherein the set time is a start time of the event.

3. The method of claim 1, wherein the set time is an end time of the event.

4. The method of claim 1, wherein the first stimulus data includes machine readable instructions to present an inquiry message on the one or more user devices about a past event element of the event.

5. The method of claim 1, wherein the first stimulus data includes machine readable instructions to present an inquiry message on the one or more user devices about a future event element of the event.

6. The method of claim 1, wherein the user information in the first response data communication from each user device includes geographic information regarding each user device and the step of determining, by the computing device, whether the first response data communication includes first response information relating to event elements available to the respective user when the first message was displayed to the respective user on the respective user device is based on the geographic information.

7. The method of claim 1, wherein the user information in the first response data communication from each user device of the one or more user devices includes proximity information regarding each user device and the step of determining, by the computing device, whether the first response data communication includes first response information relating to event elements available to the respective user when the first message was displayed to the respective user on the respective user device is based on the proximity of the respective user device to other user devices.

8. The method of claim 1, further comprising a step of determining, by the computing device, a time lag between occurrence of a particular event element of the event and receipt of a respective first response data communication from each respective user device of the plurality of user devices including information relating to the particular event element.

9. The method of claim 8, wherein the user information associated with a respective user includes information regarding a connection of the user device associated with the respective user to the interactive electronic network and the step of determining, by the computing device, whether the first response data communication includes first response information relating to event elements available to the respective user when the first message was displayed to the respective user on the user device associated with the respective user further comprises a step of comparing, by the computing device, the determined time lag to an expected time lag for the connection of the user device associated with the respective user to the interactive electronic network.

10. The method of claim 9, wherein the step of assigning a reliability rating includes assigning, by the computing device, the unreliable rating to the respective user when the determined time lag of the first response data communication from the user device associated with the respective user is larger than the expected time lag.

11. The method of claim 1, wherein the first stimulus data includes machine readable instructions to present an inquiry message on each user device regarding a past event element of the event that did not take place.

12. The method of claim 11, wherein the step of assigning the reliability rating includes assigning, by the computing device, the unreliable rating to a user when the first response data communication from the user device associated with the respective user includes first response information confirming occurrence of the past event element that did not take place.

13. The method of claim 1, further comprising steps of:
   (j) transmitting, from the computing device, after the first predetermined period of time, second stimulus data to the plurality of user devices, the second stimulus data including information related to the event and machine readable instructions to present a second message to each user on each user device that prompts a second response from each of the plurality of users;
   (k) receiving, by the computing device via the interactive electronic network, second response data communications from one or more user devices of the plurality of user devices, the second response data communications including second response information related to the second message and the user information specific to the user associated with the respective user device;
   (l) storing each second response data communication in memory accessible by the computing device;
   (m) determining, by the computing device, authenticity of the second response data communication from each of the plurality of user devices, by performing at least the following steps:
      (i) determining, by the computing device, whether the second response data communication includes second response information that corresponds to activity in the event; and
      (ii) determining, by the computing device, whether the second response data communication includes second response information relating to event elements available to the respective user when the second message was displayed on the user device associated with the respective user;
   (n) updating, by the computing device, the reliability rating for each user of the one or more user devices based on the authenticity of the second response data communication received from the user device associated with the respective user.

14. The method of claim 13, wherein the step of updating the reliability rating includes steps of:
   (i) assigning, by the computing device, a reliable rating to the respective user when the second response data communication received from the user device associated with the respective user includes second response information that corresponds to activity in the event;
   (ii) assigning, by the computing device, a reliable rating to the respective user when the second response data communication received from the user device associated with the respective user includes second response information available to the respective user of the user device associated with the respective user when the second message was displayed;
   (iii) assigning, by the computing device, an unreliable rating to the respective user when the second response data communication received from the user device associated with the respective user includes second response information that does not correspond to activity in the event; and
   (iv) assigning, by the computing device, an unreliable rating to the respective user when the second response data communication received from the user device associated with the respective user includes second response information that was not available to the respective user when the second message was displayed.

15. The method of claim 14, wherein the step of updating the reliability rating includes the steps of:
   (i) assigning, by the computing device, a reliable rating when the respective user received the reliable rating for the first predetermined period of time followed by a second reliable rating;
   (ii) assigning, by the computing device, an unreliable rating when the respective user received an unreliable rating for the first predetermined period of time followed by a second unreliable rating; and
   (iii) maintaining an existing reliability rating of the respective user when the respective user receives one of a reliable rating for the first predetermined period of time followed by an unreliable rating and an unreliable rating followed by a reliable rating.

16. The method of claim 15, further comprising a step of updating, by the computing device, the timeline of the event base on the second response data communications after the first predetermined period of time.

17. The method of claim 16, wherein the step of updating the timeline further comprises weighting, by the computing device, second response information from the plurality of second response data communications received from the one or more user devices based on the reliability rating of the respective user associated with the respective user device providing the second response information communication, where second response information from second response data communications from user devices associated with respective users with reliable ratings is weighted more heavily than second response information from second response data communications from user devices associated with respective users with unreliable ratings.

18. The method of claim 16, wherein the step of updating the timeline further comprises weighting, by the computing device, second response information from the plurality of second response data communications received from the one or more user devices based on the reliability rating of the respective user associated with the respective user device providing the second response information communication when the second response data communication was initiated from a user device in a location geographically proximal to the event, and where second response information from second response data communications from user devices associated with respective users with reliable ratings is weighted more heavily than second response information from second response data communications from user devices associated with respective users with unreliable ratings.

19. The method of claim 16, wherein the step of updating the timeline further comprises weighting, by the computing device, second response information from the plurality of second response data communications received from the one or more user devices based on the reliability rating of the respective user associated with the respective user device providing the second response information communication when the second response information communication was initiated from a user device located geographically proximal to other user devices with similar reliability ratings, and where second response information from second response data communications from user devices associated with respective users with reliable ratings is weighted more heavily than second response information from second response data communications from user devices associated with respective users with unreliable ratings.

20. The method of claim 1, wherein the first response data communication comprises:
   (iii) a first timestamp indicating when the first response was transmitted; and
   (iv) a second timestamp indicating when the first response was received by the computing device.

\* \* \* \* \*